(12) United States Patent
Togashi

(10) Patent No.: US 8,077,932 B2
(45) Date of Patent: Dec. 13, 2011

(54) FACE RECOGNITION APPARATUS, FACE RECOGNITION METHOD, GABOR FILTER APPLICATION APPARATUS, AND COMPUTER PROGRAM

(75) Inventor: Haruo Togashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1001 days.

(21) Appl. No.: 11/950,929

(22) Filed: Dec. 5, 2007

(65) Prior Publication Data

US 2008/0144941 A1 Jun. 19, 2008

(30) Foreign Application Priority Data

Dec. 18, 2006 (JP) ................................. 2006-339748

(51) Int. Cl.
*G06K 9/00* (2006.01)
(52) U.S. Cl. ......................................... 382/118; 382/100
(58) Field of Classification Search .................. 382/118, 382/159
See application file for complete search history.

(56) References Cited

U.S. PATENT DOCUMENTS

| | | | | |
|---|---|---|---|---|
| 6,826,300 | B2 * | 11/2004 | Liu et al. ........................ | 382/159 |
| 2006/0008173 | A1 * | 1/2006 | Matsugu et al. ............... | 382/274 |
| 2006/0050933 | A1 * | 3/2006 | Adam et al. ................... | 382/118 |

FOREIGN PATENT DOCUMENTS

| | | |
|---|---|---|
| JP | 6-19956 | 1/1994 |
| JP | 2005-21334 | 1/2005 |
| JP | 2006-4003 | 1/2006 |
| JP | 2006-4041 | 1/2006 |
| WO | WO03/019475 | 3/2003 |

OTHER PUBLICATIONS

U.S. Appl. No. 12/013,050, filed Jan. 11, 2008, Togashi.
Office Action issued Jun. 28, 2011, in Japanese Patent Application No. 2006-339748.

* cited by examiner

*Primary Examiner* — Hadi Akhavannik
(74) *Attorney, Agent, or Firm* — Oblon, Spivak, McClelland, Maier & Neustadt, L.L.P.

(57) ABSTRACT

In a face recognition apparatus adapted to recognize an input face image on the basis of one or more registered face images, similarity between an input face image and a registered face image is determined based on a Gabor jet calculated by performing Gabor filtering using Gabor filters defined by a Gaussian function representing a window and sine and cosine functions representing a frequency response for each of predetermined frequency values and for each of predetermined angles of the response function. Values of the filter window are calculated in advance based on the Gaussian function and stored in a filter window data ROM. Values of the response function are calculated in advance for respective angles based on the sine and cosine functions and stored in sine data ROMs and cosine data ROMs. In the Gabor filtering process, coefficients of the Gabor filters are determined from values read from these ROMs.

11 Claims, 49 Drawing Sheets

FIG. 10A

| | -11.5 | -10.5 | -9.5 | -8.5 | -7.5 | -6.5 | -5.5 | -4.5 | -3.5 | -2.5 | -1.5 | -0.5 |
|---|---|---|---|---|---|---|---|---|---|---|---|---|
| -11.5 | 0.000451 | 0.000636 | 0.000869 | 0.001151 | 0.001479 | 0.00184 | 0.00222 | 0.002595 | 0.002941 | 0.00323 | 0.003438 | 0.003548 |
| -10.5 | 0.000636 | 0.000897 | 0.001226 | 0.001624 | 0.002085 | 0.002595 | 0.003131 | 0.00366 | 0.004148 | 0.004556 | 0.004849 | 0.005003 |
| -9.5 | 0.000869 | 0.001226 | 0.001675 | 0.00222 | 0.00285 | 0.003548 | 0.004279 | 0.005003 | 0.00567 | 0.006227 | 0.006629 | 0.006839 |
| -8.5 | 0.001151 | 0.001624 | 0.00222 | 0.002941 | 0.003777 | 0.0047 | 0.00567 | 0.006629 | 0.007512 | 0.00825 | 0.008783 | 0.009061 |
| -7.5 | 0.001479 | 0.002085 | 0.00285 | 0.003777 | 0.004849 | 0.006036 | 0.007281 | 0.008512 | 0.009646 | 0.010594 | 0.011278 | 0.011636 |
| -6.5 | 0.00184 | 0.002595 | 0.003548 | 0.0047 | 0.006036 | 0.007512 | 0.009061 | 0.010594 | 0.012005 | 0.013186 | 0.014036 | 0.014482 |
| -5.5 | 0.00222 | 0.003131 | 0.004279 | 0.00567 | 0.007281 | 0.009061 | 0.010931 | 0.01278 | 0.014482 | 0.015906 | 0.016932 | 0.017469 |
| -4.5 | 0.002595 | 0.00366 | 0.005003 | 0.006629 | 0.008512 | 0.010594 | 0.01278 | 0.014942 | 0.016932 | 0.018596 | 0.019796 | 0.020425 |
| -3.5 | 0.002941 | 0.004148 | 0.00567 | 0.007512 | 0.009646 | 0.012005 | 0.014482 | 0.016932 | 0.019187 | 0.021073 | 0.022433 | 0.023145 |
| -2.5 | 0.00323 | 0.004556 | 0.006227 | 0.00825 | 0.010594 | 0.013186 | 0.015906 | 0.018596 | 0.021073 | 0.023145 | 0.024638 | 0.02542 |
| -1.5 | 0.003438 | 0.004849 | 0.006629 | 0.008783 | 0.011278 | 0.014036 | 0.016932 | 0.019796 | 0.022433 | 0.024638 | 0.026228 | 0.02706 |
| -0.5 | 0.003548 | 0.005003 | 0.006839 | 0.009061 | 0.011636 | 0.014482 | 0.017469 | 0.020425 | 0.023145 | 0.02542 | 0.02706 | 0.02792 |
| 0.5 | 0.003548 | 0.005003 | 0.006839 | 0.009061 | 0.011636 | 0.014482 | 0.017469 | 0.020425 | 0.023145 | 0.02542 | 0.02706 | 0.02792 |
| 1.5 | 0.003438 | 0.004849 | 0.006629 | 0.008783 | 0.011278 | 0.014036 | 0.016932 | 0.019796 | 0.022433 | 0.024638 | 0.026228 | 0.02706 |
| 2.5 | 0.00323 | 0.004556 | 0.006227 | 0.00825 | 0.010594 | 0.013186 | 0.015906 | 0.018596 | 0.021073 | 0.023145 | 0.024638 | 0.02542 |
| 3.5 | 0.002941 | 0.004148 | 0.00567 | 0.007512 | 0.009646 | 0.012005 | 0.014482 | 0.016932 | 0.019187 | 0.021073 | 0.022433 | 0.023145 |
| 4.5 | 0.002595 | 0.00366 | 0.005003 | 0.006629 | 0.008512 | 0.010594 | 0.01278 | 0.014942 | 0.016932 | 0.018596 | 0.019796 | 0.020425 |
| 5.5 | 0.00222 | 0.003131 | 0.004279 | 0.00567 | 0.007281 | 0.009061 | 0.010931 | 0.01278 | 0.014482 | 0.015906 | 0.016932 | 0.017469 |
| 6.5 | 0.00184 | 0.002595 | 0.003548 | 0.0047 | 0.006036 | 0.007512 | 0.009061 | 0.010594 | 0.012005 | 0.013186 | 0.014036 | 0.014482 |
| 7.5 | 0.001479 | 0.002085 | 0.00285 | 0.003777 | 0.004849 | 0.006036 | 0.007281 | 0.008512 | 0.009646 | 0.010594 | 0.011278 | 0.011636 |
| 8.5 | 0.001151 | 0.001624 | 0.00222 | 0.002941 | 0.003777 | 0.0047 | 0.00567 | 0.006629 | 0.007512 | 0.00825 | 0.008783 | 0.009061 |
| 9.5 | 0.000869 | 0.001226 | 0.001675 | 0.00222 | 0.00285 | 0.003548 | 0.004279 | 0.005003 | 0.00567 | 0.006227 | 0.006629 | 0.006839 |
| 10.5 | 0.000636 | 0.000897 | 0.001226 | 0.001624 | 0.002085 | 0.002595 | 0.003131 | 0.00366 | 0.004148 | 0.004556 | 0.004849 | 0.005003 |
| 11.5 | 0.000451 | 0.000636 | 0.000869 | 0.001151 | 0.001479 | 0.00184 | 0.00222 | 0.002595 | 0.002941 | 0.00323 | 0.003438 | 0.003548 |

FIG. 10B

| | 0.5 | 1.5 | 2.5 | 3.5 | 4.5 | 5.5 | 6.5 | 7.5 | 8.5 | 9.5 | 10.5 | 11.5 |
|---|---|---|---|---|---|---|---|---|---|---|---|---|
| -11.5 | 0.003548 | 0.003438 | 0.00323 | 0.002941 | 0.002595 | 0.00222 | 0.00184 | 0.001479 | 0.001151 | 0.000869 | 0.000636 | 0.000451 |
| -10.5 | 0.005003 | 0.004849 | 0.004556 | 0.004148 | 0.00366 | 0.003131 | 0.002595 | 0.002085 | 0.001624 | 0.001226 | 0.000897 | 0.000636 |
| -9.5 | 0.006839 | 0.006629 | 0.006227 | 0.00567 | 0.005003 | 0.004279 | 0.003548 | 0.00285 | 0.00222 | 0.001675 | 0.001226 | 0.000869 |
| -8.5 | 0.009061 | 0.008783 | 0.00825 | 0.007512 | 0.006629 | 0.00567 | 0.0047 | 0.003777 | 0.002941 | 0.00222 | 0.001624 | 0.001151 |
| -7.5 | 0.011636 | 0.011278 | 0.010594 | 0.009646 | 0.008512 | 0.007281 | 0.006036 | 0.004849 | 0.003777 | 0.00285 | 0.002085 | 0.001479 |
| -6.5 | 0.014482 | 0.014036 | 0.013186 | 0.012005 | 0.010594 | 0.009061 | 0.007512 | 0.006036 | 0.0047 | 0.003548 | 0.002595 | 0.00184 |
| -5.5 | 0.017469 | 0.016932 | 0.015906 | 0.014482 | 0.01278 | 0.010931 | 0.009061 | 0.007281 | 0.00567 | 0.004279 | 0.003131 | 0.00222 |
| -4.5 | 0.020425 | 0.019796 | 0.018596 | 0.016932 | 0.014942 | 0.01278 | 0.010594 | 0.008512 | 0.006629 | 0.005003 | 0.00366 | 0.002595 |
| -3.5 | 0.023145 | 0.022433 | 0.021073 | 0.019187 | 0.016932 | 0.014482 | 0.012005 | 0.009646 | 0.007512 | 0.00567 | 0.004148 | 0.002941 |
| -2.5 | 0.02542 | 0.024638 | 0.023145 | 0.021073 | 0.018596 | 0.015906 | 0.013186 | 0.010594 | 0.00825 | 0.006227 | 0.004556 | 0.00323 |
| -1.5 | 0.02706 | 0.026228 | 0.024638 | 0.022433 | 0.019796 | 0.016932 | 0.014036 | 0.011278 | 0.008783 | 0.006629 | 0.004849 | 0.003438 |
| -0.5 | 0.02792 | 0.02706 | 0.02542 | 0.023145 | 0.020425 | 0.017469 | 0.014482 | 0.011636 | 0.009061 | 0.006839 | 0.005003 | 0.003548 |
| 0.5 | 0.02792 | 0.02706 | 0.02542 | 0.023145 | 0.020425 | 0.017469 | 0.014482 | 0.011636 | 0.009061 | 0.006839 | 0.005003 | 0.003548 |
| 1.5 | 0.02706 | 0.026228 | 0.024638 | 0.022433 | 0.019796 | 0.016932 | 0.014036 | 0.011278 | 0.008783 | 0.006629 | 0.004849 | 0.003438 |
| 2.5 | 0.02542 | 0.024638 | 0.023145 | 0.021073 | 0.018596 | 0.015906 | 0.013186 | 0.010594 | 0.00825 | 0.006227 | 0.004556 | 0.00323 |
| 3.5 | 0.023145 | 0.022433 | 0.021073 | 0.019187 | 0.016932 | 0.014482 | 0.012005 | 0.009646 | 0.007512 | 0.00567 | 0.004148 | 0.002941 |
| 4.5 | 0.020425 | 0.019796 | 0.018596 | 0.016932 | 0.014942 | 0.01278 | 0.010594 | 0.008512 | 0.006629 | 0.005003 | 0.00366 | 0.002595 |
| 5.5 | 0.017469 | 0.016932 | 0.015906 | 0.014482 | 0.01278 | 0.010931 | 0.009061 | 0.007281 | 0.00567 | 0.004279 | 0.003131 | 0.00222 |
| 6.5 | 0.014482 | 0.014036 | 0.013186 | 0.012005 | 0.010594 | 0.009061 | 0.007512 | 0.006036 | 0.0047 | 0.003548 | 0.002595 | 0.00184 |
| 7.5 | 0.011636 | 0.011278 | 0.010594 | 0.009646 | 0.008512 | 0.007281 | 0.006036 | 0.004849 | 0.003777 | 0.00285 | 0.002085 | 0.001479 |
| 8.5 | 0.009061 | 0.008783 | 0.00825 | 0.007512 | 0.006629 | 0.00567 | 0.0047 | 0.003777 | 0.002941 | 0.00222 | 0.001624 | 0.001151 |
| 9.5 | 0.006839 | 0.006629 | 0.006227 | 0.00567 | 0.005003 | 0.004279 | 0.003548 | 0.00285 | 0.00222 | 0.001675 | 0.001226 | 0.000869 |
| 10.5 | 0.005003 | 0.004849 | 0.004556 | 0.004148 | 0.00366 | 0.003131 | 0.002595 | 0.002085 | 0.001624 | 0.001226 | 0.000897 | 0.000636 |
| 11.5 | 0.003548 | 0.003438 | 0.00323 | 0.002941 | 0.002595 | 0.00222 | 0.00184 | 0.001479 | 0.001151 | 0.000869 | 0.000636 | 0.000451 |

FIG. 11A

| | -11.5 | -10.5 | -9.5 | -8.5 | -7.5 | -6.5 | -5.5 | -4.5 | -3.5 | -2.5 | -1.5 | -0.5 |
|---|---|---|---|---|---|---|---|---|---|---|---|---|
| -11.5 | 0.45399 | 0.156434 | -0.15643 | -0.45399 | -0.70711 | -0.89101 | -0.98769 | -0.98769 | -0.89101 | -0.70711 | -0.45399 | -0.15643 |
| -10.5 | 0.45399 | 0.156434 | -0.15643 | -0.45399 | -0.70711 | -0.89101 | -0.98769 | -0.98769 | -0.89101 | -0.70711 | -0.45399 | -0.15643 |
| -9.5 | 0.45399 | 0.156434 | -0.15643 | -0.45399 | -0.70711 | -0.89101 | -0.98769 | -0.98769 | -0.89101 | -0.70711 | -0.45399 | -0.15643 |
| -8.5 | 0.45399 | 0.156434 | -0.15643 | -0.45399 | -0.70711 | -0.89101 | -0.98769 | -0.98769 | -0.89101 | -0.70711 | -0.45399 | -0.15643 |
| -7.5 | 0.45399 | 0.156434 | -0.15643 | -0.45399 | -0.70711 | -0.89101 | -0.98769 | -0.98769 | -0.89101 | -0.70711 | -0.45399 | -0.15643 |
| -6.5 | 0.45399 | 0.156434 | -0.15643 | -0.45399 | -0.70711 | -0.89101 | -0.98769 | -0.98769 | -0.89101 | -0.70711 | -0.45399 | -0.15643 |
| -5.5 | 0.45399 | 0.156434 | -0.15643 | -0.45399 | -0.70711 | -0.89101 | -0.98769 | -0.98769 | -0.89101 | -0.70711 | -0.45399 | -0.15643 |
| -4.5 | 0.45399 | 0.156434 | -0.15643 | -0.45399 | -0.70711 | -0.89101 | -0.98769 | -0.98769 | -0.89101 | -0.70711 | -0.45399 | -0.15643 |
| -3.5 | 0.45399 | 0.156434 | -0.15643 | -0.45399 | -0.70711 | -0.89101 | -0.98769 | -0.98769 | -0.89101 | -0.70711 | -0.45399 | -0.15643 |
| -2.5 | 0.45399 | 0.156434 | -0.15643 | -0.45399 | -0.70711 | -0.89101 | -0.98769 | -0.98769 | -0.89101 | -0.70711 | -0.45399 | -0.15643 |
| -1.5 | 0.45399 | 0.156434 | -0.15643 | -0.45399 | -0.70711 | -0.89101 | -0.98769 | -0.98769 | -0.89101 | -0.70711 | -0.45399 | -0.15643 |
| -0.5 | 0.45399 | 0.156434 | -0.15643 | -0.45399 | -0.70711 | -0.89101 | -0.98769 | -0.98769 | -0.89101 | -0.70711 | -0.45399 | -0.15643 |
| 0.5 | 0.45399 | 0.156434 | -0.15643 | -0.45399 | -0.70711 | -0.89101 | -0.98769 | -0.98769 | -0.89101 | -0.70711 | -0.45399 | -0.15643 |
| 1.5 | 0.45399 | 0.156434 | -0.15643 | -0.45399 | -0.70711 | -0.89101 | -0.98769 | -0.98769 | -0.89101 | -0.70711 | -0.45399 | -0.15643 |
| 2.5 | 0.45399 | 0.156434 | -0.15643 | -0.45399 | -0.70711 | -0.89101 | -0.98769 | -0.98769 | -0.89101 | -0.70711 | -0.45399 | -0.15643 |
| 3.5 | 0.45399 | 0.156434 | -0.15643 | -0.45399 | -0.70711 | -0.89101 | -0.98769 | -0.98769 | -0.89101 | -0.70711 | -0.45399 | -0.15643 |
| 4.5 | 0.45399 | 0.156434 | -0.15643 | -0.45399 | -0.70711 | -0.89101 | -0.98769 | -0.98769 | -0.89101 | -0.70711 | -0.45399 | -0.15643 |
| 5.5 | 0.45399 | 0.156434 | -0.15643 | -0.45399 | -0.70711 | -0.89101 | -0.98769 | -0.98769 | -0.89101 | -0.70711 | -0.45399 | -0.15643 |
| 6.5 | 0.45399 | 0.156434 | -0.15643 | -0.45399 | -0.70711 | -0.89101 | -0.98769 | -0.98769 | -0.89101 | -0.70711 | -0.45399 | -0.15643 |
| 7.5 | 0.45399 | 0.156434 | -0.15643 | -0.45399 | -0.70711 | -0.89101 | -0.98769 | -0.98769 | -0.89101 | -0.70711 | -0.45399 | -0.15643 |
| 8.5 | 0.45399 | 0.156434 | -0.15643 | -0.45399 | -0.70711 | -0.89101 | -0.98769 | -0.98769 | -0.89101 | -0.70711 | -0.45399 | -0.15643 |
| 9.5 | 0.45399 | 0.156434 | -0.15643 | -0.45399 | -0.70711 | -0.89101 | -0.98769 | -0.98769 | -0.89101 | -0.70711 | -0.45399 | -0.15643 |
| 10.5 | 0.45399 | 0.156434 | -0.15643 | -0.45399 | -0.70711 | -0.89101 | -0.98769 | -0.98769 | -0.89101 | -0.70711 | -0.45399 | -0.15643 |
| 11.5 | 0.45399 | 0.156434 | -0.15643 | -0.45399 | -0.70711 | -0.89101 | -0.98769 | -0.98769 | -0.89101 | -0.70711 | -0.45399 | -0.15643 |

FIG. 11B

| | 0.5 | 1.5 | 2.5 | 3.5 | 4.5 | 5.5 | 6.5 | 7.5 | 8.5 | 9.5 | 10.5 | 11.5 |
|---|---|---|---|---|---|---|---|---|---|---|---|---|
| -11.5 | 0.156434 | 0.45399 | 0.707107 | 0.891007 | 0.987668 | 0.987668 | 0.891007 | 0.707107 | 0.45399 | 0.156434 | -0.15643 | -0.45399 |
| -10.5 | 0.156434 | 0.45399 | 0.707107 | 0.891007 | 0.987668 | 0.987668 | 0.891007 | 0.707107 | 0.45399 | 0.156434 | -0.15643 | -0.45399 |
| -9.5 | 0.156434 | 0.45399 | 0.707107 | 0.891007 | 0.987668 | 0.987668 | 0.891007 | 0.707107 | 0.45399 | 0.156434 | -0.15643 | -0.45399 |
| -8.5 | 0.156434 | 0.45399 | 0.707107 | 0.891007 | 0.987668 | 0.987668 | 0.891007 | 0.707107 | 0.45399 | 0.156434 | -0.15643 | -0.45399 |
| -7.5 | 0.156434 | 0.45399 | 0.707107 | 0.891007 | 0.987668 | 0.987668 | 0.891007 | 0.707107 | 0.45399 | 0.156434 | -0.15643 | -0.45399 |
| -6.5 | 0.156434 | 0.45399 | 0.707107 | 0.891007 | 0.987668 | 0.987668 | 0.891007 | 0.707107 | 0.45399 | 0.156434 | -0.15643 | -0.45399 |
| -5.5 | 0.156434 | 0.45399 | 0.707107 | 0.891007 | 0.987668 | 0.987668 | 0.891007 | 0.707107 | 0.45399 | 0.156434 | -0.15643 | -0.45399 |
| -4.5 | 0.156434 | 0.45399 | 0.707107 | 0.891007 | 0.987668 | 0.987668 | 0.891007 | 0.707107 | 0.45399 | 0.156434 | -0.15643 | -0.45399 |
| -3.5 | 0.156434 | 0.45399 | 0.707107 | 0.891007 | 0.987668 | 0.987668 | 0.891007 | 0.707107 | 0.45399 | 0.156434 | -0.15643 | -0.45399 |
| -2.5 | 0.156434 | 0.45399 | 0.707107 | 0.891007 | 0.987668 | 0.987668 | 0.891007 | 0.707107 | 0.45399 | 0.156434 | -0.15643 | -0.45399 |
| -1.5 | 0.156434 | 0.45399 | 0.707107 | 0.891007 | 0.987668 | 0.987668 | 0.891007 | 0.707107 | 0.45399 | 0.156434 | -0.15643 | -0.45399 |
| -0.5 | 0.156434 | 0.45399 | 0.707107 | 0.891007 | 0.987668 | 0.987668 | 0.891007 | 0.707107 | 0.45399 | 0.156434 | -0.15643 | -0.45399 |
| 0.5 | 0.156434 | 0.45399 | 0.707107 | 0.891007 | 0.987668 | 0.987668 | 0.891007 | 0.707107 | 0.45399 | 0.156434 | -0.15643 | -0.45399 |
| 1.5 | 0.156434 | 0.45399 | 0.707107 | 0.891007 | 0.987668 | 0.987668 | 0.891007 | 0.707107 | 0.45399 | 0.156434 | -0.15643 | -0.45399 |
| 2.5 | 0.156434 | 0.45399 | 0.707107 | 0.891007 | 0.987668 | 0.987668 | 0.891007 | 0.707107 | 0.45399 | 0.156434 | -0.15643 | -0.45399 |
| 3.5 | 0.156434 | 0.45399 | 0.707107 | 0.891007 | 0.987668 | 0.987668 | 0.891007 | 0.707107 | 0.45399 | 0.156434 | -0.15643 | -0.45399 |
| 4.5 | 0.156434 | 0.45399 | 0.707107 | 0.891007 | 0.987668 | 0.987668 | 0.891007 | 0.707107 | 0.45399 | 0.156434 | -0.15643 | -0.45399 |
| 5.5 | 0.156434 | 0.45399 | 0.707107 | 0.891007 | 0.987668 | 0.987668 | 0.891007 | 0.707107 | 0.45399 | 0.156434 | -0.15643 | -0.45399 |
| 6.5 | 0.156434 | 0.45399 | 0.707107 | 0.891007 | 0.987668 | 0.987668 | 0.891007 | 0.707107 | 0.45399 | 0.156434 | -0.15643 | -0.45399 |
| 7.5 | 0.156434 | 0.45399 | 0.707107 | 0.891007 | 0.987668 | 0.987668 | 0.891007 | 0.707107 | 0.45399 | 0.156434 | -0.15643 | -0.45399 |
| 8.5 | 0.156434 | 0.45399 | 0.707107 | 0.891007 | 0.987668 | 0.987668 | 0.891007 | 0.707107 | 0.45399 | 0.156434 | -0.15643 | -0.45399 |
| 9.5 | 0.156434 | 0.45399 | 0.707107 | 0.891007 | 0.987668 | 0.987668 | 0.891007 | 0.707107 | 0.45399 | 0.156434 | -0.15643 | -0.45399 |
| 10.5 | 0.156434 | 0.45399 | 0.707107 | 0.891007 | 0.987668 | 0.987668 | 0.891007 | 0.707107 | 0.45399 | 0.156434 | -0.15643 | -0.45399 |
| 11.5 | 0.156434 | 0.45399 | 0.707107 | 0.891007 | 0.987668 | 0.987668 | 0.891007 | 0.707107 | 0.45399 | 0.156434 | -0.15643 | -0.45399 |

FIG. 12A

| | -11.5 | -10.5 | -9.5 | -8.5 | -7.5 | -6.5 | -5.5 | -4.5 | -3.5 | -2.5 | -1.5 | -0.5 |
|---|---|---|---|---|---|---|---|---|---|---|---|---|
| -11.5 | -0.89101 | -0.98769 | -0.98769 | -0.89101 | -0.70711 | -0.45399 | -0.15643 | 0.156434 | 0.45399 | 0.707107 | 0.891007 | 0.987668 |
| -10.5 | -0.89101 | -0.98769 | -0.98769 | -0.89101 | -0.70711 | -0.45399 | -0.15643 | 0.156434 | 0.45399 | 0.707107 | 0.891007 | 0.987668 |
| -9.5 | -0.89101 | -0.98769 | -0.98769 | -0.89101 | -0.70711 | -0.45399 | -0.15643 | 0.156434 | 0.45399 | 0.707107 | 0.891007 | 0.987668 |
| -8.5 | -0.89101 | -0.98769 | -0.98769 | -0.89101 | -0.70711 | -0.45399 | -0.15643 | 0.156434 | 0.45399 | 0.707107 | 0.891007 | 0.987668 |
| -7.5 | -0.89101 | -0.98769 | -0.98769 | -0.89101 | -0.70711 | -0.45399 | -0.15643 | 0.156434 | 0.45399 | 0.707107 | 0.891007 | 0.987668 |
| -6.5 | -0.89101 | -0.98769 | -0.98769 | -0.89101 | -0.70711 | -0.45399 | -0.15643 | 0.156434 | 0.45399 | 0.707107 | 0.891007 | 0.987668 |
| -5.5 | -0.89101 | -0.98769 | -0.98769 | -0.89101 | -0.70711 | -0.45399 | -0.15643 | 0.156434 | 0.45399 | 0.707107 | 0.891007 | 0.987668 |
| -4.5 | -0.89101 | -0.98769 | -0.98769 | -0.89101 | -0.70711 | -0.45399 | -0.15643 | 0.156434 | 0.45399 | 0.707107 | 0.891007 | 0.987668 |
| -3.5 | -0.89101 | -0.98769 | -0.98769 | -0.89101 | -0.70711 | -0.45399 | -0.15643 | 0.156434 | 0.45399 | 0.707107 | 0.891007 | 0.987668 |
| -2.5 | -0.89101 | -0.98769 | -0.98769 | -0.89101 | -0.70711 | -0.45399 | -0.15643 | 0.156434 | 0.45399 | 0.707107 | 0.891007 | 0.987668 |
| -1.5 | -0.89101 | -0.98769 | -0.98769 | -0.89101 | -0.70711 | -0.45399 | -0.15643 | 0.156434 | 0.45399 | 0.707107 | 0.891007 | 0.987668 |
| -0.5 | -0.89101 | -0.98769 | -0.98769 | -0.89101 | -0.70711 | -0.45399 | -0.15643 | 0.156434 | 0.45399 | 0.707107 | 0.891007 | 0.987668 |
| 0.5 | -0.89101 | -0.98769 | -0.98769 | -0.89101 | -0.70711 | -0.45399 | -0.15643 | 0.156434 | 0.45399 | 0.707107 | 0.891007 | 0.987668 |
| 1.5 | -0.89101 | -0.98769 | -0.98769 | -0.89101 | -0.70711 | -0.45399 | -0.15643 | 0.156434 | 0.45399 | 0.707107 | 0.891007 | 0.987668 |
| 2.5 | -0.89101 | -0.98769 | -0.98769 | -0.89101 | -0.70711 | -0.45399 | -0.15643 | 0.156434 | 0.45399 | 0.707107 | 0.891007 | 0.987668 |
| 3.5 | -0.89101 | -0.98769 | -0.98769 | -0.89101 | -0.70711 | -0.45399 | -0.15643 | 0.156434 | 0.45399 | 0.707107 | 0.891007 | 0.987668 |
| 4.5 | -0.89101 | -0.98769 | -0.98769 | -0.89101 | -0.70711 | -0.45399 | -0.15643 | 0.156434 | 0.45399 | 0.707107 | 0.891007 | 0.987668 |
| 5.5 | -0.89101 | -0.98769 | -0.98769 | -0.89101 | -0.70711 | -0.45399 | -0.15643 | 0.156434 | 0.45399 | 0.707107 | 0.891007 | 0.987668 |
| 6.5 | -0.89101 | -0.98769 | -0.98769 | -0.89101 | -0.70711 | -0.45399 | -0.15643 | 0.156434 | 0.45399 | 0.707107 | 0.891007 | 0.987668 |
| 7.5 | -0.89101 | -0.98769 | -0.98769 | -0.89101 | -0.70711 | -0.45399 | -0.15643 | 0.156434 | 0.45399 | 0.707107 | 0.891007 | 0.987668 |
| 8.5 | -0.89101 | -0.98769 | -0.98769 | -0.89101 | -0.70711 | -0.45399 | -0.15643 | 0.156434 | 0.45399 | 0.707107 | 0.891007 | 0.987668 |
| 9.5 | -0.89101 | -0.98769 | -0.98769 | -0.89101 | -0.70711 | -0.45399 | -0.15643 | 0.156434 | 0.45399 | 0.707107 | 0.891007 | 0.987668 |
| 10.5 | -0.89101 | -0.98769 | -0.98769 | -0.89101 | -0.70711 | -0.45399 | -0.15643 | 0.156434 | 0.45399 | 0.707107 | 0.891007 | 0.987668 |
| 11.5 | -0.89101 | -0.98769 | -0.98769 | -0.89101 | -0.70711 | -0.45399 | -0.15643 | 0.156434 | 0.45399 | 0.707107 | 0.891007 | 0.987668 |

FIG. 12B

| | 0.5 | 1.5 | 2.5 | 3.5 | 4.5 | 5.5 | 6.5 | 7.5 | 8.5 | 9.5 | 10.5 | 11.5 |
|---|---|---|---|---|---|---|---|---|---|---|---|---|
| -11.5 | 0.987668 | 0.891007 | 0.707107 | 0.45399 | 0.156434 | -0.15643 | -0.45399 | -0.70711 | -0.89101 | -0.98769 | -0.98769 | -0.89101 |
| -10.5 | 0.987668 | 0.891007 | 0.707107 | 0.45399 | 0.156434 | -0.15643 | -0.45399 | -0.70711 | -0.89101 | -0.98769 | -0.98769 | -0.89101 |
| -9.5 | 0.987668 | 0.891007 | 0.707107 | 0.45399 | 0.156434 | -0.15643 | -0.45399 | -0.70711 | -0.89101 | -0.98769 | -0.98769 | -0.89101 |
| -8.5 | 0.987668 | 0.891007 | 0.707107 | 0.45399 | 0.156434 | -0.15643 | -0.45399 | -0.70711 | -0.89101 | -0.98769 | -0.98769 | -0.89101 |
| -7.5 | 0.987668 | 0.891007 | 0.707107 | 0.45399 | 0.156434 | -0.15643 | -0.45399 | -0.70711 | -0.89101 | -0.98769 | -0.98769 | -0.89101 |
| -6.5 | 0.987668 | 0.891007 | 0.707107 | 0.45399 | 0.156434 | -0.15643 | -0.45399 | -0.70711 | -0.89101 | -0.98769 | -0.98769 | -0.89101 |
| -5.5 | 0.987668 | 0.891007 | 0.707107 | 0.45399 | 0.156434 | -0.15643 | -0.45399 | -0.70711 | -0.89101 | -0.98769 | -0.98769 | -0.89101 |
| -4.5 | 0.987668 | 0.891007 | 0.707107 | 0.45399 | 0.156434 | -0.15643 | -0.45399 | -0.70711 | -0.89101 | -0.98769 | -0.98769 | -0.89101 |
| -3.5 | 0.987668 | 0.891007 | 0.707107 | 0.45399 | 0.156434 | -0.15643 | -0.45399 | -0.70711 | -0.89101 | -0.98769 | -0.98769 | -0.89101 |
| -2.5 | 0.987668 | 0.891007 | 0.707107 | 0.45399 | 0.156434 | -0.15643 | -0.45399 | -0.70711 | -0.89101 | -0.98769 | -0.98769 | -0.89101 |
| -1.5 | 0.987668 | 0.891007 | 0.707107 | 0.45399 | 0.156434 | -0.15643 | -0.45399 | -0.70711 | -0.89101 | -0.98769 | -0.98769 | -0.89101 |
| -0.5 | 0.987668 | 0.891007 | 0.707107 | 0.45399 | 0.156434 | -0.15643 | -0.45399 | -0.70711 | -0.89101 | -0.98769 | -0.98769 | -0.89101 |
| 0.5 | 0.987668 | 0.891007 | 0.707107 | 0.45399 | 0.156434 | -0.15643 | -0.45399 | -0.70711 | -0.89101 | -0.98769 | -0.98769 | -0.89101 |
| 1.5 | 0.987668 | 0.891007 | 0.707107 | 0.45399 | 0.156434 | -0.15643 | -0.45399 | -0.70711 | -0.89101 | -0.98769 | -0.98769 | -0.89101 |
| 2.5 | 0.987668 | 0.891007 | 0.707107 | 0.45399 | 0.156434 | -0.15643 | -0.45399 | -0.70711 | -0.89101 | -0.98769 | -0.98769 | -0.89101 |
| 3.5 | 0.987668 | 0.891007 | 0.707107 | 0.45399 | 0.156434 | -0.15643 | -0.45399 | -0.70711 | -0.89101 | -0.98769 | -0.98769 | -0.89101 |
| 4.5 | 0.987668 | 0.891007 | 0.707107 | 0.45399 | 0.156434 | -0.15643 | -0.45399 | -0.70711 | -0.89101 | -0.98769 | -0.98769 | -0.89101 |
| 5.5 | 0.987668 | 0.891007 | 0.707107 | 0.45399 | 0.156434 | -0.15643 | -0.45399 | -0.70711 | -0.89101 | -0.98769 | -0.98769 | -0.89101 |
| 6.5 | 0.987668 | 0.891007 | 0.707107 | 0.45399 | 0.156434 | -0.15643 | -0.45399 | -0.70711 | -0.89101 | -0.98769 | -0.98769 | -0.89101 |
| 7.5 | 0.987668 | 0.891007 | 0.707107 | 0.45399 | 0.156434 | -0.15643 | -0.45399 | -0.70711 | -0.89101 | -0.98769 | -0.98769 | -0.89101 |
| 8.5 | 0.987668 | 0.891007 | 0.707107 | 0.45399 | 0.156434 | -0.15643 | -0.45399 | -0.70711 | -0.89101 | -0.98769 | -0.98769 | -0.89101 |
| 9.5 | 0.987668 | 0.891007 | 0.707107 | 0.45399 | 0.156434 | -0.15643 | -0.45399 | -0.70711 | -0.89101 | -0.98769 | -0.98769 | -0.89101 |
| 10.5 | 0.987668 | 0.891007 | 0.707107 | 0.45399 | 0.156434 | -0.15643 | -0.45399 | -0.70711 | -0.89101 | -0.98769 | -0.98769 | -0.89101 |
| 11.5 | 0.987668 | 0.891007 | 0.707107 | 0.45399 | 0.156434 | -0.15643 | -0.45399 | -0.70711 | -0.89101 | -0.98769 | -0.98769 | -0.89101 |

FIG. 13A

| | -11.5 | -10.5 | -9.5 | -8.5 | -7.5 | -6.5 | -5.5 | -4.5 | -3.5 | -2.5 | -1.5 | -0.5 |
|---|---|---|---|---|---|---|---|---|---|---|---|---|
| -11.5 | 0.922254 | 0.984764 | 0.998879 | 0.963903 | 0.881555 | 0.755883 | 0.593063 | 0.401097 | 0.189418 | -0.03157 | -0.25101 | -0.45811 |
| -10.5 | 0.984764 | 0.998879 | 0.963903 | 0.881555 | 0.755883 | 0.593063 | 0.401097 | 0.189418 | -0.03157 | -0.25101 | -0.45811 | -0.64269 |
| -9.5 | 0.998879 | 0.963903 | 0.881555 | 0.755883 | 0.593063 | 0.401097 | 0.189418 | -0.03157 | -0.25101 | -0.45811 | -0.64269 | -0.79569 |
| -8.5 | 0.963903 | 0.881555 | 0.755883 | 0.593063 | 0.401097 | 0.189418 | -0.03157 | -0.25101 | -0.45811 | -0.64269 | -0.79569 | -0.90959 |
| -7.5 | 0.881555 | 0.755883 | 0.593063 | 0.401097 | 0.189418 | -0.03157 | -0.25101 | -0.45811 | -0.64269 | -0.79569 | -0.90959 | -0.97878 |
| -6.5 | 0.755883 | 0.593063 | 0.401097 | 0.189418 | -0.03157 | -0.25101 | -0.45811 | -0.64269 | -0.79569 | -0.90959 | -0.97878 | -0.99988 |
| -5.5 | 0.593063 | 0.401097 | 0.189418 | -0.03157 | -0.25101 | -0.45811 | -0.64269 | -0.79569 | -0.90959 | -0.97878 | -0.99988 | -0.97183 |
| -4.5 | 0.401097 | 0.189418 | -0.03157 | -0.25101 | -0.45811 | -0.64269 | -0.79569 | -0.90959 | -0.97878 | -0.99988 | -0.97183 | -0.89602 |
| -3.5 | 0.189418 | -0.03157 | -0.25101 | -0.45811 | -0.64269 | -0.79569 | -0.90959 | -0.97878 | -0.99988 | -0.97183 | -0.89602 | -0.77618 |
| -2.5 | -0.03157 | -0.25101 | -0.45811 | -0.64269 | -0.79569 | -0.90959 | -0.97878 | -0.99988 | -0.97183 | -0.89602 | -0.77618 | -0.61819 |
| -1.5 | -0.25101 | -0.45811 | -0.64269 | -0.79569 | -0.90959 | -0.97878 | -0.99988 | -0.97183 | -0.89602 | -0.77618 | -0.61819 | -0.42982 |
| -0.5 | -0.45811 | -0.64269 | -0.79569 | -0.90959 | -0.97878 | -0.99988 | -0.97183 | -0.89602 | -0.77618 | -0.61819 | -0.42982 | -0.22032 |
| 0.5 | -0.64269 | -0.79569 | -0.90959 | -0.97878 | -0.99988 | -0.97183 | -0.89602 | -0.77618 | -0.61819 | -0.42982 | -0.22032 | 1.7E-17 |
| 1.5 | -0.79569 | -0.90959 | -0.97878 | -0.99988 | -0.97183 | -0.89602 | -0.77618 | -0.61819 | -0.42982 | -0.22032 | -7E-17 | 0.220322 |
| 2.5 | -0.90959 | -0.97878 | -0.99988 | -0.97183 | -0.89602 | -0.77618 | -0.61819 | -0.42982 | -0.22032 | -7E-17 | 0.220322 | 0.429815 |
| 3.5 | -0.97878 | -0.99988 | -0.97183 | -0.89602 | -0.77618 | -0.61819 | -0.42982 | -0.22032 | -1.4E-16 | 0.220322 | 0.429815 | 0.618186 |
| 4.5 | -0.99988 | -0.97183 | -0.89602 | -0.77618 | -0.61819 | -0.42982 | -0.22032 | -1.4E-16 | 0.220322 | 0.429815 | 0.618186 | 0.776175 |
| 5.5 | -0.97183 | -0.89602 | -0.77618 | -0.61819 | -0.42982 | -0.22032 | -2.8E-16 | 0.220322 | 0.429815 | 0.618186 | 0.776175 | 0.896019 |
| 6.5 | -0.89602 | -0.77618 | -0.61819 | -0.42982 | -0.22032 | -2.8E-16 | 0.220322 | 0.429815 | 0.618186 | 0.776175 | 0.896019 | 0.971828 |
| 7.5 | -0.77618 | -0.61819 | -0.42982 | -0.22032 | -2.8E-16 | 0.220322 | 0.429815 | 0.618186 | 0.776175 | 0.896019 | 0.971828 | 0.999875 |
| 8.5 | -0.61819 | -0.42982 | -0.22032 | -2.8E-16 | 0.220322 | 0.429815 | 0.618186 | 0.776175 | 0.896019 | 0.971828 | 0.999875 | 0.978784 |
| 9.5 | -0.42982 | -0.22032 | -2.8E-16 | 0.220322 | 0.429815 | 0.618186 | 0.776175 | 0.896019 | 0.971828 | 0.999875 | 0.978784 | 0.90959 |
| 10.5 | -0.22032 | -2.8E-16 | 0.220322 | 0.429815 | 0.618186 | 0.776175 | 0.896019 | 0.971828 | 0.999875 | 0.978784 | 0.90959 | 0.795693 |
| 11.5 | 0 | 0.220322 | 0.429815 | 0.618186 | 0.776175 | 0.896019 | 0.971828 | 0.999875 | 0.978784 | 0.90959 | 0.795693 | 0.642692 |

FIG. 13B

| | 0.5 | 1.5 | 2.5 | 3.5 | 4.5 | 5.5 | 6.5 | 7.5 | 8.5 | 9.5 | 10.5 | 11.5 |
|---|---|---|---|---|---|---|---|---|---|---|---|---|
| -11.5 | -0.64269 | -0.79569 | -0.90959 | -0.97878 | -0.99988 | -0.97183 | -0.89602 | -0.77618 | -0.61819 | -0.42982 | -0.22032 | 0 |
| -10.5 | -0.79569 | -0.90959 | -0.97878 | -0.99988 | -0.97183 | -0.89602 | -0.77618 | -0.61819 | -0.42982 | -0.22032 | 2.79E-16 | 0.220322 |
| -9.5 | -0.90959 | -0.97878 | -0.99988 | -0.97183 | -0.89602 | -0.77618 | -0.61819 | -0.42982 | -0.22032 | 2.79E-16 | 0.220322 | 0.429815 |
| -8.5 | -0.97878 | -0.99988 | -0.97183 | -0.89602 | -0.77618 | -0.61819 | -0.42982 | -0.22032 | 2.79E-16 | 0.220322 | 0.429815 | 0.618186 |
| -7.5 | -0.99988 | -0.97183 | -0.89602 | -0.77618 | -0.61819 | -0.42982 | -0.22032 | 2.79E-16 | 0.220322 | 0.429815 | 0.618186 | 0.776175 |
| -6.5 | -0.97183 | -0.89602 | -0.77618 | -0.61819 | -0.42982 | -0.22032 | 2.79E-16 | 0.220322 | 0.429815 | 0.618186 | 0.776175 | 0.896019 |
| -5.5 | -0.89602 | -0.77618 | -0.61819 | -0.42982 | -0.22032 | 2.79E-16 | 0.220322 | 0.429815 | 0.618186 | 0.776175 | 0.896019 | 0.971828 |
| -4.5 | -0.77618 | -0.61819 | -0.42982 | -0.22032 | 1.4E-16 | 0.220322 | 0.429815 | 0.618186 | 0.776175 | 0.896019 | 0.971828 | 0.999875 |
| -3.5 | -0.61819 | -0.42982 | -0.22032 | 1.4E-16 | 0.220322 | 0.429815 | 0.618186 | 0.776175 | 0.896019 | 0.971828 | 0.999875 | 0.978784 |
| -2.5 | -0.42982 | -0.22032 | 6.98E-17 | 0.220322 | 0.429815 | 0.618186 | 0.776175 | 0.896019 | 0.971828 | 0.999875 | 0.978784 | 0.90959 |
| -1.5 | -0.22032 | 6.98E-17 | 0.220322 | 0.429815 | 0.618186 | 0.776175 | 0.896019 | 0.971828 | 0.999875 | 0.978784 | 0.90959 | 0.795693 |
| -0.5 | 1.74E-17 | 0.220322 | 0.429815 | 0.618186 | 0.776175 | 0.896019 | 0.971828 | 0.999875 | 0.978784 | 0.90959 | 0.795693 | 0.642692 |
| 0.5 | 0.220322 | 0.429815 | 0.618186 | 0.776175 | 0.896019 | 0.971828 | 0.999875 | 0.978784 | 0.90959 | 0.795693 | 0.642692 | 0.458106 |
| 1.5 | 0.429815 | 0.618186 | 0.776175 | 0.896019 | 0.971828 | 0.999875 | 0.978784 | 0.90959 | 0.795693 | 0.642692 | 0.458106 | 0.251005 |
| 2.5 | 0.618186 | 0.776175 | 0.896019 | 0.971828 | 0.999875 | 0.978784 | 0.90959 | 0.795693 | 0.642692 | 0.458106 | 0.251005 | 0.031569 |
| 3.5 | 0.776175 | 0.896019 | 0.971828 | 0.999875 | 0.978784 | 0.90959 | 0.795693 | 0.642692 | 0.458106 | 0.251005 | 0.031569 | -0.18942 |
| 4.5 | 0.896019 | 0.971828 | 0.999875 | 0.978784 | 0.90959 | 0.795693 | 0.642692 | 0.458106 | 0.251005 | 0.031569 | -0.18942 | -0.4011 |
| 5.5 | 0.971828 | 0.999875 | 0.978784 | 0.90959 | 0.795693 | 0.642692 | 0.458106 | 0.251005 | 0.031569 | -0.18942 | -0.4011 | -0.59306 |
| 6.5 | 0.999875 | 0.978784 | 0.90959 | 0.795693 | 0.642692 | 0.458106 | 0.251005 | 0.031569 | -0.18942 | -0.4011 | -0.59306 | -0.75588 |
| 7.5 | 0.978784 | 0.90959 | 0.795693 | 0.642692 | 0.458106 | 0.251005 | 0.031569 | -0.18942 | -0.4011 | -0.59306 | -0.75588 | -0.88156 |
| 8.5 | 0.90959 | 0.795693 | 0.642692 | 0.458106 | 0.251005 | 0.031569 | -0.18942 | -0.4011 | -0.59306 | -0.75588 | -0.88156 | -0.9639 |
| 9.5 | 0.795693 | 0.642692 | 0.458106 | 0.251005 | 0.031569 | -0.18942 | -0.4011 | -0.59306 | -0.75588 | -0.88156 | -0.9639 | -0.99888 |
| 10.5 | 0.642692 | 0.458106 | 0.251005 | 0.031569 | -0.18942 | -0.4011 | -0.59306 | -0.75588 | -0.88156 | -0.9639 | -0.99888 | -0.98476 |
| 11.5 | 0.458106 | 0.251005 | 0.031569 | -0.18942 | -0.4011 | -0.59306 | -0.75588 | -0.88156 | -0.9639 | -0.99888 | -0.98476 | -0.92225 |

FIG. 13C

| | -11.5 | -10.5 | -9.5 | -8.5 | -7.5 | -6.5 | -5.5 | -4.5 | -3.5 | -2.5 | -1.5 | -0.5 |
|---|---|---|---|---|---|---|---|---|---|---|---|---|
| -11.5 | 0 | -0.22032 | -0.42982 | -0.61819 | -0.77618 | -0.89602 | -0.97183 | -0.99988 | -0.97878 | -0.90959 | -0.79569 | -0.64269 |
| -10.5 | 0.220322 | -2.8E-16 | -0.22032 | -0.42982 | -0.61819 | -0.77618 | -0.89602 | -0.97183 | -0.99988 | -0.97878 | -0.90959 | -0.79569 |
| -9.5 | 0.429815 | 0.220322 | -2.8E-16 | -0.22032 | -0.42982 | -0.61819 | -0.77618 | -0.89602 | -0.97183 | -0.99988 | -0.97878 | -0.90959 |
| -8.5 | 0.618186 | 0.429815 | 0.220322 | -2.8E-16 | -0.22032 | -0.42982 | -0.61819 | -0.77618 | -0.89602 | -0.97183 | -0.99988 | -0.97878 |
| -7.5 | 0.776175 | 0.618186 | 0.429815 | 0.220322 | -2.8E-16 | -0.22032 | -0.42982 | -0.61819 | -0.77618 | -0.89602 | -0.97183 | -0.99988 |
| -6.5 | 0.896019 | 0.776175 | 0.618186 | 0.429815 | 0.220322 | -2.8E-16 | -0.22032 | -0.42982 | -0.61819 | -0.77618 | -0.89602 | -0.97183 |
| -5.5 | 0.971828 | 0.896019 | 0.776175 | 0.618186 | 0.429815 | 0.220322 | -2.8E-16 | -0.22032 | -0.42982 | -0.61819 | -0.77618 | -0.89602 |
| -4.5 | 0.999875 | 0.971828 | 0.896019 | 0.776175 | 0.618186 | 0.429815 | 0.220322 | -1.4E-16 | -0.22032 | -0.42982 | -0.61819 | -0.77618 |
| -3.5 | 0.978784 | 0.999875 | 0.971828 | 0.896019 | 0.776175 | 0.618186 | 0.429815 | 0.220322 | -1.4E-16 | -0.22032 | -0.42982 | -0.61819 |
| -2.5 | 0.90959 | 0.978784 | 0.999875 | 0.971828 | 0.896019 | 0.776175 | 0.618186 | 0.429815 | 0.220322 | -7E-17 | -0.22032 | -0.42982 |
| -1.5 | 0.795693 | 0.90959 | 0.978784 | 0.999875 | 0.971828 | 0.896019 | 0.776175 | 0.618186 | 0.429815 | 0.220322 | -7E-17 | -0.22032 |
| -0.5 | 0.642692 | 0.795693 | 0.90959 | 0.978784 | 0.999875 | 0.971828 | 0.896019 | 0.776175 | 0.618186 | 0.429815 | 0.220322 | 1.74E-17 |
| 0.5 | 0.458106 | 0.642692 | 0.795693 | 0.90959 | 0.978784 | 0.999875 | 0.971828 | 0.896019 | 0.776175 | 0.618186 | 0.429815 | 0.220322 |
| 1.5 | 0.251005 | 0.458106 | 0.642692 | 0.795693 | 0.90959 | 0.978784 | 0.999875 | 0.971828 | 0.896019 | 0.776175 | 0.618186 | 0.429815 |
| 2.5 | 0.031569 | 0.251005 | 0.458106 | 0.642692 | 0.795693 | 0.90959 | 0.978784 | 0.999875 | 0.971828 | 0.896019 | 0.776175 | 0.618186 |
| 3.5 | -0.18942 | 0.031569 | 0.251005 | 0.458106 | 0.642692 | 0.795693 | 0.90959 | 0.978784 | 0.999875 | 0.971828 | 0.896019 | 0.776175 |
| 4.5 | -0.4011 | -0.18942 | 0.031569 | 0.251005 | 0.458106 | 0.642692 | 0.795693 | 0.90959 | 0.978784 | 0.999875 | 0.971828 | 0.896019 |
| 5.5 | -0.59306 | -0.4011 | -0.18942 | 0.031569 | 0.251005 | 0.458106 | 0.642692 | 0.795693 | 0.90959 | 0.978784 | 0.999875 | 0.971828 |
| 6.5 | -0.75588 | -0.59306 | -0.4011 | -0.18942 | 0.031569 | 0.251005 | 0.458106 | 0.642692 | 0.795693 | 0.90959 | 0.978784 | 0.999875 |
| 7.5 | -0.88156 | -0.75588 | -0.59306 | -0.4011 | -0.18942 | 0.031569 | 0.251005 | 0.458106 | 0.642692 | 0.795693 | 0.90959 | 0.978784 |
| 8.5 | -0.9639 | -0.88156 | -0.75588 | -0.59306 | -0.4011 | -0.18942 | 0.031569 | 0.251005 | 0.458106 | 0.642692 | 0.795693 | 0.90959 |
| 9.5 | -0.99888 | -0.9639 | -0.88156 | -0.75588 | -0.59306 | -0.4011 | -0.18942 | 0.031569 | 0.251005 | 0.458106 | 0.642692 | 0.795693 |
| 10.5 | -0.98476 | -0.99888 | -0.9639 | -0.88156 | -0.75588 | -0.59306 | -0.4011 | -0.18942 | 0.031569 | 0.251005 | 0.458106 | 0.642692 |
| 11.5 | -0.92225 | -0.98476 | -0.99888 | -0.9639 | -0.88156 | -0.75588 | -0.59306 | -0.4011 | -0.18942 | 0.031569 | 0.251005 | 0.458106 |

FIG. 13D

| | 0.5 | 1.5 | 2.5 | 3.5 | 4.5 | 5.5 | 6.5 | 7.5 | 8.5 | 9.5 | 10.5 | 11.5 |
|---|---|---|---|---|---|---|---|---|---|---|---|---|
| | -0.45811 | -0.25101 | -0.03157 | 0.189418 | 0.401097 | 0.593063 | 0.755883 | 0.881555 | 0.963903 | 0.998879 | 0.984764 | 0.922254 |
| | -0.64269 | -0.45811 | -0.25101 | -0.03157 | 0.189418 | 0.401097 | 0.593063 | 0.755883 | 0.881555 | 0.963903 | 0.998879 | 0.984764 |
| | -0.79569 | -0.64269 | -0.45811 | -0.25101 | -0.03157 | 0.189418 | 0.401097 | 0.593063 | 0.755883 | 0.881555 | 0.963903 | 0.998879 |
| | -0.90959 | -0.79569 | -0.64269 | -0.45811 | -0.25101 | -0.03157 | 0.189418 | 0.401097 | 0.593063 | 0.755883 | 0.881555 | 0.963903 |
| | -0.97878 | -0.90959 | -0.79569 | -0.64269 | -0.45811 | -0.25101 | -0.03157 | 0.189418 | 0.401097 | 0.593063 | 0.755883 | 0.881555 |
| | -0.99988 | -0.97878 | -0.90959 | -0.79569 | -0.64269 | -0.45811 | -0.25101 | -0.03157 | 0.189418 | 0.401097 | 0.593063 | 0.755883 |
| | -0.97183 | -0.99988 | -0.97878 | -0.90959 | -0.79569 | -0.64269 | -0.45811 | -0.25101 | -0.03157 | 0.189418 | 0.401097 | 0.593063 |
| | -0.89602 | -0.97183 | -0.99988 | -0.97878 | -0.90959 | -0.79569 | -0.64269 | -0.45811 | -0.25101 | -0.03157 | 0.189418 | 0.401097 |
| | -0.77618 | -0.89602 | -0.97183 | -0.99988 | -0.97878 | -0.90959 | -0.79569 | -0.64269 | -0.45811 | -0.25101 | -0.03157 | 0.189418 |
| | -0.61819 | -0.77618 | -0.89602 | -0.97183 | -0.99988 | -0.97878 | -0.90959 | -0.79569 | -0.64269 | -0.45811 | -0.25101 | -0.03157 |
| | -0.42982 | -0.61819 | -0.77618 | -0.89602 | -0.97183 | -0.99988 | -0.97878 | -0.90959 | -0.79569 | -0.64269 | -0.45811 | -0.25101 |
| | -0.22032 | -0.42982 | -0.61819 | -0.77618 | -0.89602 | -0.97183 | -0.99988 | -0.97878 | -0.90959 | -0.79569 | -0.64269 | -0.45811 |
| | 1.74E-17 | -0.22032 | -0.42982 | -0.61819 | -0.77618 | -0.89602 | -0.97183 | -0.99988 | -0.97878 | -0.90959 | -0.79569 | -0.64269 |
| | 0.220322 | 6.98E-17 | -0.22032 | -0.42982 | -0.61819 | -0.77618 | -0.89602 | -0.97183 | -0.99988 | -0.97878 | -0.90959 | -0.79569 |
| | 0.429815 | 0.220322 | 6.98E-17 | -0.22032 | -0.42982 | -0.61819 | -0.77618 | -0.89602 | -0.97183 | -0.99988 | -0.97878 | -0.90959 |
| | 0.618186 | 0.429815 | 0.220322 | 1.4E-16 | -0.22032 | -0.42982 | -0.61819 | -0.77618 | -0.89602 | -0.97183 | -0.99988 | -0.97878 |
| | 0.776175 | 0.618186 | 0.429815 | 0.220322 | 1.4E-16 | -0.22032 | -0.42982 | -0.61819 | -0.77618 | -0.89602 | -0.97183 | -0.99988 |
| | 0.896019 | 0.776175 | 0.618186 | 0.429815 | 0.220322 | 2.79E-16 | -0.22032 | -0.42982 | -0.61819 | -0.77618 | -0.89602 | -0.97183 |
| | 0.971828 | 0.896019 | 0.776175 | 0.618186 | 0.429815 | 0.220322 | 2.79E-16 | -0.22032 | -0.42982 | -0.61819 | -0.77618 | -0.89602 |
| | 0.999875 | 0.971828 | 0.896019 | 0.776175 | 0.618186 | 0.429815 | 0.220322 | 2.79E-16 | -0.22032 | -0.42982 | -0.61819 | -0.77618 |
| | 0.978784 | 0.999875 | 0.971828 | 0.896019 | 0.776175 | 0.618186 | 0.429815 | 0.220322 | 2.79E-16 | -0.22032 | -0.42982 | -0.61819 |
| | 0.90959 | 0.978784 | 0.999875 | 0.971828 | 0.896019 | 0.776175 | 0.618186 | 0.429815 | 0.220322 | 2.79E-16 | -0.22032 | -0.42982 |
| | 0.795693 | 0.90959 | 0.978784 | 0.999875 | 0.971828 | 0.896019 | 0.776175 | 0.618186 | 0.429815 | 0.220322 | 2.79E-16 | -0.22032 |
| | 0.642692 | 0.795693 | 0.90959 | 0.978784 | 0.999875 | 0.971828 | 0.896019 | 0.776175 | 0.618186 | 0.429815 | 0.220322 | 0 |

FIG. 14A

|       | -11.5    | -10.5    | -9.5     | -8.5     | -7.5     | -6.5     | -5.5     | -4.5     | -3.5     | -2.5     | -1.5     | -0.5     |
|-------|----------|----------|----------|----------|----------|----------|----------|----------|----------|----------|----------|----------|
| -11.5 | 0.386586 | 0.173894 | -0.04734 | -0.26626 | -0.47208 | -0.65471 | -0.80516 | -0.91604 | -0.9819  | -0.9995  | -0.96799 | -0.8889  |
| -10.5 | 0.173894 | -0.04734 | -0.26626 | -0.47208 | -0.65471 | -0.80516 | -0.91604 | -0.9819  | -0.9995  | -0.96799 | -0.8889  | -0.76612 |
| -9.5  | -0.04734 | -0.26626 | -0.47208 | -0.65471 | -0.80516 | -0.91604 | -0.9819  | -0.9995  | -0.96799 | -0.8889  | -0.76612 | -0.6057  |
| -8.5  | -0.26626 | -0.47208 | -0.65471 | -0.80516 | -0.91604 | -0.9819  | -0.9995  | -0.96799 | -0.8889  | -0.76612 | -0.6057  | -0.41551 |
| -7.5  | -0.47208 | -0.65471 | -0.80516 | -0.91604 | -0.9819  | -0.9995  | -0.96799 | -0.8889  | -0.76612 | -0.6057  | -0.41551 | -0.2049  |
| -6.5  | -0.65471 | -0.80516 | -0.91604 | -0.9819  | -0.9995  | -0.96799 | -0.8889  | -0.76612 | -0.6057  | -0.41551 | -0.2049  | 0.015787 |
| -5.5  | -0.80516 | -0.91604 | -0.9819  | -0.9995  | -0.96799 | -0.8889  | -0.76612 | -0.6057  | -0.41551 | -0.2049  | 0.015787 | 0.235693 |
| -4.5  | -0.91604 | -0.9819  | -0.9995  | -0.96799 | -0.8889  | -0.76612 | -0.6057  | -0.41551 | -0.2049  | 0.015787 | 0.235693 | 0.444016 |
| -3.5  | -0.9819  | -0.9995  | -0.96799 | -0.8889  | -0.76612 | -0.6057  | -0.41551 | -0.2049  | 0.015787 | 0.235693 | 0.444016 | 0.630517 |
| -2.5  | -0.9995  | -0.96799 | -0.8889  | -0.76612 | -0.6057  | -0.41551 | -0.2049  | 0.015787 | 0.235693 | 0.444016 | 0.630517 | 0.786032 |
| -1.5  | -0.96799 | -0.8889  | -0.76612 | -0.6057  | -0.41551 | -0.2049  | 0.015787 | 0.235693 | 0.444016 | 0.630517 | 0.786032 | 0.902917 |
| -0.5  | -0.8889  | -0.76612 | -0.6057  | -0.41551 | -0.2049  | 0.015787 | 0.235693 | 0.444016 | 0.630517 | 0.786032 | 0.902917 | 0.975427 |
| 0.5   | -0.76612 | -0.6057  | -0.41551 | -0.2049  | 0.015787 | 0.235693 | 0.444016 | 0.630517 | 0.786032 | 0.902917 | 0.975427 | 1        |
| 1.5   | -0.6057  | -0.41551 | -0.2049  | 0.015787 | 0.235693 | 0.444016 | 0.630517 | 0.786032 | 0.902917 | 0.975427 | 1        | 0.975427 |
| 2.5   | -0.41551 | -0.2049  | 0.015787 | 0.235693 | 0.444016 | 0.630517 | 0.786032 | 0.902917 | 0.975427 | 1        | 0.975427 | 0.902917 |
| 3.5   | -0.2049  | 0.015787 | 0.235693 | 0.444016 | 0.630517 | 0.786032 | 0.902917 | 0.975427 | 1        | 0.975427 | 0.902917 | 0.786032 |
| 4.5   | 0.015787 | 0.235693 | 0.444016 | 0.630517 | 0.786032 | 0.902917 | 0.975427 | 1        | 0.975427 | 0.902917 | 0.786032 | 0.630517 |
| 5.5   | 0.235693 | 0.444016 | 0.630517 | 0.786032 | 0.902917 | 0.975427 | 1        | 0.975427 | 0.902917 | 0.786032 | 0.630517 | 0.444016 |
| 6.5   | 0.444016 | 0.630517 | 0.786032 | 0.902917 | 0.975427 | 1        | 0.975427 | 0.902917 | 0.786032 | 0.630517 | 0.444016 | 0.235693 |
| 7.5   | 0.630517 | 0.786032 | 0.902917 | 0.975427 | 1        | 0.975427 | 0.902917 | 0.786032 | 0.630517 | 0.444016 | 0.235693 | 0.015787 |
| 8.5   | 0.786032 | 0.902917 | 0.975427 | 1        | 0.975427 | 0.902917 | 0.786032 | 0.630517 | 0.444016 | 0.235693 | 0.015787 | -0.2049  |
| 9.5   | 0.902917 | 0.975427 | 1        | 0.975427 | 0.902917 | 0.786032 | 0.630517 | 0.444016 | 0.235693 | 0.015787 | -0.2049  | -0.41551 |
| 10.5  | 0.975427 | 1        | 0.975427 | 0.902917 | 0.786032 | 0.630517 | 0.444016 | 0.235693 | 0.015787 | -0.2049  | -0.41551 | -0.6057  |
| 11.5  | 1        | 0.975427 | 0.902917 | 0.786032 | 0.630517 | 0.444016 | 0.235693 | 0.015787 | -0.2049  | -0.41551 | -0.6057  | -0.76612 |

FIG. 14B

| | 0.5 | 1.5 | 2.5 | 3.5 | 4.5 | 5.5 | 6.5 | 7.5 | 8.5 | 9.5 | 10.5 | 11.5 |
|---|---|---|---|---|---|---|---|---|---|---|---|---|
| -11.5 | -0.76612 | -0.6057 | -0.41551 | -0.2049 | 0.015787 | 0.235693 | 0.444016 | 0.630517 | 0.786032 | 0.902917 | 0.975427 | 1 |
| -10.5 | -0.6057 | -0.41551 | -0.2049 | 0.015787 | 0.235693 | 0.444016 | 0.630517 | 0.786032 | 0.902917 | 0.975427 | 1 | 0.975427 |
| -9.5 | -0.41551 | -0.2049 | 0.015787 | 0.235693 | 0.444016 | 0.630517 | 0.786032 | 0.902917 | 0.975427 | 1 | 0.975427 | 0.902917 |
| -8.5 | -0.2049 | 0.015787 | 0.235693 | 0.444016 | 0.630517 | 0.786032 | 0.902917 | 0.975427 | 1 | 0.975427 | 0.902917 | 0.786032 |
| -7.5 | 0.015787 | 0.235693 | 0.444016 | 0.630517 | 0.786032 | 0.902917 | 0.975427 | 1 | 0.975427 | 0.902917 | 0.786032 | 0.630517 |
| -6.5 | 0.235693 | 0.444016 | 0.630517 | 0.786032 | 0.902917 | 0.975427 | 1 | 0.975427 | 0.902917 | 0.786032 | 0.630517 | 0.444016 |
| -5.5 | 0.444016 | 0.630517 | 0.786032 | 0.902917 | 0.975427 | 1 | 0.975427 | 0.902917 | 0.786032 | 0.630517 | 0.444016 | 0.235693 |
| -4.5 | 0.630517 | 0.786032 | 0.902917 | 0.975427 | 1 | 0.975427 | 0.902917 | 0.786032 | 0.630517 | 0.444016 | 0.235693 | 0.015787 |
| -3.5 | 0.786032 | 0.902917 | 0.975427 | 1 | 0.975427 | 0.902917 | 0.786032 | 0.630517 | 0.444016 | 0.235693 | 0.015787 | -0.2049 |
| -2.5 | 0.902917 | 0.975427 | 1 | 0.975427 | 0.902917 | 0.786032 | 0.630517 | 0.444016 | 0.235693 | 0.015787 | -0.2049 | -0.41551 |
| -1.5 | 0.975427 | 1 | 0.975427 | 0.902917 | 0.786032 | 0.630517 | 0.444016 | 0.235693 | 0.015787 | -0.2049 | -0.41551 | -0.6057 |
| -0.5 | 1 | 0.975427 | 0.902917 | 0.786032 | 0.630517 | 0.444016 | 0.235693 | 0.015787 | -0.2049 | -0.41551 | -0.6057 | -0.76612 |
| 0.5 | 0.975427 | 0.902917 | 0.786032 | 0.630517 | 0.444016 | 0.235693 | 0.015787 | -0.2049 | -0.41551 | -0.6057 | -0.76612 | -0.8889 |
| 1.5 | 0.902917 | 0.786032 | 0.630517 | 0.444016 | 0.235693 | 0.015787 | -0.2049 | -0.41551 | -0.6057 | -0.76612 | -0.8889 | -0.96799 |
| 2.5 | 0.786032 | 0.630517 | 0.444016 | 0.235693 | 0.015787 | -0.2049 | -0.41551 | -0.6057 | -0.76612 | -0.8889 | -0.96799 | -0.9995 |
| 3.5 | 0.630517 | 0.444016 | 0.235693 | 0.015787 | -0.2049 | -0.41551 | -0.6057 | -0.76612 | -0.8889 | -0.96799 | -0.9995 | -0.9819 |
| 4.5 | 0.444016 | 0.235693 | 0.015787 | -0.2049 | -0.41551 | -0.6057 | -0.76612 | -0.8889 | -0.96799 | -0.9995 | -0.9819 | -0.91604 |
| 5.5 | 0.235693 | 0.015787 | -0.2049 | -0.41551 | -0.6057 | -0.76612 | -0.8889 | -0.96799 | -0.9995 | -0.9819 | -0.91604 | -0.80516 |
| 6.5 | 0.015787 | -0.2049 | -0.41551 | -0.6057 | -0.76612 | -0.8889 | -0.96799 | -0.9995 | -0.9819 | -0.91604 | -0.80516 | -0.65471 |
| 7.5 | -0.2049 | -0.41551 | -0.6057 | -0.76612 | -0.8889 | -0.96799 | -0.9995 | -0.9819 | -0.91604 | -0.80516 | -0.65471 | -0.47208 |
| 8.5 | -0.41551 | -0.6057 | -0.76612 | -0.8889 | -0.96799 | -0.9995 | -0.9819 | -0.91604 | -0.80516 | -0.65471 | -0.47208 | -0.26626 |
| 9.5 | -0.6057 | -0.76612 | -0.8889 | -0.96799 | -0.9995 | -0.9819 | -0.91604 | -0.80516 | -0.65471 | -0.47208 | -0.26626 | -0.04734 |
| 10.5 | -0.76612 | -0.8889 | -0.96799 | -0.9995 | -0.9819 | -0.91604 | -0.80516 | -0.65471 | -0.47208 | -0.26626 | -0.04734 | 0.173894 |
| 11.5 | -0.8889 | -0.96799 | -0.9995 | -0.9819 | -0.91604 | -0.80516 | -0.65471 | -0.47208 | -0.26626 | -0.04734 | 0.173894 | 0.386586 |

FIG. 14C

| | -11.5 | -10.5 | -9.5 | -8.5 | -7.5 | -6.5 | -5.5 | -4.5 | -3.5 | -2.5 | -1.5 | -0.5 |
|---|---|---|---|---|---|---|---|---|---|---|---|---|
| -11.5 | 1 | 0.975427 | 0.902917 | 0.786032 | 0.630517 | 0.444016 | 0.235693 | 0.015787 | -0.2049 | -0.41551 | -0.6057 | -0.76612 |
| -10.5 | 0.975427 | 1 | 0.975427 | 0.902917 | 0.786032 | 0.630517 | 0.444016 | 0.235693 | 0.015787 | -0.2049 | -0.41551 | -0.6057 |
| -9.5 | 0.902917 | 0.975427 | 1 | 0.975427 | 0.902917 | 0.786032 | 0.630517 | 0.444016 | 0.235693 | 0.015787 | -0.2049 | -0.41551 |
| -8.5 | 0.786032 | 0.902917 | 0.975427 | 1 | 0.975427 | 0.902917 | 0.786032 | 0.630517 | 0.444016 | 0.235693 | 0.015787 | -0.2049 |
| -7.5 | 0.630517 | 0.786032 | 0.902917 | 0.975427 | 1 | 0.975427 | 0.902917 | 0.786032 | 0.630517 | 0.444016 | 0.235693 | 0.015787 |
| -6.5 | 0.444016 | 0.630517 | 0.786032 | 0.902917 | 0.975427 | 1 | 0.975427 | 0.902917 | 0.786032 | 0.630517 | 0.444016 | 0.235693 |
| -5.5 | 0.235693 | 0.444016 | 0.630517 | 0.786032 | 0.902917 | 0.975427 | 1 | 0.975427 | 0.902917 | 0.786032 | 0.630517 | 0.444016 |
| -4.5 | 0.015787 | 0.235693 | 0.444016 | 0.630517 | 0.786032 | 0.902917 | 0.975427 | 1 | 0.975427 | 0.902917 | 0.786032 | 0.630517 |
| -3.5 | -0.2049 | 0.015787 | 0.235693 | 0.444016 | 0.630517 | 0.786032 | 0.902917 | 0.975427 | 1 | 0.975427 | 0.902917 | 0.786032 |
| -2.5 | -0.41551 | -0.2049 | 0.015787 | 0.235693 | 0.444016 | 0.630517 | 0.786032 | 0.902917 | 0.975427 | 1 | 0.975427 | 0.902917 |
| -1.5 | -0.6057 | -0.41551 | -0.2049 | 0.015787 | 0.235693 | 0.444016 | 0.630517 | 0.786032 | 0.902917 | 0.975427 | 1 | 0.975427 |
| -0.5 | -0.76612 | -0.6057 | -0.41551 | -0.2049 | 0.015787 | 0.235693 | 0.444016 | 0.630517 | 0.786032 | 0.902917 | 0.975427 | 1 |
| 0.5 | -0.8889 | -0.76612 | -0.6057 | -0.41551 | -0.2049 | 0.015787 | 0.235693 | 0.444016 | 0.630517 | 0.786032 | 0.902917 | 0.975427 |
| 1.5 | -0.96799 | -0.8889 | -0.76612 | -0.6057 | -0.41551 | -0.2049 | 0.015787 | 0.235693 | 0.444016 | 0.630517 | 0.786032 | 0.902917 |
| 2.5 | -0.9995 | -0.96799 | -0.8889 | -0.76612 | -0.6057 | -0.41551 | -0.2049 | 0.015787 | 0.235693 | 0.444016 | 0.630517 | 0.786032 |
| 3.5 | -0.9819 | -0.9995 | -0.96799 | -0.8889 | -0.76612 | -0.6057 | -0.41551 | -0.2049 | 0.015787 | 0.235693 | 0.444016 | 0.630517 |
| 4.5 | -0.91604 | -0.9819 | -0.9995 | -0.96799 | -0.8889 | -0.76612 | -0.6057 | -0.41551 | -0.2049 | 0.015787 | 0.235693 | 0.444016 |
| 5.5 | -0.80516 | -0.91604 | -0.9819 | -0.9995 | -0.96799 | -0.8889 | -0.76612 | -0.6057 | -0.41551 | -0.2049 | 0.015787 | 0.235693 |
| 6.5 | -0.65471 | -0.80516 | -0.91604 | -0.9819 | -0.9995 | -0.96799 | -0.8889 | -0.76612 | -0.6057 | -0.41551 | -0.2049 | 0.015787 |
| 7.5 | -0.47208 | -0.65471 | -0.80516 | -0.91604 | -0.9819 | -0.9995 | -0.96799 | -0.8889 | -0.76612 | -0.6057 | -0.41551 | -0.2049 |
| 8.5 | -0.26626 | -0.47208 | -0.65471 | -0.80516 | -0.91604 | -0.9819 | -0.9995 | -0.96799 | -0.8889 | -0.76612 | -0.6057 | -0.41551 |
| 9.5 | -0.04734 | -0.26626 | -0.47208 | -0.65471 | -0.80516 | -0.91604 | -0.9819 | -0.9995 | -0.96799 | -0.8889 | -0.76612 | -0.6057 |
| 10.5 | 0.173894 | -0.04734 | -0.26626 | -0.47208 | -0.65471 | -0.80516 | -0.91604 | -0.9819 | -0.9995 | -0.96799 | -0.8889 | -0.76612 |
| 11.5 | 0.386586 | 0.173894 | -0.04734 | -0.26626 | -0.47208 | -0.65471 | -0.80516 | -0.91604 | -0.9819 | -0.9995 | -0.96799 | -0.8889 |

| | 0.5 | 1.5 | 2.5 | 3.5 | 4.5 | 5.5 | 6.5 | 7.5 | 8.5 | 9.5 | 10.5 | 11.5 |
|---|---|---|---|---|---|---|---|---|---|---|---|---|
| | -0.8889 | -0.96799 | -0.9995 | -0.9819 | -0.91604 | -0.80516 | -0.65471 | -0.47208 | -0.26626 | -0.04734 | 0.173894 | 0.386586 |
| | -0.76612 | -0.8889 | -0.96799 | -0.9995 | -0.9819 | -0.91604 | -0.80516 | -0.65471 | -0.47208 | -0.26626 | -0.04734 | 0.173894 |
| | -0.6057 | -0.76612 | -0.8889 | -0.96799 | -0.9995 | -0.9819 | -0.91604 | -0.80516 | -0.65471 | -0.47208 | -0.26626 | -0.04734 |
| | -0.41551 | -0.6057 | -0.76612 | -0.8889 | -0.96799 | -0.9995 | -0.9819 | -0.91604 | -0.80516 | -0.65471 | -0.47208 | -0.26626 |
| | -0.2049 | -0.41551 | -0.6057 | -0.76612 | -0.8889 | -0.96799 | -0.9995 | -0.9819 | -0.91604 | -0.80516 | -0.65471 | -0.47208 |
| | 0.015787 | -0.2049 | -0.41551 | -0.6057 | -0.76612 | -0.8889 | -0.96799 | -0.9995 | -0.9819 | -0.91604 | -0.80516 | -0.65471 |
| | 0.235693 | 0.015787 | -0.2049 | -0.41551 | -0.6057 | -0.76612 | -0.8889 | -0.96799 | -0.9995 | -0.9819 | -0.91604 | -0.80516 |
| | 0.444016 | 0.235693 | 0.015787 | -0.2049 | -0.41551 | -0.6057 | -0.76612 | -0.8889 | -0.96799 | -0.9995 | -0.9819 | -0.91604 |
| | 0.630517 | 0.444016 | 0.235693 | 0.015787 | -0.2049 | -0.41551 | -0.6057 | -0.76612 | -0.8889 | -0.96799 | -0.9995 | -0.9819 |
| | 0.786032 | 0.630517 | 0.444016 | 0.235693 | 0.015787 | -0.2049 | -0.41551 | -0.6057 | -0.76612 | -0.8889 | -0.96799 | -0.9995 |
| | 0.902917 | 0.786032 | 0.630517 | 0.444016 | 0.235693 | 0.015787 | -0.2049 | -0.41551 | -0.6057 | -0.76612 | -0.8889 | -0.96799 |
| | 0.975427 | 0.902917 | 0.786032 | 0.630517 | 0.444016 | 0.235693 | 0.015787 | -0.2049 | -0.41551 | -0.6057 | -0.76612 | -0.8889 |
| | 1 | 0.975427 | 0.902917 | 0.786032 | 0.630517 | 0.444016 | 0.235693 | 0.015787 | -0.2049 | -0.41551 | -0.6057 | -0.76612 |
| | 0.975427 | 1 | 0.975427 | 0.902917 | 0.786032 | 0.630517 | 0.444016 | 0.235693 | 0.015787 | -0.2049 | -0.41551 | -0.6057 |
| | 0.902917 | 0.975427 | 1 | 0.975427 | 0.902917 | 0.786032 | 0.630517 | 0.444016 | 0.235693 | 0.015787 | -0.2049 | -0.41551 |
| | 0.786032 | 0.902917 | 0.975427 | 1 | 0.975427 | 0.902917 | 0.786032 | 0.630517 | 0.444016 | 0.235693 | 0.015787 | -0.2049 |
| | 0.630517 | 0.786032 | 0.902917 | 0.975427 | 1 | 0.975427 | 0.902917 | 0.786032 | 0.630517 | 0.444016 | 0.235693 | 0.015787 |
| | 0.444016 | 0.630517 | 0.786032 | 0.902917 | 0.975427 | 1 | 0.975427 | 0.902917 | 0.786032 | 0.630517 | 0.444016 | 0.235693 |
| | 0.235693 | 0.444016 | 0.630517 | 0.786032 | 0.902917 | 0.975427 | 1 | 0.975427 | 0.902917 | 0.786032 | 0.630517 | 0.444016 |
| | 0.015787 | 0.235693 | 0.444016 | 0.630517 | 0.786032 | 0.902917 | 0.975427 | 1 | 0.975427 | 0.902917 | 0.786032 | 0.630517 |
| | -0.2049 | 0.015787 | 0.235693 | 0.444016 | 0.630517 | 0.786032 | 0.902917 | 0.975427 | 1 | 0.975427 | 0.902917 | 0.786032 |
| | -0.41551 | -0.2049 | 0.015787 | 0.235693 | 0.444016 | 0.630517 | 0.786032 | 0.902917 | 0.975427 | 1 | 0.975427 | 0.902917 |
| | -0.6057 | -0.41551 | -0.2049 | 0.015787 | 0.235693 | 0.444016 | 0.630517 | 0.786032 | 0.902917 | 0.975427 | 1 | 0.975427 |
| | -0.76612 | -0.6057 | -0.41551 | -0.2049 | 0.015787 | 0.235693 | 0.444016 | 0.630517 | 0.786032 | 0.902917 | 0.975427 | 1 |

| | -11.5 | -10.5 | -9.5 | -8.5 | -7.5 | -6.5 | -5.5 | -4.5 | -3.5 | -2.5 | -1.5 | -0.5 |
|---|---|---|---|---|---|---|---|---|---|---|---|---|
| -11.5 | -0.91942 | -0.90527 | -0.28503 | 0.52604 | 0.984921 | 0.784382 | 0.058688 | -0.7063 | -0.99841 | -0.62207 | 0.170756 | 0.849256 |
| -10.5 | -0.99985 | -0.65224 | 0.132062 | 0.827941 | 0.969502 | 0.461966 | -0.35486 | -0.93411 | -0.88795 | -0.2473 | 0.558922 | 0.990937 |
| -9.5 | -0.90527 | -0.28503 | 0.52604 | 0.984921 | 0.784382 | 0.058688 | -0.7063 | -0.99841 | -0.62207 | 0.170756 | 0.849256 | 0.959167 |
| -8.5 | -0.65224 | 0.132062 | 0.827941 | 0.969502 | 0.461966 | -0.35486 | -0.93411 | -0.88795 | -0.2473 | 0.558922 | 0.990937 | 0.759505 |
| -7.5 | -0.28503 | 0.52604 | 0.984921 | 0.784382 | 0.058688 | -0.7063 | -0.99841 | -0.62207 | 0.170756 | 0.849256 | 0.959167 | 0.426901 |
| -6.5 | 0.132062 | 0.827941 | 0.969502 | 0.461966 | -0.35486 | -0.93411 | -0.88795 | -0.2473 | 0.558922 | 0.990937 | 0.759505 | 0.019573 |
| -5.5 | 0.52604 | 0.984921 | 0.784382 | 0.058688 | -0.7063 | -0.99841 | -0.62207 | 0.170756 | 0.849256 | 0.959167 | 0.426901 | -0.39118 |
| -4.5 | 0.827941 | 0.969502 | 0.461966 | -0.35486 | -0.93411 | -0.88795 | -0.2473 | 0.558922 | 0.990937 | 0.759505 | 0.019573 | -0.73346 |
| -3.5 | 0.984921 | 0.784382 | 0.058688 | -0.7063 | -0.99841 | -0.62207 | 0.170756 | 0.849256 | 0.959167 | 0.426901 | -0.39118 | -0.94736 |
| -2.5 | 0.969502 | 0.461966 | -0.35486 | -0.93411 | -0.88795 | -0.2473 | 0.558922 | 0.990937 | 0.759505 | 0.019573 | -0.73346 | -0.99544 |
| -1.5 | 0.784382 | 0.058688 | -0.7063 | -0.99841 | -0.62207 | 0.170756 | 0.849256 | 0.959167 | 0.426901 | -0.39118 | -0.94736 | -0.86927 |
| -0.5 | 0.461966 | -0.35486 | -0.93411 | -0.88795 | -0.2473 | 0.558922 | 0.990937 | 0.759505 | 0.019573 | -0.73346 | -0.99544 | -0.59095 |
| 0.5 | 0.058688 | -0.7063 | -0.99841 | -0.62207 | 0.170756 | 0.849256 | 0.959167 | 0.426901 | -0.39118 | -0.94736 | -0.86927 | -0.20919 |
| 1.5 | -0.35486 | -0.93411 | -0.88795 | -0.2473 | 0.558922 | 0.990937 | 0.759505 | 0.019573 | -0.73346 | -0.99544 | -0.59095 | 0.209188 |
| 2.5 | -0.7063 | -0.99841 | -0.62207 | 0.170756 | 0.849256 | 0.959167 | 0.426901 | -0.39118 | -0.94736 | -0.86927 | -0.20919 | 0.590948 |
| 3.5 | -0.93411 | -0.88795 | -0.2473 | 0.558922 | 0.990937 | 0.759505 | 0.019573 | -0.73346 | -0.99544 | -0.59095 | 0.209188 | 0.869269 |
| 4.5 | -0.99841 | -0.62207 | 0.170756 | 0.849256 | 0.959167 | 0.426901 | -0.39118 | -0.94736 | -0.86927 | -0.20919 | 0.590948 | 0.995435 |
| 5.5 | -0.88795 | -0.2473 | 0.558922 | 0.990937 | 0.759505 | 0.019573 | -0.73346 | -0.99544 | -0.59095 | 0.209188 | 0.869269 | 0.947362 |
| 6.5 | -0.62207 | 0.170756 | 0.849256 | 0.959167 | 0.426901 | -0.39118 | -0.94736 | -0.86927 | -0.20919 | 0.590948 | 0.995435 | 0.733464 |
| 7.5 | -0.2473 | 0.558922 | 0.990937 | 0.759505 | 0.019573 | -0.73346 | -0.99544 | -0.59095 | 0.209188 | 0.869269 | 0.947362 | 0.391181 |
| 8.5 | 0.170756 | 0.849256 | 0.959167 | 0.426901 | -0.39118 | -0.94736 | -0.86927 | -0.20919 | 0.590948 | 0.995435 | 0.733464 | -0.01957 |
| 9.5 | 0.558922 | 0.990937 | 0.759505 | 0.019573 | -0.73346 | -0.99544 | -0.59095 | 0.209188 | 0.869269 | 0.947362 | 0.391181 | -0.4269 |
| 10.5 | 0.849256 | 0.959167 | 0.426901 | -0.39118 | -0.94736 | -0.86927 | -0.20919 | 0.590948 | 0.995435 | 0.733464 | -0.01957 | -0.7595 |
| 11.5 | 0.990937 | 0.759505 | 0.019573 | -0.73346 | -0.99544 | -0.59095 | 0.209188 | 0.869269 | 0.947362 | 0.391181 | -0.4269 | -0.95917 |

FIG. 15B

|  | 0.5 | 1.5 | 2.5 | 3.5 | 4.5 | 5.5 | 6.5 | 7.5 | 8.5 | 9.5 | 10.5 | 11.5 |
|---|---|---|---|---|---|---|---|---|---|---|---|---|
| -11.5 | 0.959167 | 0.426901 | -0.39118 | -0.94736 | -0.86927 | -0.20919 | 0.590948 | 0.995435 | -0.73346 | -0.01957 | -0.7595 | -0.99094 |
| -10.5 | 0.759505 | 0.019573 | -0.73346 | -0.99544 | -0.59095 | 0.209188 | 0.869269 | 0.947362 | -0.73346 | -0.4269 | -0.95917 | -0.84926 |
| -9.5 | 0.426901 | -0.39118 | -0.94736 | -0.86927 | -0.20919 | 0.590948 | 0.995435 | -0.73346 | 0.391181 | -0.7595 | -0.99094 | -0.55892 |
| -8.5 | 0.019573 | -0.73346 | -0.99544 | -0.59095 | 0.209188 | 0.869269 | 0.947362 | -0.73346 | -0.01957 | -0.95917 | -0.84926 | -0.17076 |
| -7.5 | -0.39118 | -0.94736 | -0.86927 | -0.20919 | 0.590948 | 0.995435 | -0.73346 | 0.391181 | -0.4269 | -0.99094 | -0.55892 | 0.2473 |
| -6.5 | -0.73346 | -0.99544 | -0.59095 | 0.209188 | 0.869269 | 0.947362 | -0.73346 | -0.01957 | -0.7595 | -0.84926 | -0.17076 | 0.622068 |
| -5.5 | -0.94736 | -0.86927 | -0.20919 | 0.590948 | 0.995435 | -0.73346 | 0.391181 | -0.4269 | -0.95917 | -0.55892 | 0.2473 | 0.887951 |
| -4.5 | -0.99544 | -0.59095 | 0.209188 | 0.869269 | 0.947362 | -0.73346 | -0.01957 | -0.7595 | -0.99094 | -0.17076 | 0.622068 | 0.998408 |
| -3.5 | -0.86927 | -0.20919 | 0.590948 | 0.995435 | -0.73346 | 0.391181 | -0.4269 | -0.95917 | -0.84926 | 0.2473 | 0.887951 | 0.934105 |
| -2.5 | -0.59095 | 0.209188 | 0.869269 | 0.947362 | -0.73346 | -0.01957 | -0.7595 | -0.99094 | -0.55892 | 0.622068 | 0.998408 | 0.706299 |
| -1.5 | -0.20919 | 0.590948 | 0.995435 | -0.73346 | 0.391181 | -0.4269 | -0.95917 | -0.84926 | -0.17076 | 0.887951 | 0.934105 | 0.354862 |
| -0.5 | 0.209188 | 0.869269 | 0.947362 | -0.73346 | -0.01957 | -0.7595 | -0.99094 | -0.55892 | 0.2473 | 0.998408 | 0.706299 | -0.05869 |
| 0.5 | 0.590948 | 0.995435 | -0.73346 | 0.391181 | -0.4269 | -0.95917 | -0.84926 | -0.17076 | 0.622068 | 0.934105 | 0.354862 | -0.46197 |
| 1.5 | 0.869269 | 0.947362 | -0.73346 | -0.01957 | -0.7595 | -0.99094 | -0.55892 | 0.2473 | 0.887951 | 0.706299 | -0.05869 | -0.78438 |
| 2.5 | 0.995435 | -0.73346 | 0.391181 | -0.4269 | -0.95917 | -0.84926 | -0.17076 | 0.622068 | 0.998408 | 0.354862 | -0.46197 | -0.9695 |
| 3.5 | 0.947362 | 0.391181 | -0.01957 | -0.7595 | -0.99094 | -0.55892 | 0.2473 | 0.887951 | 0.934105 | -0.05869 | -0.78438 | -0.98492 |
| 4.5 | -0.73346 | -0.01957 | -0.4269 | -0.95917 | -0.84926 | -0.17076 | 0.622068 | 0.998408 | 0.706299 | -0.46197 | -0.9695 | -0.82794 |
| 5.5 | 0.391181 | -0.4269 | -0.7595 | -0.99094 | -0.55892 | 0.2473 | 0.887951 | 0.934105 | 0.354862 | -0.78438 | -0.98492 | -0.52604 |
| 6.5 | -0.01957 | -0.7595 | -0.95917 | -0.84926 | -0.17076 | 0.622068 | 0.998408 | 0.706299 | -0.05869 | -0.9695 | -0.82794 | -0.13206 |
| 7.5 | -0.4269 | -0.95917 | -0.99094 | -0.55892 | 0.2473 | 0.887951 | 0.934105 | 0.354862 | -0.46197 | -0.98492 | -0.52604 | 0.285033 |
| 8.5 | -0.7595 | -0.99094 | -0.84926 | -0.17076 | 0.622068 | 0.998408 | 0.706299 | -0.05869 | -0.78438 | -0.82794 | -0.13206 | 0.652235 |
| 9.5 | -0.95917 | -0.84926 | -0.55892 | 0.2473 | 0.887951 | 0.934105 | 0.354862 | -0.46197 | -0.9695 | -0.52604 | 0.285033 | 0.905271 |
| 10.5 | -0.99094 | -0.55892 | -0.17076 | 0.622068 | 0.998408 | 0.706299 | -0.05869 | -0.78438 | -0.98492 | -0.13206 | 0.652235 | 0.999851 |
| 11.5 | -0.84926 | -0.17076 | 0.2473 | 0.887951 | 0.934105 | 0.354862 | -0.46197 | -0.9695 | -0.82794 | 0.285033 | 0.905271 | 0.919417 |

FIG. 16A

| | -11.5 | -10.5 | -9.5 | -8.5 | -7.5 | -6.5 | -5.5 | -4.5 | -3.5 | -2.5 | -1.5 | -0.5 |
|---|---|---|---|---|---|---|---|---|---|---|---|---|
| -11.5 | 0.134326 | -0.14574 | -0.41437 | -0.6505 | -0.83561 | -0.95517 | -0.99981 | -0.96602 | -0.85647 | -0.67973 | -0.44967 | -0.18435 |
| -10.5 | -0.00576 | -0.28284 | -0.53773 | -0.75045 | -0.9043 | -0.98722 | -0.9927 | -0.92031 | -0.77574 | -0.57032 | -0.32017 | -0.0449 |
| -9.5 | -0.14574 | -0.41437 | -0.6505 | -0.83561 | -0.95517 | -0.99981 | -0.96602 | -0.85647 | -0.67973 | -0.44967 | -0.18435 | 0.09544 |
| -8.5 | -0.28284 | -0.53773 | -0.75045 | -0.9043 | -0.98722 | -0.9927 | -0.92031 | -0.77574 | -0.57032 | -0.32017 | -0.0449 | 0.233895 |
| -7.5 | -0.41437 | -0.6505 | -0.83561 | -0.95517 | -0.99981 | -0.96602 | -0.85647 | -0.67973 | -0.44967 | -0.18435 | 0.09544 | 0.36774 |
| -6.5 | -0.53773 | -0.75045 | -0.9043 | -0.98722 | -0.9927 | -0.92031 | -0.77574 | -0.57032 | -0.32017 | -0.0449 | 0.233895 | 0.494339 |
| -5.5 | -0.6505 | -0.83561 | -0.95517 | -0.99981 | -0.96602 | -0.85647 | -0.67973 | -0.44967 | -0.18435 | 0.09544 | 0.36774 | 0.611196 |
| -4.5 | -0.75045 | -0.9043 | -0.98722 | -0.9927 | -0.92031 | -0.77574 | -0.57032 | -0.32017 | -0.0449 | 0.233895 | 0.494339 | 0.716008 |
| -3.5 | -0.83561 | -0.95517 | -0.99981 | -0.96602 | -0.85647 | -0.67973 | -0.44967 | -0.18435 | 0.09544 | 0.36774 | 0.611196 | 0.80671 |
| -2.5 | -0.9043 | -0.98722 | -0.9927 | -0.92031 | -0.77574 | -0.57032 | -0.32017 | -0.0449 | 0.233895 | 0.494339 | 0.716008 | 0.881514 |
| -1.5 | -0.95517 | -0.99981 | -0.96602 | -0.85647 | -0.67973 | -0.44967 | -0.18435 | 0.09544 | 0.36774 | 0.611196 | 0.80671 | 0.938947 |
| -0.5 | -0.98722 | -0.9927 | -0.92031 | -0.77574 | -0.57032 | -0.32017 | -0.0449 | 0.233895 | 0.494339 | 0.716008 | 0.881514 | 0.977875 |
| 0.5 | -0.99981 | -0.96602 | -0.85647 | -0.67973 | -0.44967 | -0.18435 | 0.09544 | 0.36774 | 0.611196 | 0.80671 | 0.938947 | 0.997534 |
| 1.5 | -0.9927 | -0.92031 | -0.77574 | -0.57032 | -0.32017 | -0.0449 | 0.233895 | 0.494339 | 0.716008 | 0.881514 | 0.977875 | 0.997534 |
| 2.5 | -0.96602 | -0.85647 | -0.67973 | -0.44967 | -0.18435 | 0.09544 | 0.36774 | 0.611196 | 0.80671 | 0.938947 | 0.997534 | 0.977875 |
| 3.5 | -0.92031 | -0.77574 | -0.57032 | -0.32017 | -0.0449 | 0.233895 | 0.494339 | 0.716008 | 0.881514 | 0.977875 | 0.997534 | 0.938947 |
| 4.5 | -0.85647 | -0.67973 | -0.44967 | -0.18435 | 0.09544 | 0.36774 | 0.611196 | 0.80671 | 0.938947 | 0.997534 | 0.977875 | 0.881514 |
| 5.5 | -0.77574 | -0.57032 | -0.32017 | -0.0449 | 0.233895 | 0.494339 | 0.716008 | 0.881514 | 0.977875 | 0.997534 | 0.938947 | 0.80671 |
| 6.5 | -0.67973 | -0.44967 | -0.18435 | 0.09544 | 0.36774 | 0.611196 | 0.80671 | 0.938947 | 0.997534 | 0.977875 | 0.881514 | 0.716008 |
| 7.5 | -0.57032 | -0.32017 | -0.0449 | 0.233895 | 0.494339 | 0.716008 | 0.881514 | 0.977875 | 0.997534 | 0.938947 | 0.80671 | 0.611196 |
| 8.5 | -0.44967 | -0.18435 | 0.09544 | 0.36774 | 0.611196 | 0.80671 | 0.938947 | 0.997534 | 0.977875 | 0.881514 | 0.716008 | 0.494339 |
| 9.5 | -0.32017 | -0.0449 | 0.233895 | 0.494339 | 0.716008 | 0.881514 | 0.977875 | 0.997534 | 0.938947 | 0.80671 | 0.611196 | 0.36774 |
| 10.5 | -0.18435 | 0.09544 | 0.36774 | 0.611196 | 0.80671 | 0.938947 | 0.997534 | 0.977875 | 0.881514 | 0.716008 | 0.494339 | 0.233895 |
| 11.5 | -0.0449 | 0.233895 | 0.494339 | 0.716008 | 0.881514 | 0.977875 | 0.997534 | 0.938947 | 0.80671 | 0.611196 | 0.36774 | 0.09544 |

FIG. 16B

| | 0.5 | 1.5 | 2.5 | 3.5 | 4.5 | 5.5 | 6.5 | 7.5 | 8.5 | 9.5 | 10.5 | 11.5 |
|---|---|---|---|---|---|---|---|---|---|---|---|---|
| -11.5 | 0.09544 | 0.36774 | 0.611196 | 0.80671 | 0.938947 | 0.997534 | 0.977875 | 0.881514 | 0.716008 | 0.494339 | 0.233895 | -0.0449 |
| -10.5 | 0.233895 | 0.494339 | 0.716008 | 0.881514 | 0.977875 | 0.997534 | 0.938947 | 0.80671 | 0.611196 | 0.36774 | 0.09544 | -0.18435 |
| -9.5 | 0.36774 | 0.611196 | 0.80671 | 0.938947 | 0.997534 | 0.977875 | 0.881514 | 0.716008 | 0.494339 | 0.233895 | -0.0449 | -0.32017 |
| -8.5 | 0.494339 | 0.716008 | 0.881514 | 0.977875 | 0.997534 | 0.938947 | 0.80671 | 0.611196 | 0.36774 | 0.09544 | -0.18435 | -0.44967 |
| -7.5 | 0.611196 | 0.80671 | 0.938947 | 0.997534 | 0.977875 | 0.881514 | 0.716008 | 0.494339 | 0.233895 | -0.0449 | -0.32017 | -0.57032 |
| -6.5 | 0.716008 | 0.881514 | 0.977875 | 0.997534 | 0.938947 | 0.80671 | 0.611196 | 0.36774 | 0.09544 | -0.18435 | -0.44967 | -0.67973 |
| -5.5 | 0.80671 | 0.938947 | 0.997534 | 0.977875 | 0.881514 | 0.716008 | 0.494339 | 0.233895 | -0.0449 | -0.32017 | -0.57032 | -0.77574 |
| -4.5 | 0.881514 | 0.977875 | 0.997534 | 0.938947 | 0.80671 | 0.611196 | 0.36774 | 0.09544 | -0.18435 | -0.44967 | -0.67973 | -0.85647 |
| -3.5 | 0.938947 | 0.997534 | 0.977875 | 0.881514 | 0.716008 | 0.494339 | 0.233895 | -0.0449 | -0.32017 | -0.57032 | -0.77574 | -0.92031 |
| -2.5 | 0.977875 | 0.997534 | 0.938947 | 0.80671 | 0.611196 | 0.36774 | 0.09544 | -0.18435 | -0.44967 | -0.67973 | -0.85647 | -0.96602 |
| -1.5 | 0.997534 | 0.977875 | 0.881514 | 0.716008 | 0.494339 | 0.233895 | -0.0449 | -0.32017 | -0.57032 | -0.77574 | -0.92031 | -0.9927 |
| -0.5 | 0.997534 | 0.938947 | 0.80671 | 0.611196 | 0.36774 | 0.09544 | -0.18435 | -0.44967 | -0.67973 | -0.85647 | -0.96602 | -0.99981 |
| 0.5 | 0.977875 | 0.881514 | 0.716008 | 0.494339 | 0.233895 | -0.0449 | -0.32017 | -0.57032 | -0.77574 | -0.92031 | -0.9927 | -0.98722 |
| 1.5 | 0.938947 | 0.80671 | 0.611196 | 0.36774 | 0.09544 | -0.18435 | -0.44967 | -0.67973 | -0.85647 | -0.96602 | -0.99981 | -0.95517 |
| 2.5 | 0.881514 | 0.716008 | 0.494339 | 0.233895 | -0.0449 | -0.32017 | -0.57032 | -0.77574 | -0.92031 | -0.9927 | -0.98722 | -0.9043 |
| 3.5 | 0.80671 | 0.611196 | 0.36774 | 0.09544 | -0.18435 | -0.44967 | -0.67973 | -0.85647 | -0.96602 | -0.99981 | -0.95517 | -0.83561 |
| 4.5 | 0.716008 | 0.494339 | 0.233895 | -0.0449 | -0.32017 | -0.57032 | -0.77574 | -0.92031 | -0.9927 | -0.98722 | -0.9043 | -0.75045 |
| 5.5 | 0.611196 | 0.36774 | 0.09544 | -0.18435 | -0.44967 | -0.67973 | -0.85647 | -0.96602 | -0.99981 | -0.95517 | -0.83561 | -0.6505 |
| 6.5 | 0.494339 | 0.233895 | -0.0449 | -0.32017 | -0.57032 | -0.77574 | -0.92031 | -0.9927 | -0.98722 | -0.9043 | -0.75045 | -0.53773 |
| 7.5 | 0.36774 | 0.09544 | -0.18435 | -0.44967 | -0.67973 | -0.85647 | -0.96602 | -0.99981 | -0.95517 | -0.83561 | -0.6505 | -0.41437 |
| 8.5 | 0.233895 | -0.0449 | -0.32017 | -0.57032 | -0.77574 | -0.92031 | -0.9927 | -0.98722 | -0.9043 | -0.75045 | -0.53773 | -0.28284 |
| 9.5 | 0.09544 | -0.18435 | -0.44967 | -0.67973 | -0.85647 | -0.96602 | -0.99981 | -0.95517 | -0.83561 | -0.6505 | -0.41437 | -0.14574 |
| 10.5 | -0.0449 | -0.32017 | -0.57032 | -0.77574 | -0.92031 | -0.9927 | -0.98722 | -0.9043 | -0.75045 | -0.53773 | -0.28284 | -0.00576 |
| 11.5 | -0.18435 | -0.44967 | -0.67973 | -0.85647 | -0.96602 | -0.99981 | -0.95517 | -0.83561 | -0.6505 | -0.41437 | -0.14574 | 0.134326 |

FIG. 17

| 0 | 0 | 1 | 2 | 3 | 4 | 5 | 6 | 7 | 8 | 9 | 10 | 11 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|
| 1 | 1 | 12 | 13 | 14 | 15 | 16 | 17 | 18 | 19 | 20 | 21 | 22 | 22 | 21 | 20 | 19 | 18 | 17 | 16 | 15 | 14 | 13 | 12 | 1 |
| 2 | 2 | 13 | 23 | 24 | 25 | 26 | 27 | 28 | 29 | 30 | 31 | 32 | 32 | 31 | 30 | 29 | 28 | 27 | 26 | 25 | 24 | 23 | 13 | 2 |
| 3 | 3 | 14 | 24 | 33 | 34 | 35 | 36 | 37 | 38 | 39 | 40 | 41 | 41 | 40 | 39 | 38 | 30 | 36 | 35 | 34 | 33 | 24 | 14 | 3 |
| 4 | 4 | 15 | 25 | 34 | 42 | 43 | 44 | 45 | 46 | 47 | 48 | 49 | 49 | 48 | 47 | 46 | 45 | 44 | 43 | 42 | 34 | 25 | 15 | 4 |
| 5 | 5 | 16 | 26 | 35 | 43 | 50 | 51 | 52 | 53 | 54 | 55 | 56 | 56 | 55 | 54 | 53 | 52 | 51 | 50 | 43 | 35 | 26 | 16 | 5 |
| 6 | 6 | 17 | 27 | 36 | 44 | 51 | 57 | 58 | 59 | 60 | 61 | 62 | 62 | 61 | 60 | 59 | 58 | 57 | 51 | 44 | 36 | 27 | 17 | 6 |
| 7 | 7 | 18 | 28 | 37 | 45 | 52 | 58 | 63 | 64 | 65 | 66 | 67 | 67 | 66 | 65 | 64 | 63 | 58 | 52 | 45 | 37 | 28 | 18 | 7 |
| 8 | 8 | 19 | 29 | 38 | 46 | 53 | 59 | 64 | 68 | 69 | 70 | 71 | 71 | 70 | 69 | 68 | 64 | 59 | 53 | 46 | 38 | 29 | 19 | 8 |
| 9 | 9 | 20 | 30 | 39 | 47 | 54 | 60 | 65 | 69 | 72 | 73 | 74 | 74 | 73 | 72 | 69 | 65 | 60 | 54 | 47 | 39 | 30 | 20 | 9 |
| 10 | 10 | 21 | 31 | 40 | 48 | 55 | 61 | 66 | 70 | 73 | 75 | 76 | 76 | 75 | 73 | 70 | 66 | 61 | 55 | 48 | 40 | 31 | 21 | 10 |
| 11 | 11 | 22 | 32 | 41 | 49 | 56 | 62 | 67 | 71 | 74 | 76 | 77 | 77 | 76 | 74 | 71 | 67 | 62 | 56 | 49 | 41 | 32 | 22 | 11 |
| 11 | 11 | 22 | 32 | 41 | 49 | 56 | 62 | 67 | 71 | 74 | 76 | 77 | 77 | 76 | 74 | 71 | 67 | 62 | 56 | 49 | 41 | 32 | 22 | 11 |
| 10 | 10 | 21 | 31 | 40 | 48 | 55 | 61 | 66 | 70 | 73 | 75 | 76 | 76 | 75 | 73 | 70 | 66 | 61 | 55 | 48 | 40 | 31 | 21 | 10 |
| 9 | 9 | 20 | 30 | 39 | 47 | 54 | 60 | 65 | 69 | 72 | 73 | 74 | 74 | 73 | 72 | 69 | 65 | 60 | 54 | 47 | 39 | 30 | 20 | 9 |
| 8 | 8 | 19 | 29 | 38 | 46 | 53 | 59 | 64 | 68 | 69 | 70 | 71 | 71 | 70 | 69 | 68 | 64 | 59 | 53 | 46 | 38 | 29 | 19 | 8 |
| 7 | 7 | 18 | 28 | 37 | 45 | 52 | 58 | 63 | 64 | 65 | 66 | 67 | 67 | 66 | 65 | 64 | 63 | 58 | 52 | 45 | 37 | 28 | 18 | 7 |
| 6 | 6 | 17 | 27 | 36 | 44 | 51 | 57 | 58 | 59 | 60 | 61 | 62 | 62 | 61 | 60 | 59 | 58 | 57 | 51 | 44 | 36 | 27 | 17 | 6 |
| 5 | 5 | 16 | 26 | 35 | 43 | 50 | 51 | 52 | 53 | 54 | 55 | 56 | 56 | 55 | 54 | 53 | 52 | 51 | 50 | 43 | 35 | 26 | 16 | 5 |
| 4 | 4 | 15 | 25 | 34 | 42 | 43 | 44 | 45 | 46 | 47 | 48 | 49 | 49 | 48 | 47 | 46 | 45 | 44 | 43 | 42 | 34 | 25 | 15 | 4 |
| 3 | 3 | 14 | 24 | 33 | 34 | 35 | 36 | 37 | 38 | 39 | 40 | 41 | 41 | 40 | 39 | 38 | 30 | 36 | 35 | 34 | 33 | 24 | 14 | 3 |
| 2 | 2 | 13 | 23 | 24 | 25 | 26 | 27 | 28 | 29 | 30 | 31 | 32 | 32 | 31 | 30 | 29 | 28 | 27 | 26 | 25 | 24 | 23 | 13 | 2 |
| 1 | 1 | 12 | 13 | 14 | 15 | 16 | 17 | 18 | 19 | 20 | 21 | 22 | 22 | 21 | 20 | 19 | 18 | 17 | 16 | 15 | 14 | 13 | 12 | 1 |
| 0 | 0 | 1 | 2 | 3 | 4 | 5 | 6 | 7 | 8 | 9 | 10 | 11 | 11 | 10 | 9 | 8 | 7 | 6 | 5 | 4 | 3 | 2 | 1 | 0 |
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | |

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| 0 | 0 | 1 | 2 | 3 | 4 | 5 | 6 | 7 | 8 | 9 | 10 | 11 | -11 | -10 | -9 | -8 | -7 | -6 | -5 | -4 | -3 | -2 | -1 | 0 |
| 1 | 0 | 1 | 2 | 3 | 4 | 5 | 6 | 7 | 8 | 9 | 10 | 11 | -11 | -10 | -9 | -8 | -7 | -6 | -5 | -4 | -3 | -2 | -1 | 0 |
| 2 | 0 | 1 | 2 | 3 | 4 | 5 | 6 | 7 | 8 | 9 | 10 | 11 | -11 | -10 | -9 | -8 | -7 | -6 | -5 | -4 | -3 | -2 | -1 | 0 |
| 3 | 0 | 1 | 2 | 3 | 4 | 5 | 6 | 7 | 8 | 9 | 10 | 11 | -11 | -10 | -9 | -8 | -7 | -6 | -5 | -4 | -3 | -2 | -1 | 0 |
| 4 | 0 | 1 | 2 | 3 | 4 | 5 | 6 | 7 | 8 | 9 | 10 | 11 | -11 | -10 | -9 | -8 | -7 | -6 | -5 | -4 | -3 | -2 | -1 | 0 |
| 5 | 0 | 1 | 2 | 3 | 4 | 5 | 6 | 7 | 8 | 9 | 10 | 11 | -11 | -10 | -9 | -8 | -7 | -6 | -5 | -4 | -3 | -2 | -1 | 0 |
| 6 | 0 | 1 | 2 | 3 | 4 | 5 | 6 | 7 | 8 | 9 | 10 | 11 | -11 | -10 | -9 | -8 | -7 | -6 | -5 | -4 | -3 | -2 | -1 | 0 |
| 7 | 0 | 1 | 2 | 3 | 4 | 5 | 6 | 7 | 8 | 9 | 10 | 11 | -11 | -10 | -9 | -8 | -7 | -6 | -5 | -4 | -3 | -2 | -1 | 0 |
| 8 | 0 | 1 | 2 | 3 | 4 | 5 | 6 | 7 | 8 | 9 | 10 | 11 | -11 | -10 | -9 | -8 | -7 | -6 | -5 | -4 | -3 | -2 | -1 | 0 |
| 9 | 0 | 1 | 2 | 3 | 4 | 5 | 6 | 7 | 8 | 9 | 10 | 11 | -11 | -10 | -9 | -8 | -7 | -6 | -5 | -4 | -3 | -2 | -1 | 0 |
| 10 | 0 | 1 | 2 | 3 | 4 | 5 | 6 | 7 | 8 | 9 | 10 | 11 | -11 | -10 | -9 | -8 | -7 | -6 | -5 | -4 | -3 | -2 | -1 | 0 |
| 11 | 0 | 1 | 2 | 3 | 4 | 5 | 6 | 7 | 8 | 9 | 10 | 11 | -11 | -10 | -9 | -8 | -7 | -6 | -5 | -4 | -3 | -2 | -1 | 0 |
| 12 | 0 | 1 | 2 | 3 | 4 | 5 | 6 | 7 | 8 | 9 | 10 | 11 | -11 | -10 | -9 | -8 | -7 | -6 | -5 | -4 | -3 | -2 | -1 | 0 |
| 13 | 0 | 1 | 2 | 3 | 4 | 5 | 6 | 7 | 8 | 9 | 10 | 11 | -11 | -10 | -9 | -8 | -7 | -6 | -5 | -4 | -3 | -2 | -1 | 0 |
| 14 | 0 | 1 | 2 | 3 | 4 | 5 | 6 | 7 | 8 | 9 | 10 | 11 | -11 | -10 | -9 | -8 | -7 | -6 | -5 | -4 | -3 | -2 | -1 | 0 |
| 15 | 0 | 1 | 2 | 3 | 4 | 5 | 6 | 7 | 8 | 9 | 10 | 11 | -11 | -10 | -9 | -8 | -7 | -6 | -5 | -4 | -3 | -2 | -1 | 0 |
| 16 | 0 | 1 | 2 | 3 | 4 | 5 | 6 | 7 | 8 | 9 | 10 | 11 | -11 | -10 | -9 | -8 | -7 | -6 | -5 | -4 | -3 | -2 | -1 | 0 |
| 17 | 0 | 1 | 2 | 3 | 4 | 5 | 6 | 7 | 8 | 9 | 10 | 11 | -11 | -10 | -9 | -8 | -7 | -6 | -5 | -4 | -3 | -2 | -1 | 0 |
| 18 | 0 | 1 | 2 | 3 | 4 | 5 | 6 | 7 | 8 | 9 | 10 | 11 | -11 | -10 | -9 | -8 | -7 | -6 | -5 | -4 | -3 | -2 | -1 | 0 |
| 19 | 0 | 1 | 2 | 3 | 4 | 5 | 6 | 7 | 8 | 9 | 10 | 11 | -11 | -10 | -9 | -8 | -7 | -6 | -5 | -4 | -3 | -2 | -1 | 0 |
| 20 | 0 | 1 | 2 | 3 | 4 | 5 | 6 | 7 | 8 | 9 | 10 | 11 | -11 | -10 | -9 | -8 | -7 | -6 | -5 | -4 | -3 | -2 | -1 | 0 |
| 21 | 0 | 1 | 2 | 3 | 4 | 5 | 6 | 7 | 8 | 9 | 10 | 11 | -11 | -10 | -9 | -8 | -7 | -6 | -5 | -4 | -3 | -2 | -1 | 0 |
| 22 | 0 | 1 | 2 | 3 | 4 | 5 | 6 | 7 | 8 | 9 | 10 | 11 | -11 | -10 | -9 | -8 | -7 | -6 | -5 | -4 | -3 | -2 | -1 | 0 |
| 23 | 0 | 1 | 2 | 3 | 4 | 5 | 6 | 7 | 8 | 9 | 10 | 11 | -11 | -10 | -9 | -8 | -7 | -6 | -5 | -4 | -3 | -2 | -1 | 0 |

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| 23 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 22 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | -1 |
| 21 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | -1 | -2 |
| 20 | 20 | 19 | 18 | 17 | 16 | 15 | 14 | 13 | 12 | 11 | 10 | 9 | 8 | 7 | 6 | 5 | 4 | 3 | 2 | 1 | 0 | -1 | -2 | -3 |
| 19 | 19 | 18 | 17 | 16 | 15 | 14 | 13 | 12 | 11 | 10 | 9 | 8 | 7 | 6 | 5 | 4 | 3 | 2 | 1 | 0 | -1 | -2 | -3 | -4 |
| 18 | 18 | 17 | 16 | 15 | 14 | 13 | 12 | 11 | 10 | 9 | 8 | 7 | 6 | 5 | 4 | 3 | 2 | 1 | 0 | -1 | -2 | -3 | -4 | -5 |
| 17 | 17 | 16 | 15 | 14 | 13 | 12 | 11 | 10 | 9 | 8 | 7 | 6 | 5 | 4 | 3 | 2 | 1 | 0 | -1 | -2 | -3 | -4 | -5 | -6 |
| 16 | 16 | 15 | 14 | 13 | 12 | 11 | 10 | 9 | 8 | 7 | 6 | 5 | 4 | 3 | 2 | 1 | 0 | -1 | -2 | -3 | -4 | -5 | -6 | -7 |
| 15 | 15 | 14 | 13 | 12 | 11 | 10 | 9 | 8 | 7 | 6 | 5 | 4 | 3 | 2 | 1 | 0 | -1 | -2 | -3 | -4 | -5 | -6 | -7 | -8 |
| 14 | 14 | 13 | 12 | 11 | 10 | 9 | 8 | 7 | 6 | 5 | 4 | 3 | 2 | 1 | 0 | -1 | -2 | -3 | -4 | -5 | -6 | -7 | -8 | -9 |
| 13 | 13 | 12 | 11 | 10 | 9 | 8 | 7 | 6 | 5 | 4 | 3 | 2 | 1 | 0 | -1 | -2 | -3 | -4 | -5 | -6 | -7 | -8 | -9 | -10 |
| 12 | 12 | 11 | 10 | 9 | 8 | 7 | 6 | 5 | 4 | 3 | 2 | 1 | 0 | -1 | -2 | -3 | -4 | -5 | -6 | -7 | -8 | -9 | -10 | -11 |
| 11 | 11 | 10 | 9 | 8 | 7 | 6 | 5 | 4 | 3 | 2 | 1 | 0 | -1 | -2 | -3 | -4 | -5 | -6 | -7 | -8 | -9 | -10 | -11 | -12 |
| 10 | 10 | 9 | 8 | 7 | 6 | 5 | 4 | 3 | 2 | 1 | 0 | -1 | -2 | -3 | -4 | -5 | -6 | -7 | -8 | -9 | -10 | -11 | -12 | -13 |
| 9 | 9 | 8 | 7 | 6 | 5 | 4 | 3 | 2 | 1 | 0 | -1 | -2 | -3 | -4 | -5 | -6 | -7 | -8 | -9 | -10 | -11 | -12 | -13 | -14 |
| 8 | 8 | 7 | 6 | 5 | 4 | 3 | 2 | 1 | 0 | -1 | -2 | -3 | -4 | -5 | -6 | -7 | -8 | -9 | -10 | -11 | -12 | -13 | -14 | -15 |
| 7 | 7 | 6 | 5 | 4 | 3 | 2 | 1 | 0 | -1 | -2 | -3 | -4 | -5 | -6 | -7 | -8 | -9 | -10 | -11 | -12 | -13 | -14 | -15 | -16 |
| 6 | 6 | 5 | 4 | 3 | 2 | 1 | 0 | -1 | -2 | -3 | -4 | -5 | -6 | -7 | -8 | -9 | -10 | -11 | -12 | -13 | -14 | -15 | -16 | -17 |
| 5 | 5 | 4 | 3 | 2 | 1 | 0 | -1 | -2 | -3 | -4 | -5 | -6 | -7 | -8 | -9 | -10 | -11 | -12 | -13 | -14 | -15 | -16 | -17 | -18 |
| 4 | 4 | 3 | 2 | 1 | 0 | -1 | -2 | -3 | -4 | -5 | -6 | -7 | -8 | -9 | -10 | -11 | -12 | -13 | -14 | -15 | -16 | -17 | -18 | -19 |
| 3 | 3 | 2 | 1 | 0 | -1 | -2 | -3 | -4 | -5 | -6 | -7 | -8 | -9 | -10 | -11 | -12 | -13 | -14 | -15 | -16 | -17 | -18 | -19 | -20 |
| 2 | 2 | 1 | 0 | -1 | -2 | -3 | -4 | -5 | -6 | -7 | -8 | -9 | -10 | -11 | -12 | -13 | -14 | -15 | -16 | -17 | -18 | -19 | -20 | -21 |
| 1 | 1 | 0 | -1 | -2 | -3 | -4 | -5 | -6 | -7 | -8 | -9 | -10 | -11 | -12 | -13 | -14 | -15 | -16 | -17 | -18 | -19 | -20 | -21 | -22 |
| 0 | 0 | -1 | -2 | -3 | -4 | -5 | -6 | -7 | -8 | -9 | -10 | -11 | -12 | -13 | -14 | -15 | -16 | -17 | -18 | -19 | -20 | -21 | -22 | -23 |

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| 0 | 24 | 25 | 26 | 27 | 28 | 29 | 30 | 31 | 32 | 33 | 34 | 35 | -1 | -2 | -3 | -4 | -5 | -6 | -7 | -8 | -9 | -10 | -11 | -12 |
| 1 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | -35 |
| 2 | 26 | 27 | 28 | 29 | 30 | 31 | 32 | 33 | 34 | 35 | -1 | -2 | -3 | -4 | -5 | -6 | -7 | -8 | -9 | -10 | -11 | -12 | -13 | -14 |
| 3 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | -35 | -34 |
| 4 | 27 | 28 | 29 | 30 | 31 | 32 | 33 | 34 | 35 | -1 | -2 | -3 | -4 | -5 | -6 | -7 | -8 | -9 | -10 | -11 | -12 | -13 | -14 | -15 |
| 5 | 21 | 20 | 19 | 18 | 17 | 16 | 15 | 14 | 13 | 12 | 11 | 10 | 9 | 8 | 7 | 6 | 5 | 4 | 3 | 2 | 1 | -35 | -34 | -33 |
| 6 | 28 | 29 | 30 | 31 | 32 | 33 | 34 | 35 | -1 | -2 | -3 | -4 | -5 | -6 | -7 | -8 | -9 | -10 | -11 | -12 | -13 | -14 | -15 | -16 |
| 7 | 20 | 19 | 18 | 17 | 16 | 15 | 14 | 13 | 12 | 11 | 10 | 9 | 8 | 7 | 6 | 5 | 4 | 3 | 2 | 1 | -35 | -34 | -33 | -32 |
| 8 | 29 | 30 | 31 | 32 | 33 | 34 | 35 | -1 | -2 | -3 | -4 | -5 | -6 | -7 | -8 | -9 | -10 | -11 | -12 | -13 | -14 | -15 | -16 | -17 |
| 9 | 19 | 18 | 17 | 16 | 15 | 14 | 13 | 12 | 11 | 10 | 9 | 8 | 7 | 6 | 5 | 4 | 3 | 2 | 1 | -35 | -34 | -33 | -32 | -31 |
| 10 | 30 | 31 | 32 | 33 | 34 | 35 | -1 | -2 | -3 | -4 | -5 | -6 | -7 | -8 | -9 | -10 | -11 | -12 | -13 | -14 | -15 | -16 | -17 | -18 |
| 11 | 18 | 17 | 16 | 15 | 14 | 13 | 12 | 11 | 10 | 9 | 8 | 7 | 6 | 5 | 4 | 3 | 2 | 1 | -35 | -34 | -33 | -32 | -31 | -30 |
| 12 | 31 | 32 | 33 | 34 | 35 | -1 | -2 | -3 | -4 | -5 | -6 | -7 | -8 | -9 | -10 | -11 | -12 | -13 | -14 | -15 | -16 | -17 | -18 | -19 |
| 13 | 17 | 16 | 15 | 14 | 13 | 12 | 11 | 10 | 9 | 8 | 7 | 6 | 5 | 4 | 3 | 2 | 1 | -35 | -34 | -33 | -32 | -31 | -30 | -29 |
| 14 | 32 | 33 | 34 | 35 | -1 | -2 | -3 | -4 | -5 | -6 | -7 | -8 | -9 | -10 | -11 | -12 | -13 | -14 | -15 | -16 | -17 | -18 | -19 | -20 |
| 15 | 16 | 15 | 14 | 13 | 12 | 11 | 10 | 9 | 8 | 7 | 6 | 5 | 4 | 3 | 2 | 1 | -35 | -34 | -33 | -32 | -31 | -30 | -29 | -28 |
| 16 | 33 | 34 | 35 | -1 | -2 | -3 | -4 | -5 | -6 | -7 | -8 | -9 | -10 | -11 | -12 | -13 | -14 | -15 | -16 | -17 | -18 | -19 | -20 | -21 |
| 17 | 15 | 14 | 13 | 12 | 11 | 10 | 9 | 8 | 7 | 6 | 5 | 4 | 3 | 2 | 1 | -35 | -34 | -33 | -32 | -31 | -30 | -29 | -28 | -27 |
| 18 | 34 | 35 | -1 | -2 | -3 | -4 | -5 | -6 | -7 | -8 | -9 | -10 | -11 | -12 | -13 | -14 | -15 | -16 | -17 | -18 | -19 | -20 | -21 | -22 |
| 19 | 14 | 13 | 12 | 11 | 10 | 9 | 8 | 7 | 6 | 5 | 4 | 3 | 2 | 1 | -35 | -34 | -33 | -32 | -31 | -30 | -29 | -28 | -27 | -26 |
| 20 | 35 | -1 | -2 | -3 | -4 | -5 | -6 | -7 | -8 | -9 | -10 | -11 | -12 | -13 | -14 | -15 | -16 | -17 | -18 | -19 | -20 | -21 | -22 | -23 |
| 21 | 13 | 12 | 11 | 10 | 9 | 8 | 7 | 6 | 5 | 4 | 3 | 2 | 1 | -35 | -34 | -33 | -32 | -31 | -30 | -29 | -28 | -27 | -26 | -25 |
| 22 | -1 | -2 | -3 | -4 | -5 | -6 | -7 | -8 | -9 | -10 | -11 | -12 | -13 | -14 | -15 | -16 | -17 | -18 | -19 | -20 | -21 | -22 | -23 | -24 |

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| 0 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
| 1 | 25 | 26 | 27 | 28 | 29 | 30 | 31 | 32 | 33 | 34 | 35 | 1 | 2 | 3 | 4 | 5 | 6 | 7 | 8 | 9 | 10 | 11 | 12 | 13 |
| 2 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 35 |
| 3 | 26 | 27 | 28 | 29 | 30 | 31 | 32 | 33 | 34 | 35 | 1 | 2 | 3 | 4 | 5 | 6 | 7 | 8 | 9 | 10 | 11 | 12 | 13 | 14 |
| 4 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 35 | 34 |
| 5 | 27 | 28 | 29 | 30 | 31 | 32 | 33 | 34 | 35 | 1 | 2 | 3 | 4 | 5 | 6 | 7 | 8 | 9 | 10 | 11 | 12 | 13 | 14 | 15 |
| 6 | 21 | 20 | 19 | 18 | 17 | 16 | 15 | 14 | 13 | 12 | 11 | 10 | 9 | 8 | 7 | 6 | 5 | 4 | 3 | 2 | 1 | 35 | 34 | 33 |
| 7 | 28 | 29 | 30 | 31 | 32 | 33 | 34 | 35 | 1 | 2 | 3 | 4 | 5 | 6 | 7 | 8 | 9 | 10 | 11 | 12 | 13 | 14 | 15 | 16 |
| 8 | 20 | 19 | 18 | 17 | 16 | 15 | 14 | 13 | 12 | 11 | 10 | 9 | 8 | 7 | 6 | 5 | 4 | 3 | 2 | 1 | 35 | 34 | 33 | 32 |
| 9 | 29 | 30 | 31 | 32 | 33 | 34 | 35 | 1 | 2 | 3 | 4 | 5 | 6 | 7 | 8 | 9 | 10 | 11 | 12 | 13 | 14 | 15 | 16 | 17 |
| 10 | 19 | 18 | 17 | 16 | 15 | 14 | 13 | 12 | 11 | 10 | 9 | 8 | 7 | 6 | 5 | 4 | 3 | 2 | 1 | 35 | 34 | 33 | 32 | 31 |
| 11 | 30 | 31 | 32 | 33 | 34 | 35 | 1 | 2 | 3 | 4 | 5 | 6 | 7 | 8 | 9 | 10 | 11 | 12 | 13 | 14 | 15 | 16 | 17 | 18 |
| 12 | 18 | 17 | 16 | 15 | 14 | 13 | 12 | 11 | 10 | 9 | 8 | 7 | 6 | 5 | 4 | 3 | 2 | 1 | 35 | 34 | 33 | 32 | 31 | 30 |
| 13 | 31 | 32 | 33 | 34 | 35 | 1 | 2 | 3 | 4 | 5 | 6 | 7 | 8 | 9 | 10 | 11 | 12 | 13 | 14 | 15 | 16 | 17 | 18 | 19 |
| 14 | 17 | 16 | 15 | 14 | 13 | 12 | 11 | 10 | 9 | 8 | 7 | 6 | 5 | 4 | 3 | 2 | 1 | 35 | 34 | 33 | 32 | 31 | 30 | 29 |
| 15 | 32 | 33 | 34 | 35 | 1 | 2 | 3 | 4 | 5 | 6 | 7 | 8 | 9 | 10 | 11 | 12 | 13 | 14 | 15 | 16 | 17 | 18 | 19 | 20 |
| 16 | 16 | 15 | 14 | 13 | 12 | 11 | 10 | 9 | 8 | 7 | 6 | 5 | 4 | 3 | 2 | 1 | 35 | 34 | 33 | 32 | 31 | 30 | 29 | 28 |
| 17 | 33 | 34 | 35 | 1 | 2 | 3 | 4 | 5 | 6 | 7 | 8 | 9 | 10 | 11 | 12 | 13 | 14 | 15 | 16 | 17 | 18 | 19 | 20 | 21 |
| 18 | 15 | 14 | 13 | 12 | 11 | 10 | 9 | 8 | 7 | 6 | 5 | 4 | 3 | 2 | 1 | 35 | 34 | 33 | 32 | 31 | 30 | 29 | 28 | 27 |
| 19 | 34 | 35 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| 20 | 14 | 13 | 12 | 11 | 10 | 9 | 8 | 7 | 6 | 5 | 4 | 3 | 2 | 1 | 35 | 34 | 33 | 32 | 31 | 30 | 29 | 28 | 27 | 26 |
| 21 | 35 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| 22 | 13 | 12 | 11 | 10 | 9 | 8 | 7 | 6 | 5 | 4 | 3 | 2 | 1 | 35 | 34 | 33 | 32 | 31 | 30 | 29 | 28 | 27 | 26 | 25 |
| 23 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |

FIG. 23B

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| 23 | 23 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 22 | 22 | 13 | 12 | 11 | 10 | 9 | 8 | 7 | 6 | 5 | 4 | 3 | 2 | 1 | 35 | 34 | 33 | 32 | 31 | 30 | 29 | 28 | 27 | 26 | 25 |
| 21 | 21 | 35 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| 20 | 20 | 14 | 13 | 12 | 11 | 10 | 9 | 8 | 7 | 6 | 5 | 4 | 3 | 2 | 1 | 35 | 34 | 33 | 32 | 31 | 30 | 29 | 28 | 27 | 26 |
| 19 | 19 | 34 | 35 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| 18 | 18 | 15 | 14 | 13 | 12 | 11 | 10 | 9 | 8 | 7 | 6 | 5 | 4 | 3 | 2 | 1 | 35 | 34 | 33 | 32 | 31 | 30 | 29 | 28 | 27 |
| 17 | 17 | 33 | 34 | 35 | 1 | 2 | 3 | 4 | 5 | 6 | 7 | 8 | 9 | 10 | 11 | 12 | 13 | 14 | 15 | 16 | 17 | 18 | 19 | 20 | 21 |
| 16 | 16 | 16 | 15 | 14 | 13 | 12 | 11 | 10 | 9 | 8 | 7 | 6 | 5 | 4 | 3 | 2 | 1 | 35 | 34 | 33 | 32 | 31 | 30 | 29 | 28 |
| 15 | 15 | 32 | 33 | 34 | 35 | 1 | 2 | 3 | 4 | 5 | 6 | 7 | 8 | 9 | 10 | 11 | 12 | 13 | 14 | 15 | 16 | 17 | 18 | 19 | 20 |
| 14 | 14 | 17 | 16 | 15 | 14 | 13 | 12 | 11 | 10 | 9 | 8 | 7 | 6 | 5 | 4 | 3 | 2 | 1 | 35 | 34 | 33 | 32 | 31 | 30 | 29 |
| 13 | 13 | 31 | 32 | 33 | 34 | 35 | 1 | 2 | 3 | 4 | 5 | 6 | 7 | 8 | 9 | 10 | 11 | 12 | 13 | 14 | 15 | 16 | 17 | 18 | 19 |
| 12 | 12 | 18 | 17 | 16 | 15 | 14 | 13 | 12 | 11 | 10 | 9 | 8 | 7 | 6 | 5 | 4 | 3 | 2 | 1 | 35 | 34 | 33 | 32 | 31 | 30 |
| 11 | 11 | 30 | 31 | 32 | 33 | 34 | 35 | 1 | 2 | 3 | 4 | 5 | 6 | 7 | 8 | 9 | 10 | 11 | 12 | 13 | 14 | 15 | 16 | 17 | 18 |
| 10 | 10 | 19 | 18 | 17 | 16 | 15 | 14 | 13 | 12 | 11 | 10 | 9 | 8 | 7 | 6 | 5 | 4 | 3 | 2 | 1 | 35 | 34 | 33 | 32 | 31 |
| 9 | 9 | 29 | 30 | 31 | 32 | 33 | 34 | 35 | 1 | 2 | 3 | 4 | 5 | 6 | 7 | 8 | 9 | 10 | 11 | 12 | 13 | 14 | 15 | 16 | 17 |
| 8 | 8 | 20 | 19 | 18 | 17 | 16 | 15 | 14 | 13 | 12 | 11 | 10 | 9 | 8 | 7 | 6 | 5 | 4 | 3 | 2 | 1 | 35 | 34 | 33 | 32 |
| 7 | 7 | 28 | 29 | 30 | 31 | 32 | 33 | 34 | 35 | 1 | 2 | 3 | 4 | 5 | 6 | 7 | 8 | 9 | 10 | 11 | 12 | 13 | 14 | 15 | 16 |
| 6 | 6 | 21 | 20 | 19 | 18 | 17 | 16 | 15 | 14 | 13 | 12 | 11 | 10 | 9 | 8 | 7 | 6 | 5 | 4 | 3 | 2 | 1 | 35 | 34 | 33 |
| 5 | 5 | 27 | 28 | 29 | 30 | 31 | 32 | 33 | 34 | 35 | 1 | 2 | 3 | 4 | 5 | 6 | 7 | 8 | 9 | 10 | 11 | 12 | 13 | 14 | 15 |
| 4 | 4 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 35 | 34 |
| 3 | 3 | 26 | 27 | 28 | 29 | 30 | 31 | 32 | 33 | 34 | 35 | 1 | 2 | 3 | 4 | 5 | 6 | 7 | 8 | 9 | 10 | 11 | 12 | 13 | 14 |
| 2 | 2 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 35 |
| 1 | 1 | 25 | 26 | 27 | 28 | 29 | 30 | 31 | 32 | 33 | 34 | 35 | 1 | 2 | 3 | 4 | 5 | 6 | 7 | 8 | 9 | 10 | 11 | 12 | 13 |
| 0 | 0 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |

FACE RECOGNITION APPARATUS, FACE RECOGNITION METHOD, GABOR FILTER APPLICATION APPARATUS, AND COMPUTER PROGRAM

CROSS REFERENCES TO RELATED APPLICATIONS

The present invention contains subject matter related to Japanese Patent Application JP 2006-339748 filed in the Japanese Patent Office on Dec. 18, 2006, the entire contents of which are incorporated herein by reference.

BACKGROUND OF THE INVENTION

1. Field of the Invention

The present invention relates to a face recognition apparatus, a face recognition method, a Gabor filter application apparatus, and a computer program, for recognizing a face in an image such as a photographic picture, and more particularly, to a face recognition apparatus, a face recognition method, a Gabor filter application apparatus, and a computer program, for recognizing a face by extracting a feature value of a face image by using a Gabor filter representing spatial characteristics based on a Gaussian function representing a window and a sine or cosine function representing a frequency response.

The present invention also relates to a face recognition apparatus, a face recognition method, a Gabor filter application apparatus, and a computer program, for recognizing a face image with high accuracy without fixing types or the number of Gabor filter coefficients, and more particularly, to a face recognition apparatus, a face recognition method, a Gabor filter application apparatus, and a computer program, for performing high-performance recognition of a face image by using a Gabor filter without needing an increase in hardware complexity or an increase in processing complexity.

2. Description of the Related Art

The face recognition technology has a wide variety of applications such as a person authentication system capable of authenticating a person without the person needing to perform a particular operation, a system of detecting sex of a person, and other many man-machine interfaces. The current trend in the face recognition technology is to use a front face image, although use of a side face image was tried in the past.

A face recognition system includes a face extraction process for extracting a face pattern from an image taken by a CCD camera or the like, and a face recognition process for recognizing a face based on the extracted face pattern. The face extraction process for extracting a face pattern (or extracting a feature value of a face image) and the face recognition process can be accomplished, for example, by performing Gabor filtering using a plurality of filters having direction selectivity and having different frequency characteristics (see, for example, Japanese Unexamined Patent Application Publication No. 2006-4041).

It is known that human photoreceptor cell include cells having selectivity in a particular direction. The direction selectivity is achieved by a combination of a cell which fires vertically and a cell which responds horizontally. Similarly, a Gabor filter is spatial filter including a plurality of filters having direction selectivity.

The Gabor filter represents a spatial characteristic using a Gabor function including a Gaussian function representing a window and a sine or cosine function indicating a frequency response. The filter window size is fixed at, for example, 24×24 pixels. If one Gabor filter is prepared for each of 5 different frequency f and for each of 8 different directions, a total of 40 Gabor filters are prepared.

The operation by a Gabor filter includes determining the convolution of a pixel value to which the Gabor filter is applied and coefficients of the Gabor filter. The coefficients of the Gabor filter can be divided into real components given by a cosine function representing a frequency response and imaginary components given by a cosine function representing a frequency response. The convolution is calculated separately for the real and imaginary components, and resultant convolution components are added to obtain one scalar value indicating the final result of the Gabor filtering. If up to 40 Gabor filters with various frequencies f and various angles 0 are used, a total of up to 40 scalar values are obtained. A set of the resultant 40 scalar values is referred to as a Gabor jet. In the face recognition process, the Gabor jet is determined as a local feature value at each of feature value extraction positions located at equal intervals in horizontal and vertical directions on given face image data. Note that the Gabor jet does not change even if the feature value extraction position varies within a certain range or if the image is deformed to a certain degree.

For each of registered face images, Gabor jets are calculated in advance for respective feature value extraction positions. When a face image to be examined is given (hereinafter, such a face image will be referred to simply as an input face image), the similarity of a Gabor jet of the input face image with respect to the Gabor jet of the registered face image is determined for each feature value extraction position, and a similarity vector each element of which indicates similarity at one feature value extraction position. Thereafter, a support vector machine (SVM) performs classification based on the similarity vector to determine whether the input face image is identical to a registered face image. More specifically, the support vector machine calculates the distance of the similarity vector of interest from a boundary plane (in which the distance is equal to 0) and determines whether the similarity vector belongs to an intra-personal class or an extra-personal class. If the similarity vector is determined as not belonging to an intra-personal class for any registered face image, it is determined that the input face image is of a person whose face is not yet registered (see, for example, B. Scholkopf et al., "Advance in Kernel Support Vector Learning" (The MIT Press, 1999)). If the support vector machine learns many face images (i.e., if many face images are registered), it is possible to determine whether an input face image is identical to one of registered (learned) face images, that is, whether the input face image belongs to an intra-personal class or an extra-personal class (see, for example, Domestic Republication WO03/019475 or Japanese Unexamined Patent Application Publication No. 2006-4003). The current evaluation for the support vector machine in the pattern recognition technology is that the support vector machine has highest learning ability.

SUMMARY OF THE INVENTION

In the Gabor filtering, as described above, calculation is performed using up to 40 Gabor filters different in frequency f and angle θ of the Gabor function representing the frequency response. However, if a large number of filter coefficients are determined by calculation each time the Gabor filtering is performed, a large computation load is imposed on a computer, and it takes a long time to perform the calculation. If the types and the number of filter coefficients are fixed (or limited), it is possible to reduce the computation load imposed on the computer. However, this can cause a reduction in recognition accuracy.

If all filter coefficients are simply stored in a ROM (Read Only Memory), the result is an increase in a hardware size. For example, in a case where the Gabor filter is used in medical image processing (see, for example, Japanese Unexamined Patent Application Publication No. 2005-21334), it is allowed to use an expensive apparatus with a large hardware size, and it is also allowed to spend a rather long time for the calculation. However, in many applications such as a technique using face recognition to reduce a focusing time in taking a portrait or the like using a small-size digital camera, a technique to compress a dynamic range so that exposure is optimized for a main subject, etc., it is important to minimize the hardware size and the calculation load needed in the Gabor filtering.

In view of the above, it is desirable to provide a face recognition apparatus, a face recognition method, a Gabor filter application apparatus, and a computer program, capable of properly extracting a feature value of a face image by using a Gabor filter represents a spatial characteristic, based on a Gaussian function representing a window and a sine or cosine function representing a frequency response.

It is also desirable to provide a face recognition apparatus, a face recognition method, a Gabor filter application apparatus, and a computer program, capable of recognizing a face image with high accuracy without fixing the types and the numbers of coefficients of a Gabor filter.

It is also desirable to provide a face recognition apparatus, a face recognition method, a Gabor filter application apparatus, and a computer program, capable of performing a face image recognition process with high accuracy by using a Gabor filter without increasing a hardware size or a computation load.

In view of the above, according to an embodiment of the present invention, there is provided a face recognition apparatus adapted to recognize an input face image on the basis of one or more registered face images, including face image input means for inputting the face image to be recognized, Gabor filter application means for calculating the convolution of a pixel value at each feature value extraction position of the input image and coefficients of a Gabor filter defined by a Gabor function representing a spatial characteristic using a Gaussian function representing a window and a sine function or a cosine function representing a frequency response, for each of a predetermined set of frequency values and for each of a predetermined set of angles of the response function of the Gabor filter thereby determining a Gabor jet including as many scalar values as there are Gabor filters, similarity calculation means for calculating the similarity between a Gabor jet at each feature value extraction position of the input face image and a Gabor jet of a registered face image and determining a similarity vector whose elements are given by values indicating similarity at respective feature value extraction positions, and identify determination means for determining whether the input face image is identical to the registered face image, on the basis of the similarity vector, wherein the Gabor filter application means includes a filter window data ROM adapted to store values of the filter window determined by calculating the Gaussian function, sine data ROMs adapted to store values of the response function determined by calculating the sine function for the respective angles, cosine data ROMs adapted to store values of the response function determined by calculating the cosine function for the respective angles, and Gabor filter coefficient calculation means for calculating coefficients of the Gabor filter by multiplying the value read from the filter window data ROM and the values read from the sine data ROMs and the cosine data ROMs, whereby the Gabor filter application means calculates the convolution of the input face image and the Gabor filter coefficients calculated by the Gabor filter coefficient calculation means.

In the process of detecting or recognizing a face, feature values of a given face image may be extracted by performing Gabor filtering using a plurality of filters having direction selectivity and having different frequency characteristics. Each Gabor filter represents a spatial characteristic, based on a Gaussian function representing a window and a sine or cosine function representing a frequency response. By calculating the convolution of a given image and a Gabor filter, it is possible to extract only an outline in the same direction as the direction of the Gabor filter.

If the calculation of the convolution using the Gabor filter is performed at each feature value extraction position of the input image for each of a predetermined set of frequency values and for each of a predetermined set of angles of the response function of the Gabor filter, a Gabor jet including as many scalar values as the number of Gabor filter types can be obtained. The similarity of the Gabor jet between the input face image and a registered face image is calculated for each of the feature value extraction positions. As a result, a similarity vector whose elements represent similarity at respective feature value extraction positions is obtained. On the basis of the obtained similarity vector, a determination is made as to whether the input face image is identical to the registered face image.

By convoluting an image with the Gabor filter, it is possible to extract only an outline extending in the same direction as the direction of the Gabor filter. This feature of the Gabor filter is useful not only in the face recognition but also in many applications using image processing such as pattern recognition.

However, if a large number of filter coefficients are determined by calculation each time the Gabor filtering is performed, a large computation load is imposed on a computer, and it takes a long time to perform the calculation. If all filter coefficients are simply stored in a ROM, the result is an increase in a hardware size.

In the present embodiment, to avoid the above problems, the total data size of data associated with the Gabor filter coefficients stored in the ROM is minimized by eliminating redundant data associated with the Gaussian function representing the window and redundant data associated with the sine or cosine function representing the frequency response. For the above purpose, the Gabor filter application means may include a filter window data ROM adapted to store values of the filter window determined by calculating the Gaussian function, sine data ROMs adapted to store values of the response function determined by calculating the sine function for the respective angles, and cosine data ROMs adapted to store values of the response function determined by calculating the cosine function for the respective angles, and the Gabor filter application means may further include Gabor filter coefficient calculation means for calculating coefficients of the Gabor filter by multiplying the value read from the filter window data ROM and the values read from the sine data ROMs and the cosine data ROMs.

That is, by dividing the filter coefficients into values calculated based on the Gaussian function and values calculated based on the sine or cosine function, it becomes possible to reduce the total data size stored in the ROM, compared with the case in which all coefficients of the Gabor filter are simply stored in the ROM, and thus a reduction in the hardware size is achieved. The coefficients of the Gabor filter can be easily determined simply by multiplying the values associated with the Gaussian function read from the ROM and the values associated with the sine or cosine function read from the ROM without needing high computation power.

Thus, in the face recognition apparatus according to the present embodiment, redundancy of data is eliminated using the characteristic of the Gaussian function and the periodicity of the sine and cosine function, and resultant minimum data is stored in the ROM thereby achieving a reduction in the hardware size.

In the face recognition apparatus, the Gabor filter application means may be adapted to apply Gabor filters defined in 8 directions, and the Gabor filter application means may include, to store parameters associated with the Gabor filters, a 0/90° sine data ROM adapted to store values of the response function in directions of 0° and 90° calculated based on the sine function, a 0/90° cosine data ROM adapted to store values of the response function in directions of 0° and 90° calculated based on the cosine function, a 45/135° sine data ROM adapted to store values of the response function in directions of 45° and 135° calculated based on the sine function, and a 45/135° cosine data ROM adapted to store values of the response function in directions of 45° and 135° calculated based on the cosine function.

The Gabor filter application means may further include, to store parameters associated with the Gabor filters, a 27/63/117/153° sine data ROM adapted to store values of the response function in directions of 27°, 63°, 117°, and 153° calculated based on the sine function, and a 27/63/117/153° cosine data ROM adapted to store values of the response function in directions of 27°, 63°, 117°, and 153° calculated based on the cosine function, thereby to store values of the response function in directions of 27°, 63°, 117°, and 153° in which the sine and cosine functions have periodicity thereby to obtain values approximating values of the response function in directions of 22.5° which is the center angle between 0° and 45°, 67.5° which is the center angle between 45° and 90°, 112.5° which is the center angle between 90° and 135°, and 157.5° which is the center angle between 135° and 180°.

Each of the ROMs may be adapted to store a minimum number of data with no redundancies selected from values calculated based on the sine or cosine function in directions of the respective angles.

The face recognition apparatus may further include address conversion means for converting a feature value extraction position to corresponding addresses of the filter window data ROM, the sine data ROMs associated with the respective filter angles, and the cosine data ROMs associated with the respective filter angles, and the Gabor filter coefficient calculation means may read a filter window value and values of the response function associated with respective filter angles from the filter window data ROM and the sine data ROMs associated with the respective filter angles, and the cosine data ROMs associated with the respective filter angles in accordance with the addresses corresponding to the feature value extraction position supplied from the address conversion means, and the Gabor filter coefficient calculation means may determine the coefficients of the Gabor filters for the feature value extraction position by multiplying the filter window value and the values of the response function.

Thus, redundancy of data is eliminated using the characteristic of the Gaussian function and the periodicity of the sine and cosine function, and resultant minimum data is stored in the ROM thereby achieving a reduction in the hardware size.

The face recognition apparatus may further include filter type data storage means for storing data specifying filter types to be used at each feature value extraction position, and selection means for selectively reading, from the respective ROMs, values of the filter window and values the response function for use in determining the coefficients of the filters of the types specified by the data stored in the filter type data storage means, for each feature value extraction position, and supplying the read values to the Gabor filter coefficient calculation means.

The types and the number of Gabor filters may be arbitrarily selected depending on the position (the feature value extraction position) in the input face image. This makes it possible to achieve high recognition accuracy in many applications such as face recognition, smile recognition, sex recognition, etc. Furthermore, it is possible to reduce the processing time compared with the case in which types and the number of filters are fixed (i.e., all filters are used for all feature value extraction positions).

According to an embodiment of the present invention, there is provided a computer program described in a form readable by a computer and executable by the computer to perform a process of recognizing an input face image on the basis of one or more registered face images, the process including the steps of inputting the face image to be recognized, applying a Gabor filter, the applying the Gabor filter including calculating the convolution of a pixel value at each feature value extraction position of the input image and coefficients of a Gabor filter defined by a Gabor function representing a spatial characteristic using a Gaussian function representing a window and a sine function or a cosine function representing a frequency response, for each of a predetermined set of frequency values and for each of a predetermined set of angles of the response function of the Gabor filter thereby determining a Gabor jet including as many scalar values as there are Gabor filters, calculating the similarity between a Gabor jet at each feature value extraction position of the input face image and a Gabor jet of a registered face image and determining a similarity vector whose elements are given by values indicating similarity at respective feature value extraction positions, and determining whether the input face image is identical to the registered face image, on the basis of the similarity vector, wherein the step of applying Gabor filter includes reading values from a filter window data ROM adapted to store values of the filter window determined by calculating the Gaussian function, sine data ROMs adapted to store values of the response function determined by calculating the sine function for the respective angles, and cosine data ROMs adapted to store values of the response function determined by calculating the cosine function for the respective angles, calculating coefficients of the Gabor filter by multiplying the value read from the filter window data ROM and the values read from the sine data ROMs and the cosine data ROMs, and calculating the convolution of the input face image and the calculated coefficients of the Gabor filter.

This computer program defines the procedure to be executed on the computer to perform the process described above. In other words, by installing this computer program in a computer, it is possible to implement the functions of the face recognition apparatus described above on the computer.

As described above, the present invention provides great advantages. That is, the present invention provides the face recognition apparatus, the face recognition method, the Gabor filter application apparatus, and the computer program, capable of properly extracting a feature value of a face image by using the Gabor filter represents the spatial characteristic, based on the Gaussian function representing the window and the sine or cosine function representing the frequency response.

The present invention also provides the face recognition apparatus, the face recognition method, the Gabor filter application apparatus, and the computer program, capable of recognizing a face image with high accuracy without fixing the types and the numbers of coefficients of the Gabor filter.

The present invention also provides the face recognition apparatus, the face recognition method, the Gabor filter application apparatus, and the computer program, capable of performing a face image recognition process with high accuracy by using a Gabor filter without increasing a hardware size or a computation load.

Furthermore, the total data size of data associated with the Gabor filter coefficients stored in the ROM is minimized by eliminating redundancy of data associated with the Gaussian function representing the window and redundancy of data associated with the sine or cosine function representing the frequency response. That is, the filter coefficients are divided into values calculated based on the Gaussian function and values calculated based on the sine or cosine function, and redundancy of data is eliminated using the characteristic of the Gaussian function and the periodicity of the sine and cosine function, and resultant minimum data is stored in the ROM thereby achieving a reduction in the hardware size.

Furthermore, the types and the number of Gabor filters can be arbitrarily selected depending on the position (the feature value extraction position) in the input face image. This makes it possible to achieve high recognition accuracy in many applications such as face recognition, smile recognition, sex recognition, etc. Furthermore, it is possible to reduce the processing time compared with the case in which types and the number of filters are fixed (i.e., all filters are used for all feature value extraction positions).

Further objects, features, and advantages of the present invention will become apparent from the following description of exemplary embodiments with reference to the accompanying drawings.

BRIEF DESCRIPTION OF THE DRAWINGS

FIG. 10A show values of a filter window with a fixed size of 24×24 pixels calculated, for respective XY positions, based on a Gaussian function;

FIG. 10B show values of a filter window with a fixed size of 24×24 pixels calculated, for respective XY positions, based on a Gaussian function;

FIG. 11A show values of a response function in directions of 0° and 90° calculated based on a sine function, for 24×24 XY positions of a window;

FIG. 11B show values of a response function in directions of 0° and 90° calculated based on a sine function, for 24×24 XY positions of a window;

FIG. 12A show values of a response function in directions of 0° and 90° calculated based on a cosine function, for 24×24 XY positions of a window;

FIG. 12B show values of a response function in directions of 0° and 90° calculated based on a cosine function, for 24×24 XY positions of a window;

FIG. 13A show values of a response function in a direction of 45° calculated based on a sine function, for 24×24 XY positions of a window;

FIG. 13B show values of a response function in a direction of 45° calculated based on a sine function, for 24×24 XY positions of a window;

FIG. 13C show values of a response function in a direction of 135° calculated based on a sine function, for 24×24 XY positions of a window;

FIG. 13D show values of a response function in a direction of 135° calculated based on a sine function, for 24×24 XY positions of a window;

FIG. 14A show values of a response function in a direction of 45° calculated based on a cosine function, for 24×24 XY positions of a window;

FIG. 14B show values of a response function in a direction of 45° calculated based on a cosine function, for 24×24 XY positions of a window;

FIG. 14C show values of a response function in a direction of 135° calculated based on a cosine function, for 24×24 XY positions of a window;

FIG. 14D show values of a response function in a direction of 135° calculated based on a cosine function, for 24×24 XY positions of a window;

FIG. 15A show values of a response function in a direction of 27° calculated based on a sine function, for 24×24 XY positions of a window;

FIG. 15B show values of a response function in a direction of 27° calculated based on a sine function, for 24×24 XY positions of a window;

FIG. 16A show values of a response function in a direction of 27° calculated based on a cosine function, for 24×24 XY positions of a window;

FIG. 16B show values of a response function in a direction of 27° calculated based on a cosine function, for 24×24 XY positions of a window;

FIG. 17 shows an example of an address conversion table for use in quickly determining an address of a Gaussian data ROM corresponding to a control signal associated with a position Y and X in a window;

FIG. 18A shows an example of an address conversion table for use in quickly determining an address of a 0/90° sine data ROM, at which there is stored a value of a response function in a direction of 0° calculated based on a sine function, corresponding to a control signal associated with a position Y and X in a window;

FIG. 18B shows an example of an address conversion table for use in quickly determining an address of a 0/90° sine data ROM, at which there is stored a value of a response function in a direction of 90° calculated based on a sine function, corresponding to a control signal associated with a position Y and X in a window;

FIG. 19A shows an example of an address conversion table for use in quickly determining an address of a 0/90° cosine data ROM, at which there is stored a value of a response function in a direction of 0° calculated based on a cosine function, corresponding to a control signal associated with a position Y and X in a window;

FIG. 19B shows an example of an address conversion table for use in quickly determining an address of a 0/90° cosine data ROM, at which there is stored a value of a response function in a direction of 90° calculated based on a cosine function, corresponding to a control signal associated with a position Y and X in a window;

FIG. 20A shows an example of an address conversion table for use in quickly determining an address of a 45/135° sine data ROM, at which there is stored a value of a response function in a direction of 45° calculated based on a sine function, corresponding to a control signal associated with a position Y and X in a window;

FIG. 20B shows an example of an address conversion table for use in quickly determining an address of a 45/135° sine data ROM, at which there is stored a value of a response function in a direction of 135° calculated based on a sine function, corresponding to a control signal associated with a position Y and X in a window;

FIG. 21A shows an example of an address conversion table for use in quickly determining an address of a 45/135° cosine data ROM, at which there is stored a value of a response function in a direction of 45° calculated based on a cosine function, corresponding to a control signal associated with a position Y and X in a window;

FIG. 21B shows an example of an address conversion table for use in quickly determining an address of a 45/135° cosine data ROM, at which there is stored a value of a response function in a direction of 135° calculated based on a cosine function, corresponding to a control signal associated with a position Y and X in a window;

Figure 22A:
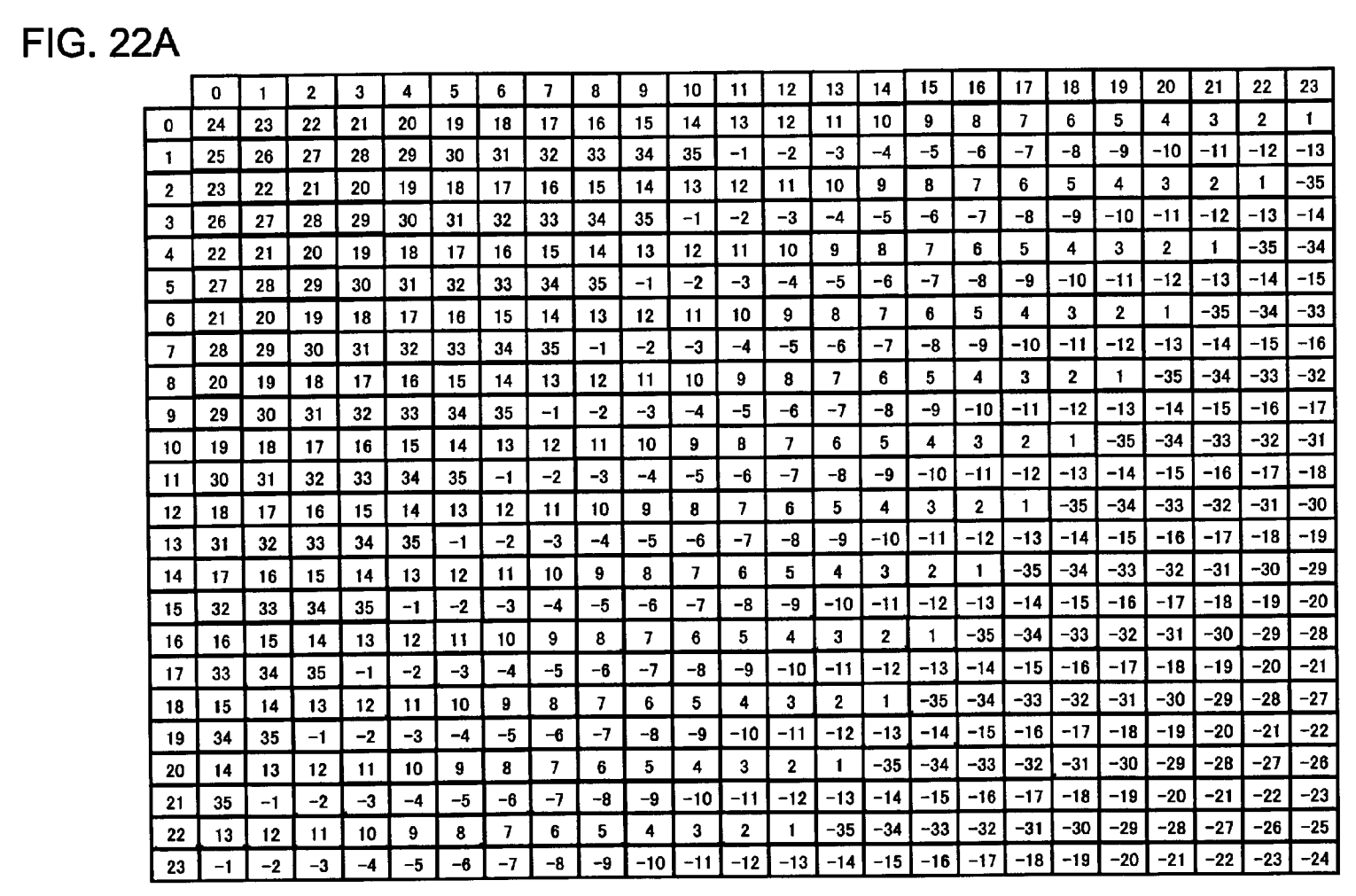
Figure 22C:
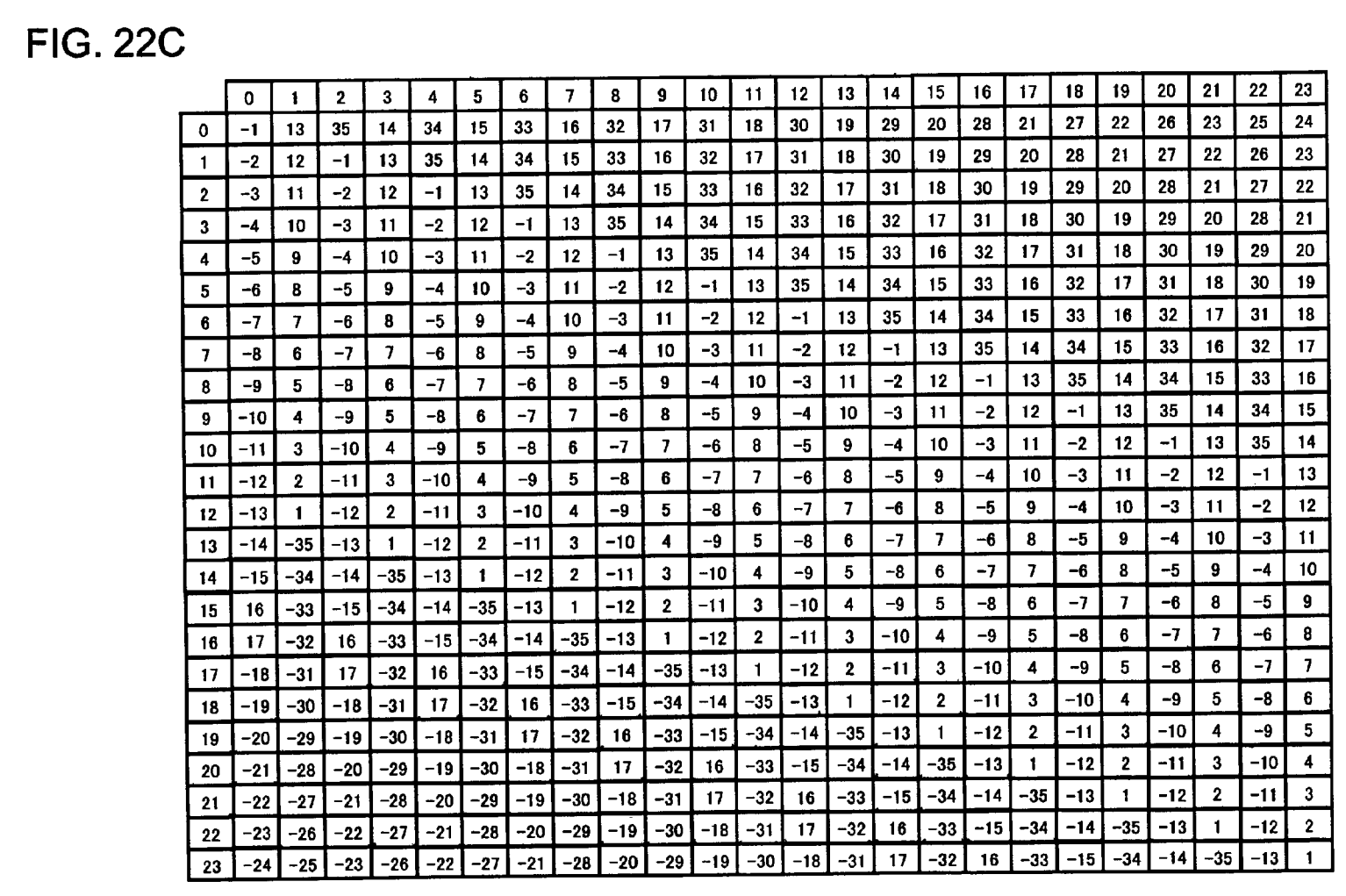
Figure 22D:
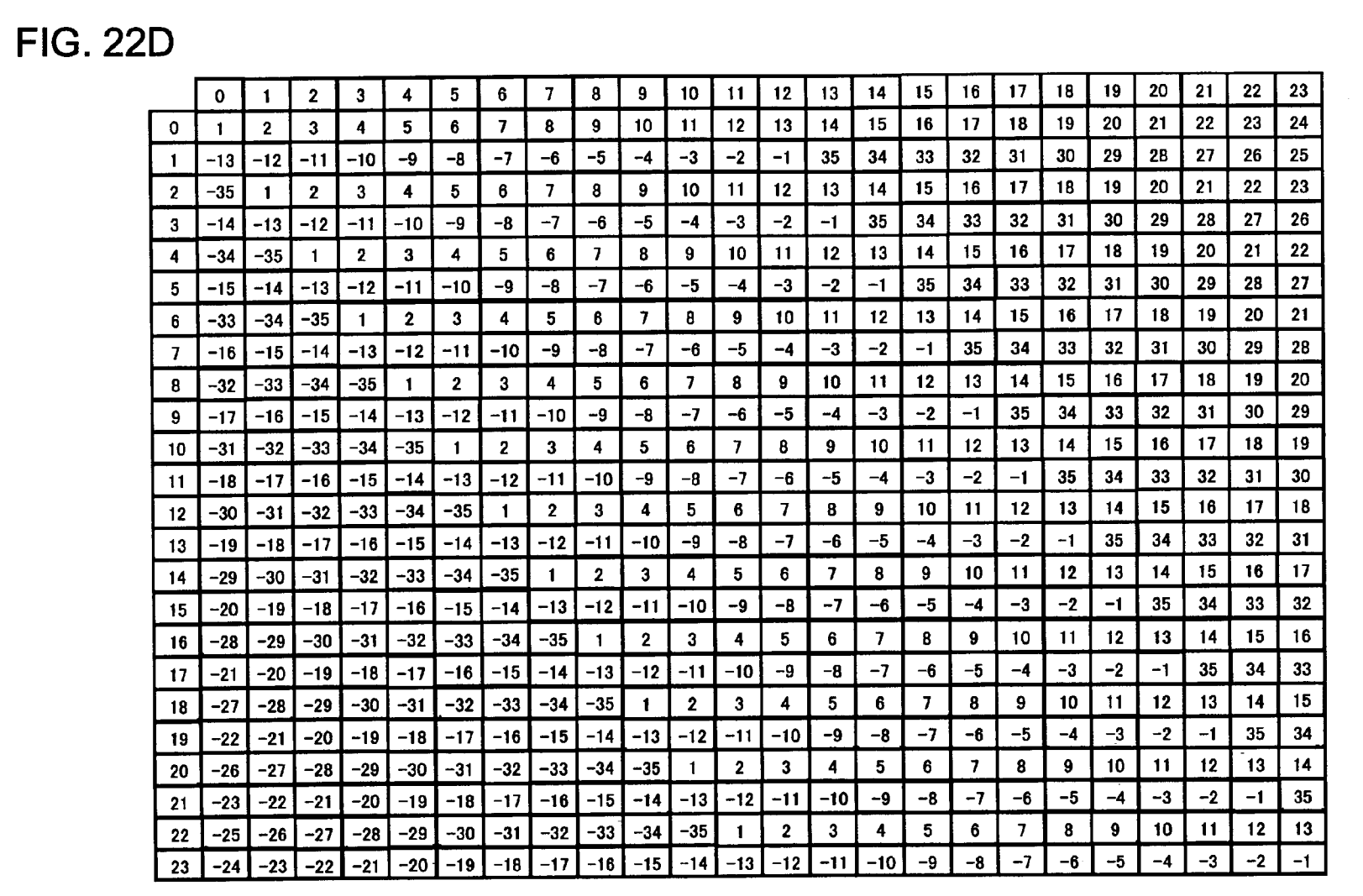

FIG. 22A shows an example of an address conversion table for use in quickly determining an address of a 27/63/117/153° sine data ROM, at which there is stored a value of a response function in a direction of 27° calculated based on a sine function, corresponding to a control signal associated with a position Y and X in a window;

FIG. 22B shows an example of an address conversion table for use in quickly determining an address of a 27/63/117/153° sine data ROM, at which there is stored a value of a response function in a direction of 63° calculated based on a sine function, corresponding to a control signal associated with a position Y and X in a window;

FIG. 22C shows an example of an address conversion table for use in quickly determining an address of a 27/63/117/153° sine data ROM, at which there is stored a value of a response function in a direction of 117° calculated based on a sine function, corresponding to a control signal associated with a position Y and X in a window;

FIG. 22D shows an example of an address conversion table for use in quickly determining an address of a 27/63/117/153° sine data ROM, at which there is stored a value of a response function in a direction of 153° calculated based on a sine function, corresponding to a control signal associated with a position Y and X in a window;

Figure 23C:
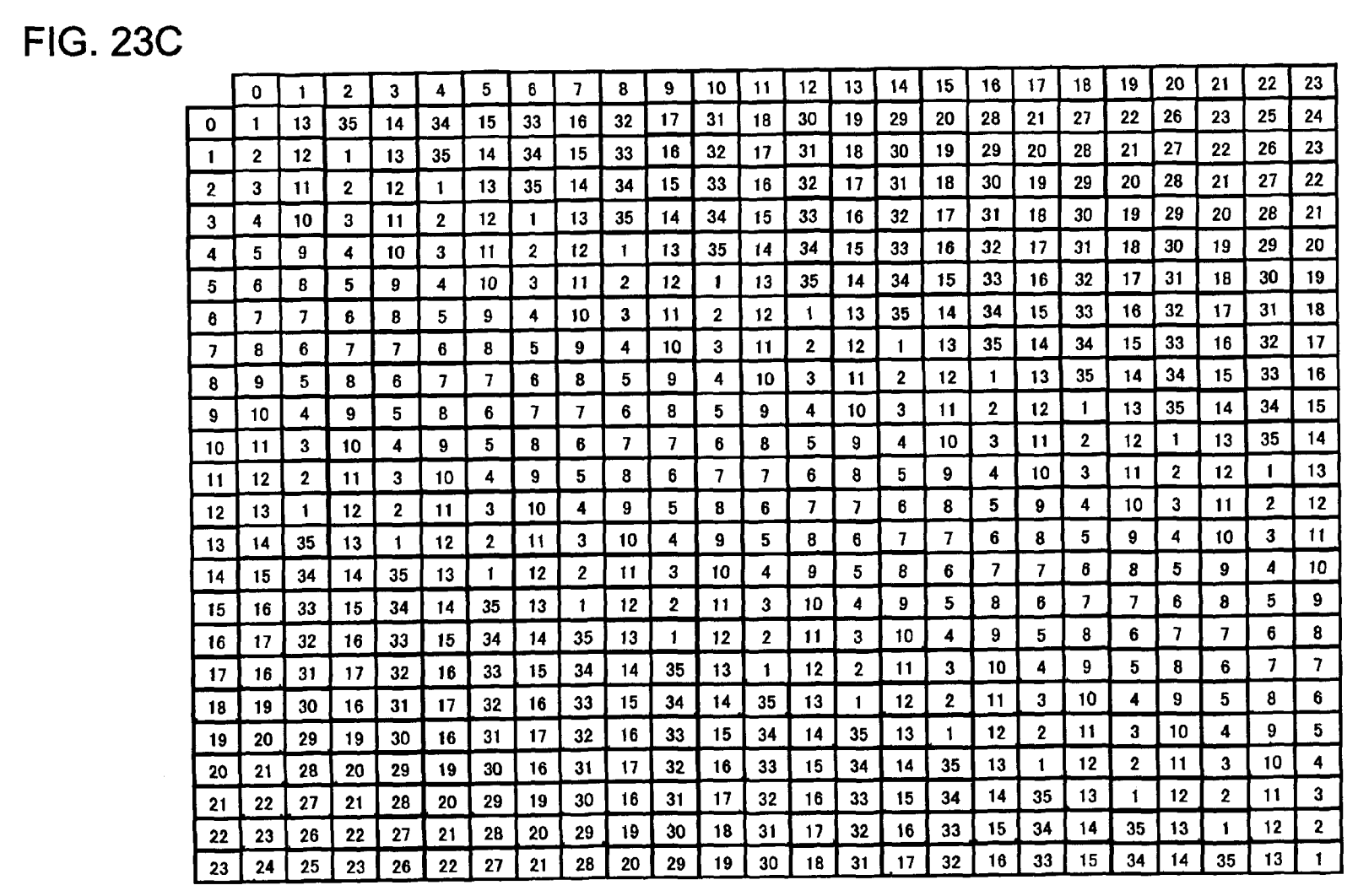
Figure 23D:
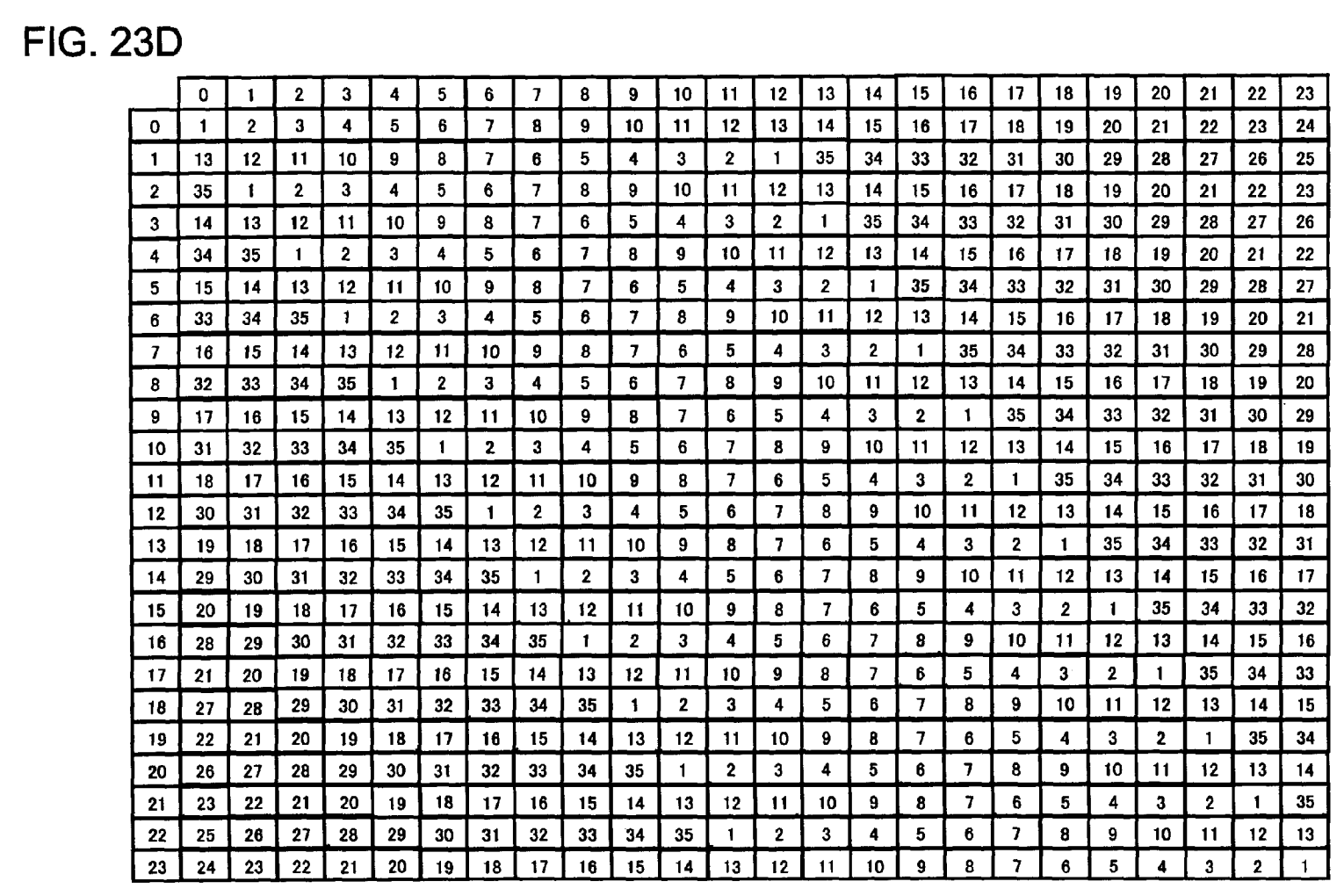

FIG. 23A shows an example of an address conversion table for use in quickly determining an address of a 27/63/117/153° cosine data ROM, at which there is stored a value of a response function in a direction of 27° calculated based on a cosine function, corresponding to a control signal associated with a position Y and X in a window;

FIG. 23B shows an example of an address conversion table for use in quickly determining an address of a 27/63/117/153° cosine data ROM, at which there is stored a value of a response function in a direction of 63° calculated based on a cosine function, corresponding to a control signal associated with a position Y and X in a window;

FIG. 23C shows an example of an address conversion table for use in quickly determining an address of a 27/63/117/153° cosine data ROM, at which there is stored a value of a response function in a direction of 117° calculated based on a cosine function, corresponding to a control signal associated with a position Y and X in a window;

FIG. 23D shows an example of an address conversion table for use in quickly determining an address of a 27/63/117/153° cosine data ROM, at which there is stored a value of a response function in a direction of 153° calculated based on a cosine function, corresponding to a control signal associated with a position Y and X in a window.

DESCRIPTION OF THE PREFERRED EMBODIMENTS

The present invention is described in further detail below with reference to embodiments in conjunction with the accompanying drawings.

As described above, the face recognition includes the face extraction process for extracting a face image from an input image, and the face recognition process for recognizing the extracted face image. The definitions of face detection and face recognition are again described below.

The face detection refers to a process of detecting a human face from an image (a still photographic picture or a field or frame of a motion picture) and determine the location and the size of the detected human face. Note that in some cases, one picture includes a plurality of faces. On the other hand, the face recognition refers to determination of whether a detected face is of a particular person registered in advance.

Figure 1:
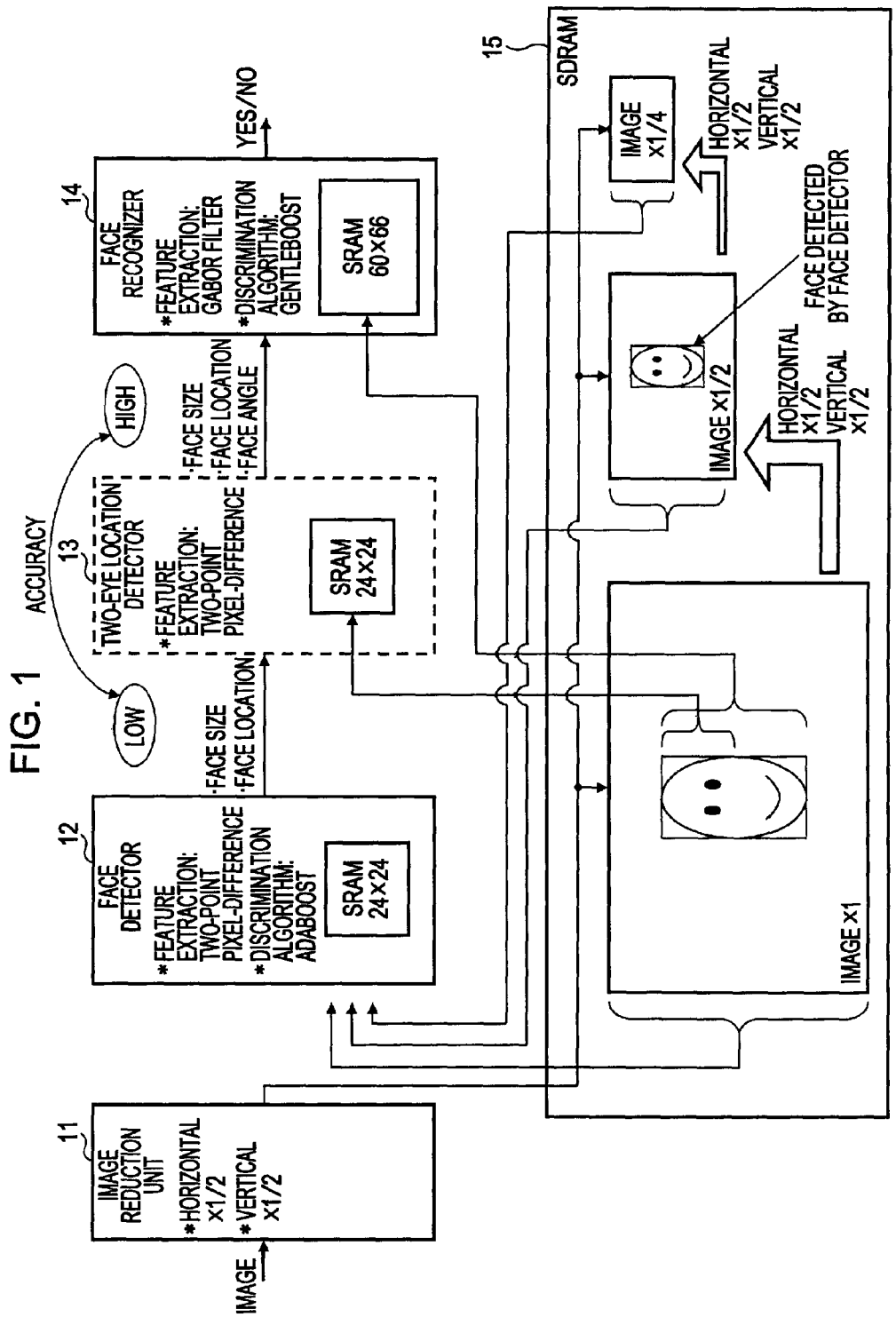
FIG. 1 is a schematic diagram illustrating a total configuration of a face recognition system according to an embodiment of the present invention.

FIG. 1 is a schematic diagram illustrating a total configuration of a face recognition system according to an embodiment of the present invention. As shown in FIG. 1, the face recognition system 1 includes an image reduction unit 11, a face detector 12, an eye position detector 13, a face recognition unit 14, and a memory (SDRAM) 15 for storing a plurality of images. The face detector 12, the eye position detector 13, and the face recognition unit 14 each have a local memory (SDRAM). In the present system 1, an image is input and a flag indicating whether the image is of a face of a particular person is output.

The image reduction unit 11 produces an image by reducing an input image to ½ in both horizontal and vertical directions, and stores the resultant reduced image in the SDRAM (Synchronous DRAM) 15 together with the original input image. In the example shown in FIG. 1, the input image is denoted as "image×1", the image produced by reducing the size of the input image to ½ in both horizontal and vertical directions is denoted as "image×½", and the image produced by reducing the size of the input image to ¼ in both horizontal and vertical directions is denoted as "image×¼". These three images are stored in the SDRAM 15.

To obtain reduced images with high accuracy, it is desirable to produce the reduced images directly from the original input image. However, this needs a greater hardware size. To obtain reduced images with a less hardware size, image reduction to ½ may be performed repeatedly. That is, the original input image (image with the size of ×1) is first reduced to obtain the image with the size of ×½, and this image with the size of ×½ is further reduced to obtain the image with the size of ×¼.

The face detector 12 detects a face from the input image and from each of all reduced images stored in the SDRAM 15, and further determines the size and the position of each of the detected faces. If the high processing speed is not important, it is easy to detect the face position by scanning over the entire image area. To detect a face with an unfixed size, one method is to fix the image resolution and prepare a plurality of face detectors for various face sizes. Another method is to fix an allowable face size and prepare a single face detector. In this case, the input image is reduced to various image sizes and subjected to the face detection process. The latter method is more useful in practical use. Thus, in the present example shown in FIG. 1, the face detector 12 determines whether there is a face within an area of 24×24 pixels for each of the image with the size of ×1, the image with the size of ×½, and the image with size of ×¼ produced by the image reduction unit In a case where the reduction ratio of ½ is too coarse, the image reduction unit 11 may further produce an image with a size of ×⅞, an image with a size of ×⅝, and an image with a size of ×⅝, and the face detector 12 may perform the face detection also for these images.

The face detection may be performed using a two-point difference method. In this method, the difference in feature value between two pixels is checked for many combinations of two pixels within the area of 24×24 pixels. The classification may be performed using the gentleboost algorithm.

The eye position detector 13 determines the positions of two respective eyes according to which to normalize the face in the image with the high resolution detected by the face detector 12 for preparation of the face recognition. More specifically, the position of the respective two eyes are detected, and the size, the position, and the angle of the face in the image with higher resolution are determined based on the size, the position, and the angle of the face detected in the image with lower resolution.

The face detector 12 detects a face for an image with a resolution of 24×24 pixels, while the face recognition unit 14 recognizes the face for an image with a resolution of 60×66 pixels. This means that the face recognition performed by the face recognition unit 14 needs a higher resolution than is needed in the face detection performed by the face detector 12. Therefore, for example, when a face is detected by the face detector for an image with the size of ×½, two eyes are detected from a corresponding area of an image with the size of ×1.

In the detection of two types, feature extraction may be performed using the two-point pixel-difference method. The feature extraction using the two-point pixel-difference method is performed for an image with a size of 24×24 pixels as with the face detection by the face detector 12, and thus the same hardware can be used for both the eye detection and the face detection by performing the processes in serial.

The face recognition unit 14 determines the size, the position, and the angle of the face from the face image for which the positions of two eyes have been determined by the eye position detector 13, and the face recognition unit 14 converts the face image into a normalized face image with a size of 60×66 pixels in accordance with the detected size, the position, and the angle of the face. The normalized face image is then stored in an internal SRAM for use in determination as to whether the face image is identical to the registered face image.

In the present embodiment, as described above, the face recognition unit 14 performs the Gabor filtering to extract a feature of the face image. The classification is performed using the gentleboost algorithm. More specifically, the similarity between the data obtained as a result of the Gabor filtering performed on the normalized face image and data obtained by performing the Gabor filtering on the registered face image is determined, and the gentleboost is then applied to the determined similarity to determine whether the face image is identical to the registered image.

Figure 2:
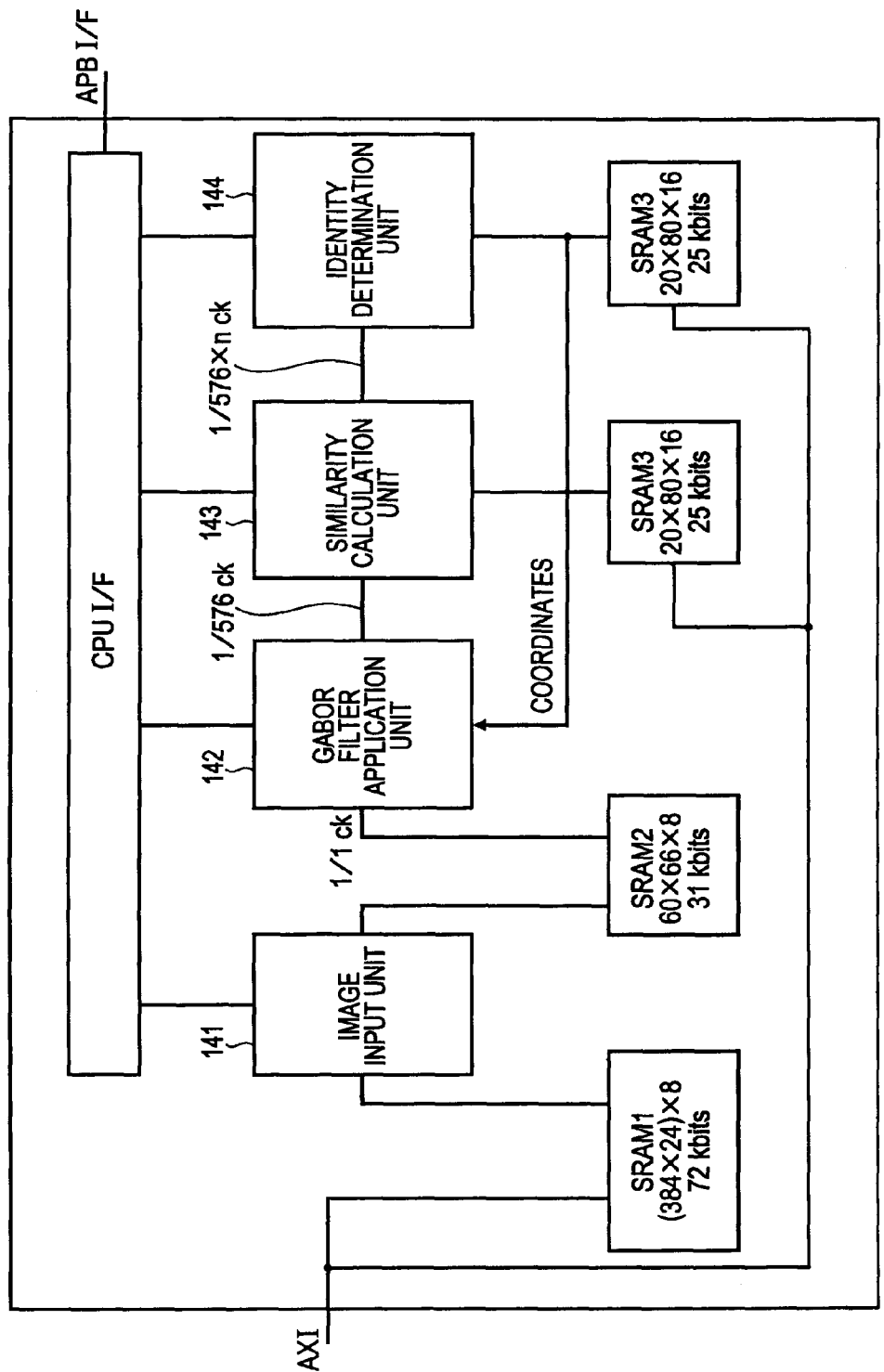
FIG. 2 illustrates an example of a configuration of a face recognition unit.

FIG. 2 illustrates an example of a configuration of the face recognition unit 14. In this example shown in FIG. 2, the face recognition unit 14 includes a face image input unit 141, a Gabor filter application unit 142, a similarity calculation unit 143, and a matching determination unit 144.

Figure 3:
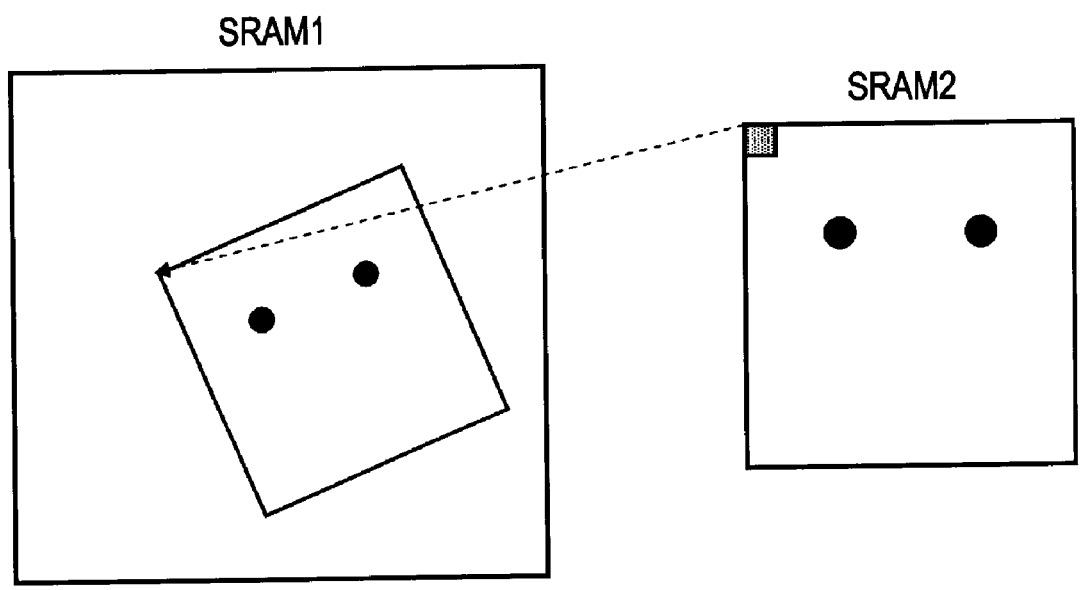
FIG. 3 illustrates a manner in which a detected face image is reduced, shifted, and/or rotated to obtain a normalized form used in face recognition.

The face image input unit 141 first reads, from the SDRAM 15, a face image with a resolution to be subjected to the face recognition based on the positions of the two eyes detected in the eye detection process, and supplies the face image to the local SRAM 1 in the face recognition unit 14. The face image input unit 141 then determines the size, the position, and the angle of the face based on the positions of the two eyes, and normalizes the face image stored in a SRAM-1 according to the determined size, position, and angle of the face thereby generating a face image to be subjected to the face recognition. The resultant face image is stored in a local SRAM-2 of the face recognition unit 14. More specifically, the face image input unit 141 performs reduction, shifting, and/or rotation, as required, on the face image read from the SRAM-1 so that the positions of the right and left eyes come to fixed coordinates in the SRAM-2 in accordance with the eye position information, thereby producing the face image to be subjected to the face recognition in the SRAM-2 (see FIG. 3).

The Gabor filter application unit 142 applies the Gabor filter to the face image normalized by the image input unit 141.

Figure 4A:
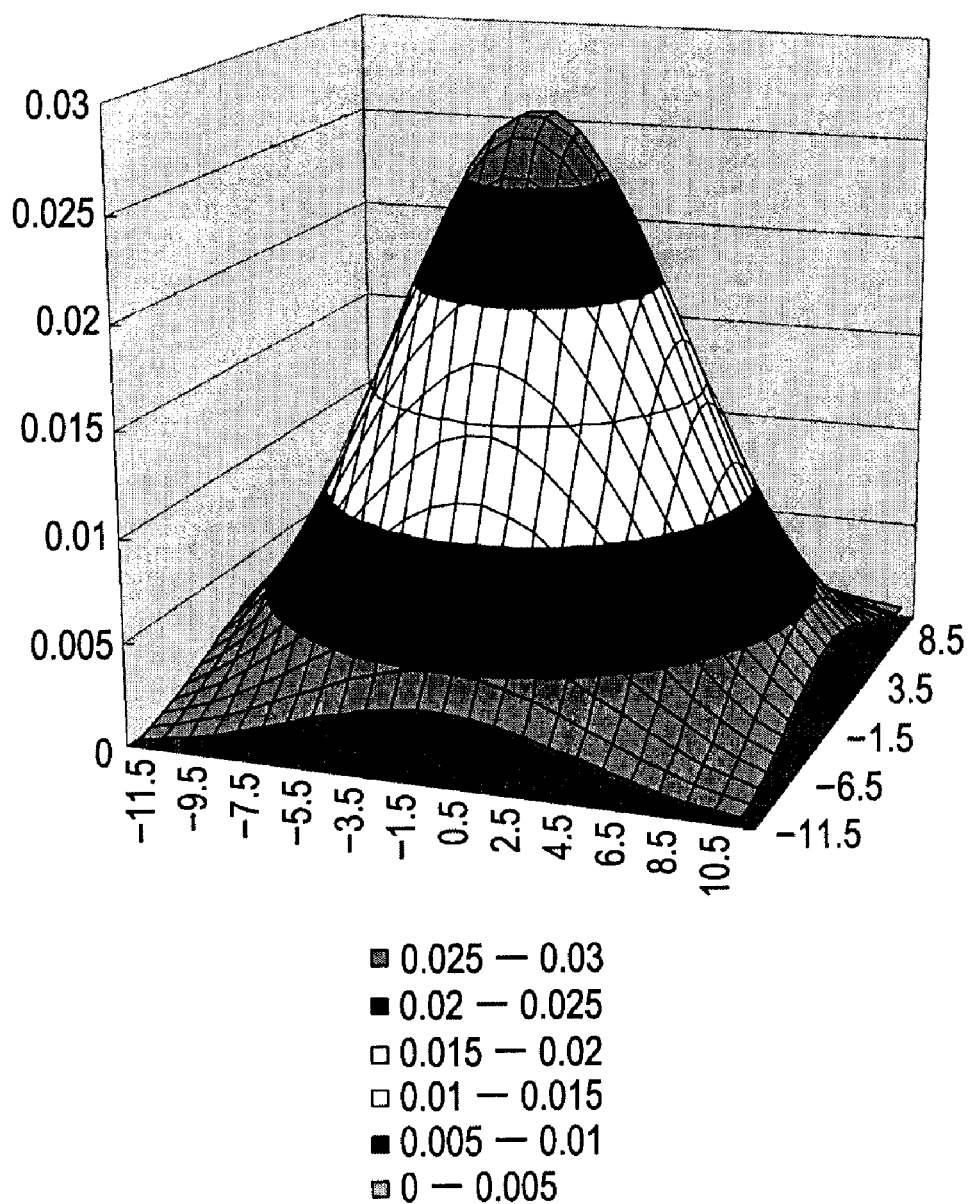
FIG. 4A illustrates a filter window with a fixed size of 24×24 pixels expressed by a Gaussian function.
Figure 4B:
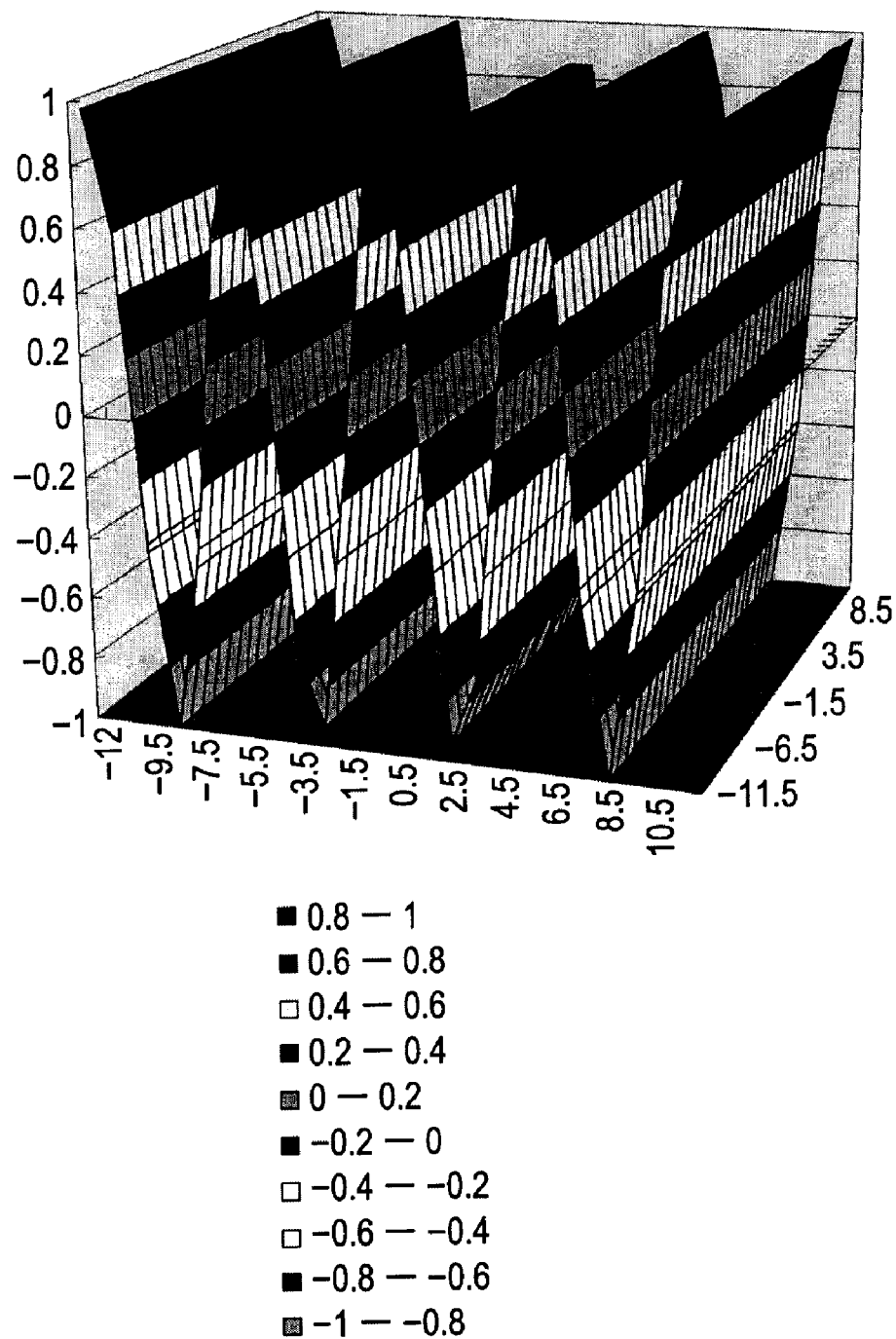
FIG. 4B illustrates a response function based on a sine or cosine function.
Figure 4C:
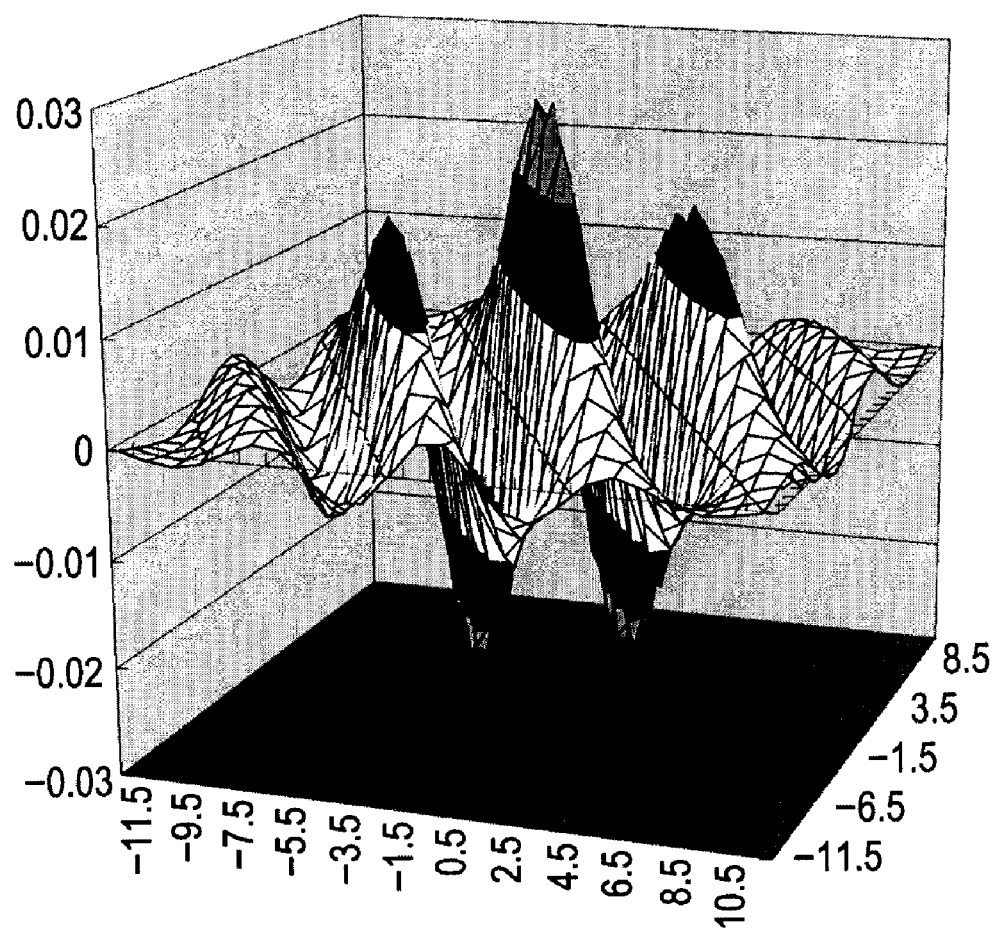
FIG. 4C illustrates a Gabor filter obtained by multiplying the response function shown in FIG. 4B by the filter window shown in FIG. 4A.
Figure 4D:
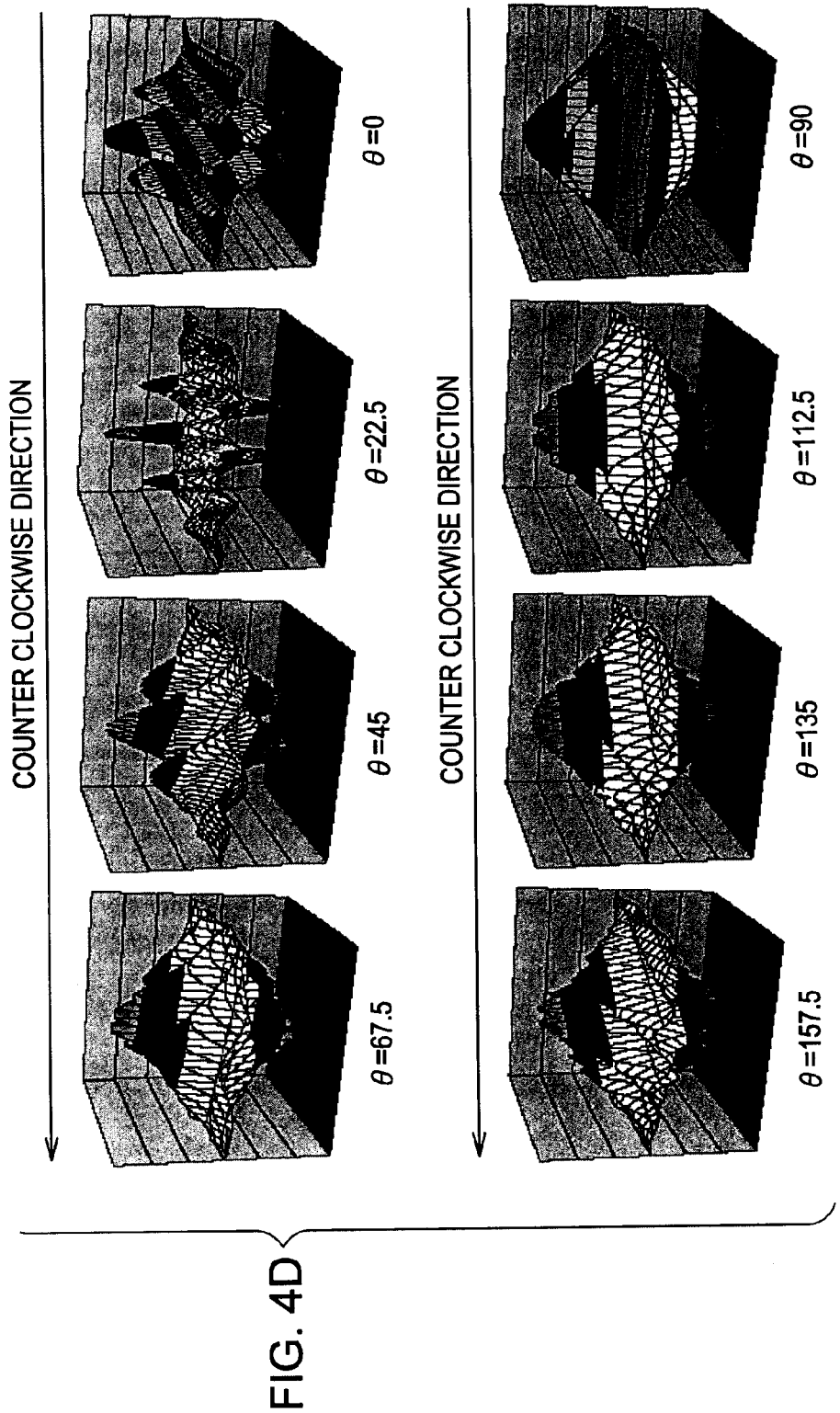
FIG. 4D illustrates 8 types of Gabor filters each obtained by multiplying one of 8 response functions different in direction by 22.5° from one to another by the filter window.
Figure 4E:
FIG. 4E illustrates 40 types of Gabor filters each obtained by multiplying a response function with a frequency f selected from 5 values and with an angle selected from 8 values by the filter window.

As described above, the Gabor filter represents a spatial characteristic, based on a Gaussian function representing a window and a sine or cosine function representing a frequency response. In the present embodiment, the filter window has a fixed size of 24×24 pixels as shown in FIG. 4A. By multiplying a response function expressed by a sine or cosine function with a particular frequency such as that shown in FIG. 4B by the filter window, a Gabor filter is obtained as shown in FIG. 4C. For example, if eight response functions each expressed by a sine or cosine function in one of eight directions 0°, 22.5°, 45°, 67.5°, 90°, 112.5°, 135°, and 157.5°, each having a difference in direction by 22.5° from adjacent directions, are respectively multiplied by the filter window, eight Gabor filters are obtained as shown in FIG. 4D. Furthermore, if response functions are prepared for five different frequencies f in a range from a low frequency to a high frequency in each of the eight directions θ, then a total of 40 Gabor filters are obtained as shown in FIG. 4E. That is, the Gabor filter (Gabor kernel K(x, y)) is given by the following formula.

$$K(x, y) = \frac{f}{2\pi}\exp\left(-\frac{f^2}{2}(x^2+y^2)(\sin 2\theta + \cos 2\theta)\right)\left\{\exp(i2\pi f(x\sin\theta + y\sin\theta)) - \exp\left(-\frac{1}{2f^2}\right)\right\}$$

$$\text{gauss}(x, y) = \frac{f}{2\pi}\exp\left(-\frac{f^2}{2}(x^2+y^2)\right)$$

-continued $$Re(x, y) = \cos(2\pi f(x\cos\theta + y\sin\theta))$$

$$im(x, y) = \sin(2\pi f(x\cos\theta + y\sin\theta))$$

$$x, y = -11.5, -10.5, -9.5, \ldots, -1.5, -0.5, 0.5, 1.5, \ldots, 9.5, 10.5, 11.5$$

The operation of the Gabor filtering is defined by the convolution of coefficients of the Gabor filter $G_i(x, y)$ and a pixel value $I(x, y)$ being subjected to the Gabor filtering. The coefficients of each Gabor filter can be divided into a real part $Re(x, y)$ including a cosine function representing a frequency response and an imaginary part $Im(x, y)$ including a sine function representing a frequency response. If the revolution is calculated separately for the real part and the imaginary part, and the results are added together, then a scalar value $J_i(x, y)$ indicating the result of the Gabor filtering is obtained.

$$J_i(x, y) = G_i(x, y) \otimes I(x, y)$$

where the above expressions, (x, y) indicates a pixel position at which a feature value is extracted, and subscript i is used to indicate that the calculation is performed using an i-th Gabor filter and the result is obtained using the i-th Gabor filter.

Thus, a total of 40 scalar values are obtained by applying up to 40 Gabor filters to a pixel value at a feature value extraction position (x, y), and a set of the resultant 40 scalar values $\{J_1, J_2, \ldots, J_{40}\}$ is referred to as a Gabor jet.

The similarity calculation unit 143 determines similarity d by calculating the normalized correlation coefficient between the Gabor jet GS calculated for the input image and a Gabor jet GR of a registered image, for each feature value extraction position.

$$d = \frac{GS \cdot GR}{|GS||GR|}$$

In the present embodiment, the similarity is determined by calculating the normalized correlation coefficient for each of 82 feature value extraction positions (see FIG. 5) selected from a total of 60×66 pixels on the face image. As a result a similarity vector D is obtained whose elements $d_0, d_1, \ldots, d_{81}$ respectively indicate normalized correlation coefficients calculated for the 82 feature value extraction positions.

$$D = (d_0, d_1 d_2, \ldots, d_{81})$$

In the above explanation, it has been described that up to 40 Gabor filters are used in the calculation. This means that 40 Gabor filters are not necessarily applied for all 82 feature value extraction positions. The number of Gabor filters used depends on the feature value extraction positions at which the similarity is calculated, and the type of the Gabor filter and the number of elements of the Gabor filter (i.e., the number of elements of the Gabor jet) vary depending on the feature value extraction positions.

The matching determination unit 144 determines whether the input image can be regarded as being identical to the registered image, on the basis of the similarity vector. In the present embodiment, the classification in the above determination is performed using the gentleboost algorithm as described below.

$$y000 = a000 \times (dj000 > q000) + b000$$

$$y001 = a001 \times (dj001 > q001) + b001$$

$$y002 = a002 \times (dj002 > q002) + b002$$

...

$$y159 = a159 \times (dj159 > q159) + b159$$

where $0 \leq j000, j001, j002, \ldots, j159 \leq 81$

Note that values of a, q, and b are registered in advance in the form of a dictionary.

The determination as to whether the input image is identical to the registered image is made according to the following mathematical process.

if (($y000 + y001 = y002 = \ldots = y159$)>threshold) face
   OK else face NG

Although the identity determination is made using the gentleboost algorithm in the present embodiment, the identity determination is not limited to the gentleboost algorithm, but other algorithms or techniques may be used. For example, the identity determination may be made using a support vector machine such that classification is performed based on a value at a boundary plane of a similarity vector using the support vector machine.

Figure 6:
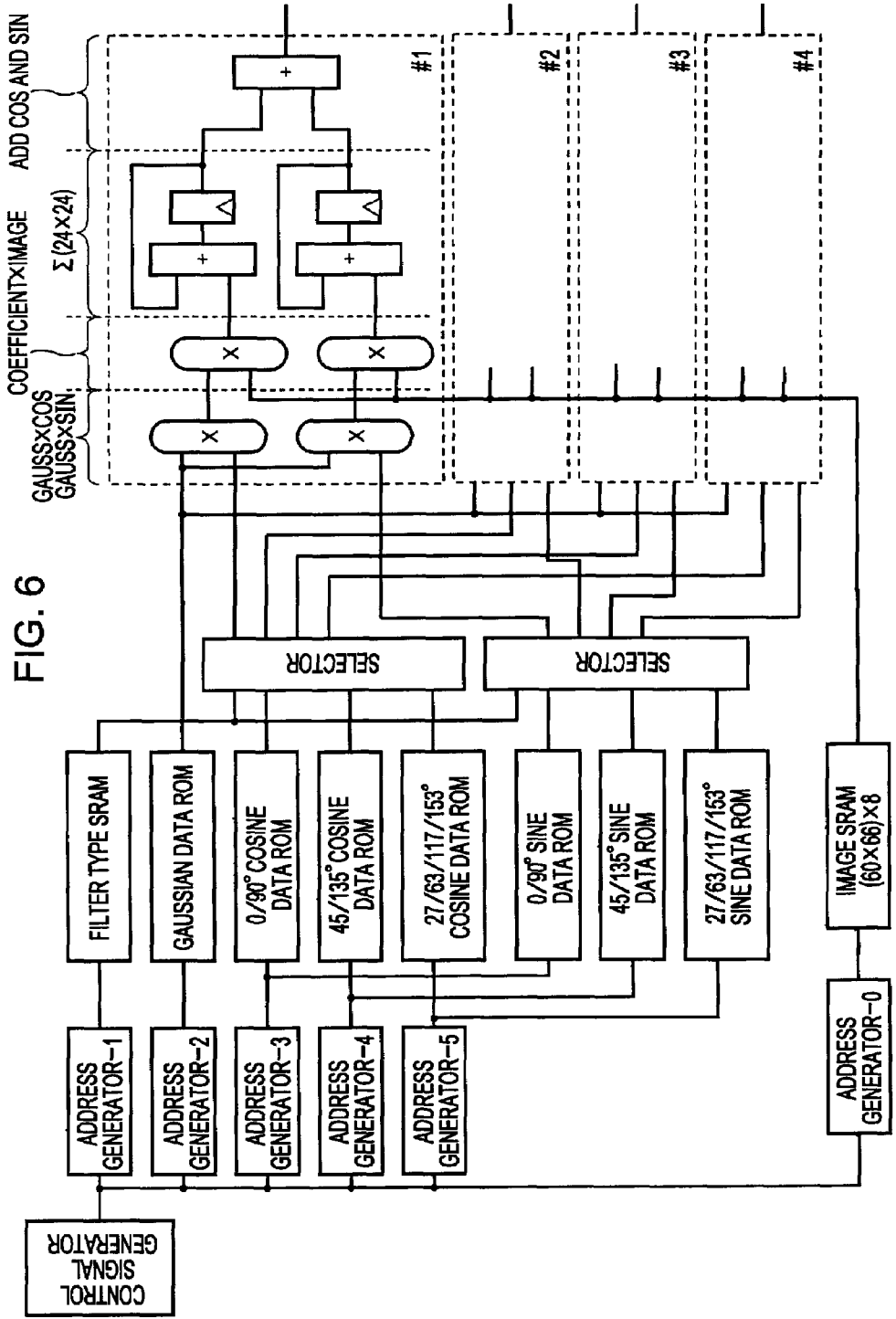
FIG. 6 illustrates an example of a configuration of a Gabor filter application unit.
Figure 7:
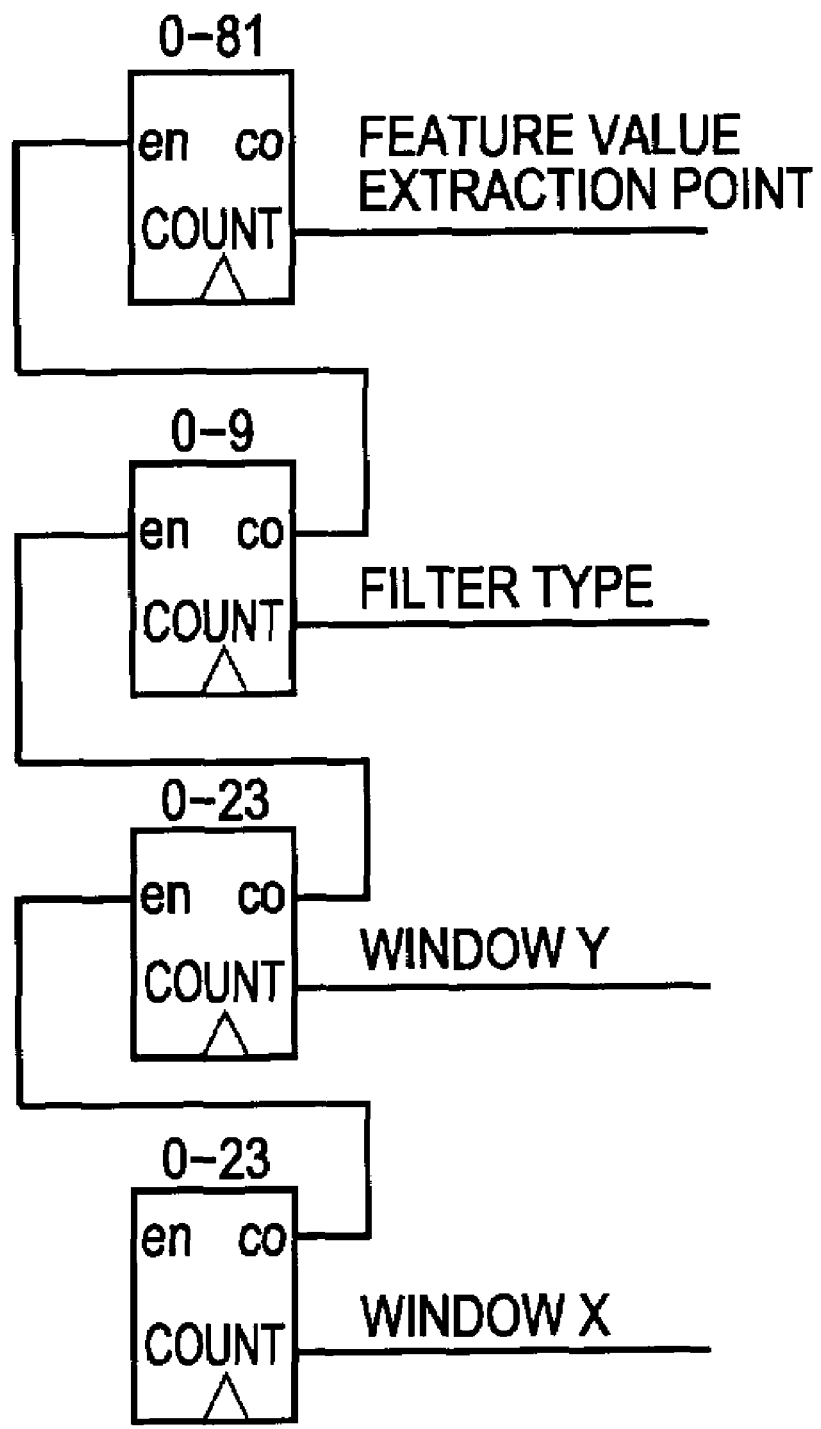
FIG. 7 illustrates an example of an internal configuration of a control signal generator.

FIG. 6 illustrates an example of a configuration of the Gabor filter application unit 142. In the example shown in FIG. 6, the Gabor filter application unit 142 operates in accordance with control signals generated by a control signal generator. FIG. 7 illustrates an example of an internal configuration of the control signal generator, and FIG. 8 illustrates control signals generated by the control signal generator.

As shown in FIG. 7, the control signal generator includes a feature value extraction position counter adapted to specify the feature value extraction position, a filter type counter adapted to specify the filter type for each feature value extraction position, and a Y window position counter and a X window position counter adapted to specify Y and X of a filter window with 24×24 pixels.

Figure 5:
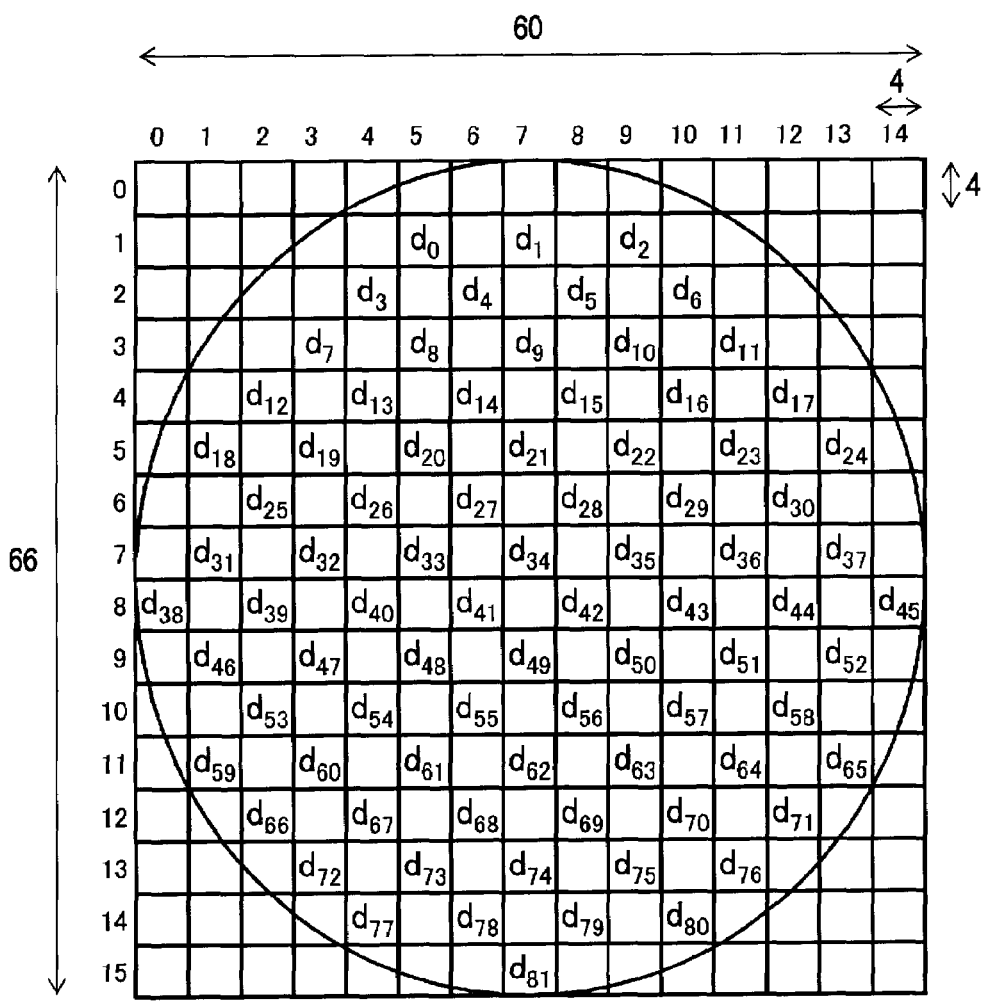
FIG. 5 illustrates 82 feature value extraction positions on a normalized face image with 60×66 pixels.

As shown in FIG. 5, to extract feature values at 82 respective positions of one image (i.e., one face), the count value of the feature value extraction position counter varies from 0 to 81 to sequentially specify the feature value extraction positions. The types and the number of Gabor filters used vary depending on the feature value extraction positions. In the example shown in FIG. 6, the Gabor filter application unit 142 is configured such that the filtering process is performed in parallel using 4 Gabor filters at a time.

Figure 8:
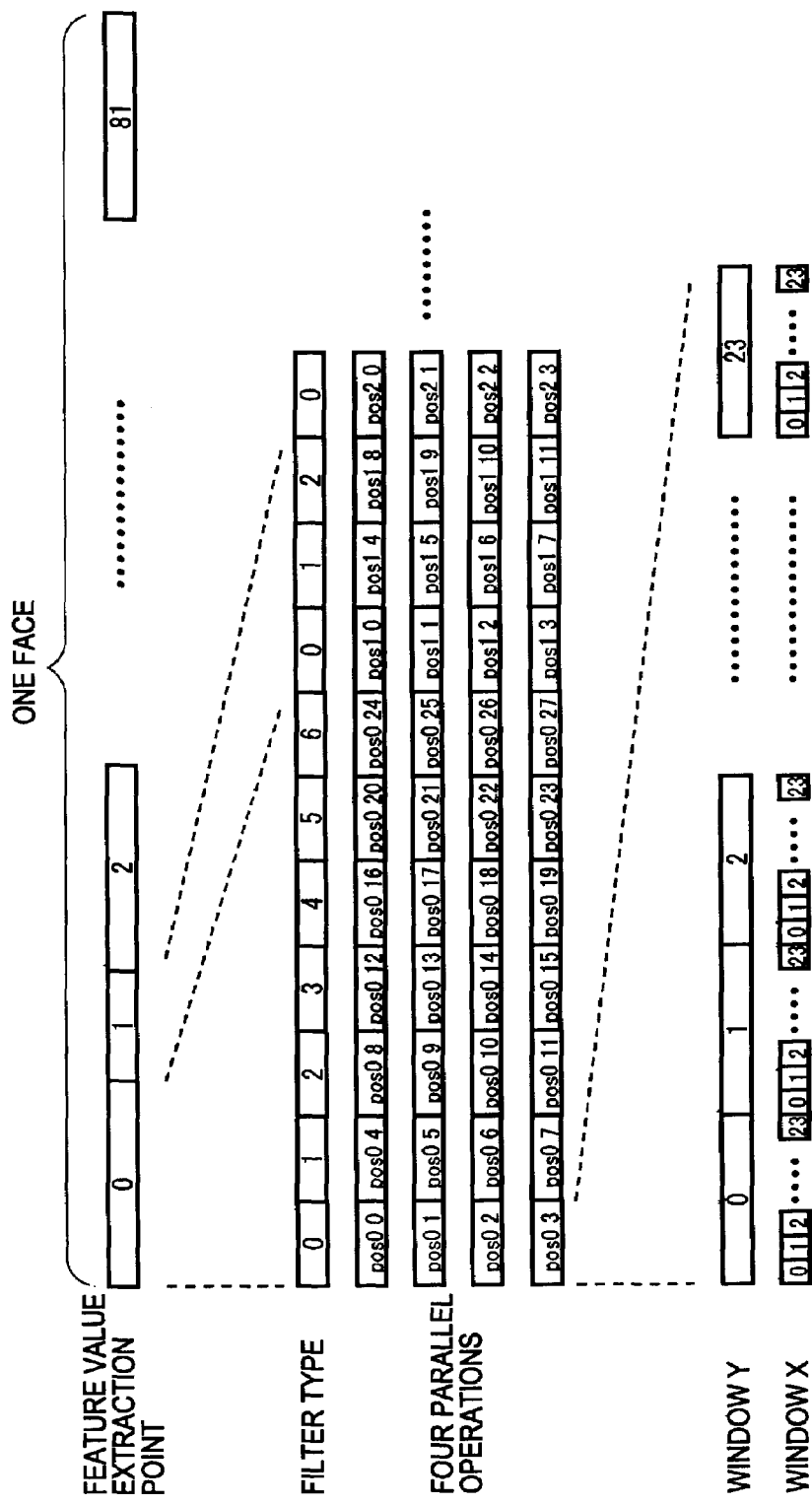
FIG. 8 illustrates control signals generated by a control signal generator.

In the example shown in FIG. 8, 28 (=4×7) types of Gabor filters are applied to a feature value extraction position-0 (pos0), and 12 (=4×3) types of Gabor filters are applied to a feature value extraction position-1 (pos1). The types and the number of Gabor filters may be arbitrarily selected depending on the position (the feature value extraction position) in the input face image. The number of Gabor filters used depends on the feature value extraction position $\{d_0, d_1 d_2, \ldots, d_{81}\}$. The types of Gabor filters and the number of Gabor filters (i.e., the number of elements of Gabor jets) vary depending on the position as described above. In the present embodiment, the maximum number of filters used is 40, and 4 filters are used at a time in the filtering process, and thus the count value of the filter type counter varies from 0 to 9.

Figure 9:
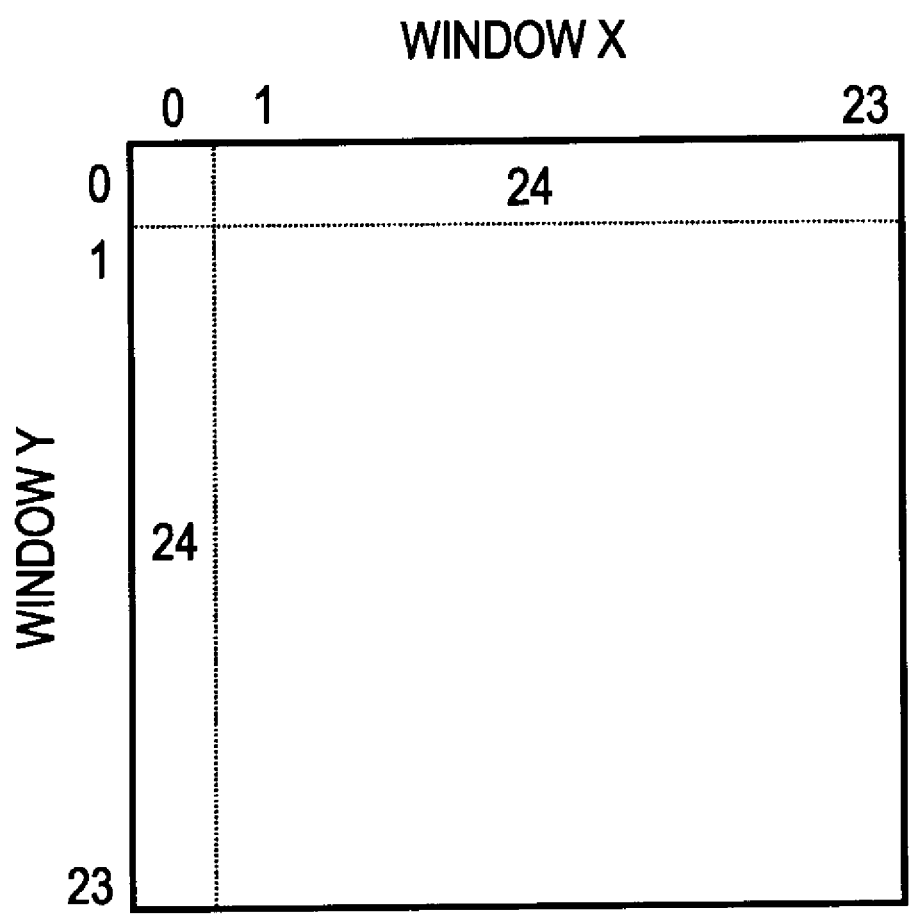
FIG. 9 illustrates an example of a filter window.

For each of four Gabor filters used in parallel processing, a y-counter for counting the y position of the window from 0 to 23 and an x-counter for counting the x position of the window from 0 to 23 (see FIG. 9) are disposed. The process of the Gabor filtering is performed in a period with a fixed length corresponding to 24×24=576 clocks.

In the present embodiment, 40 (8 directions×5 frequencies) types of Gabor filters are used. The coefficients of each Gabor filter is determined by a filter window (24×24) based on a Gaussian function, a real part including a cosine function, and an imaginary part including a sine function. The coefficients of the respective Gabor filters may be stored in a ROM so that the coefficients are given by hardware. To store all coefficients in the ROM, the ROM needs to have as high a storage capacity as 720 (=24×24×40×2×16) Kbits, in a case where each coefficient is represented by data of a length of 16 bits. A technique to reduce the total data size of data stored in the ROM is discussed below.

Each coefficient of each Gabor filter is given by the product of a value of the filter window calculated using a Gaussian function and a value a response function including a sine function and a cosine function. Therefore, if values of the filter window calculated using the Gaussian function, the values determined based on the sine function, and the values determined based on the cosine function are stored in advance in the ROM, it is possible to determine the coefficients of the Gabor filters by multiplication using values stored in the ROM. This allows a reduction in the total data size of data stored in the ROM compared with the case where all coefficients of the 40 Gabor filters are stored in the ROM.

As described above, it is possible to further reduce the total data size of data stored in the ROM, by eliminating redundancy in data associated with the window values calculated based on the Gaussian function and redundancy in data associated with values calculated based on the sine or cosine function, using the fact that the Gaussian function is symmetric about a peak value, and the fact that sine and cosine functions are periodic functions in which equal values appear periodically.

The redundancy of the filter window is discussed in further detail below. FIGS. 10A and 10B show filter window values given by the Gaussian function for respective 24×24 fixed XY positions. As can be seen from FIG. 4A, the filter window has a peak at a position (0, 0) and the value decreases toward 0 with increasing distance from the peak position while maintaining symmetry about the point (0, 0). As can be seen from FIGS. 10A and 10B, 78 words each enclosed in a thick-line box in FIG. 10A appear periodically in the filter window having a total of 576 (=24×24) words given by the Gaussian function, and thus any word can be obtained using one of 78 words in thick-line boxes shown in FIG. 10A.

The values given by the sine function and the cosine function are equal between 0° and 90°, between 45° and 135°, and among 27°, 63°, 117°, and 153°, and thus the total size of data associated with the response function stored in the ROM can be reduced taking into account the periodicity described above.

FIGS. 11A and 11B show values of the response function given by the sine function at 24×24 XY positions of the window in a direction of 0°. FIGS. 12A and 12B show values of the response function given by the cosine function at 24×24 XY positions of the window in a direction of 0°. Because of the periodicity of sine and cosine functions and because of the feature thereof that values associated with 0° are equal to values with 90° at locations with X and Y exchanged with each other, 12 words each enclosed in a thick-line box shown in FIG. 12A appear periodically at various window positions XY, and thus any value of the response function in the present direction can be obtained using one of these 12 words.

FIGS. 13A and 13B show values of the response function given by the sine function at 24×24 XY positions of the window in a direction of 135°. FIGS. 13C and 13D show values of the response function given by the sine function at 24×24 XY positions of the window in the direction of 135°. FIGS. 14A and 14B show values of the response function given by the cosine function at 24×24 XY positions of the window in a direction of 45°. FIGS. 14C and 14D show values of the response function given by the sine function at 24×24 XY positions of the window in a direction of 135°. Because of the periodicity of sine and cosine functions, a total of 24 words enclosed in thick-line boxes shown in FIGS. 13A and 14A appear periodically at various window positions XY, and thus any value of the response function in the present direction can be obtained using one of these 24 words.

The remaining 4 directions of the response function based on the sine and cosine functions may be taken at 22.5° which is the center angle between 0° and 45°, at 67.5° which is the center angle between 45° and 90°, at 112.5° which is the center angle between 90° and 135°, and at 157.5° which is the center angle between 135° and 180° (see FIG. 4C), However, the sine and cosine functions have no periodicity in these directions, and thus no reduction in data size can be achieved. This problem can be solved by employing 27°, 63°, 17°, 153° instead of 22.5°, 67.5°, 112.5°, and 157.5°, and approximating sine and cosine functions in directions of 22.5°, 67.5°, 112.5°, and 157.5° by sine and cosine functions in directions of 27°, 63°, 117°, and 153° in which sine and cosine functions have periodicity.

The angles 27°, 63°, 117°, and 153° are determined according to the following formulas so that sine and cosine functions have periodicity at these angles.

$$27°: \arcsin(1/\sqrt{5}), \arccos(2/\sqrt{5})$$

$$63°: \arcsin(2/\sqrt{5}), \arccos(1/\sqrt{5})$$

$$117°: \arcsin(2/\sqrt{5}), \arccos(-1/\sqrt{5})$$

$$63°: \arcsin(1/\sqrt{5}), \arccos(-2/\sqrt{5})$$

FIGS. 15A and 15B show values of the response function given by the sine function at 24×24 XY positions of the window in a direction of 27°. FIGS. 16A and 16B show values of the response function given by the cosine function at 24×24 XY positions of the window in a direction of 27°. Because of the periodicity of sine and cosine functions, a total of 35 words enclosed in thick-line boxes shown in FIGS. 15A and 16A appear periodically at various window positions XY, and thus any value of the response function in the present direction can be obtained using one of these 35 words.

In summary, the total size of data used to represent the filter window and the response functions in eight directions of the Gabor filters can be reduced as follows.

(1) The 78 words for representing the filter window with the fixed size of 24×24 based on the Gaussian function are stored in the ROM. (2) The 12 words for representing the response function based on sine and cosine functions in directions of 0° and 90° are stored in the ROM. (3) The 24 words for representing the response function based on sine and cosine functions in directions of 45° and 135° are stored in the ROM. (4) The response functions in directions of 22.5°, 67.5°, 112.5°, and 157.5° in which sine and cosine functions do not have periodicity are approximated by response functions in directions of 27°, 63°, 117°, and 153° in which sine and cosine functions have periodicity, and 35 words for representing the response functions in these directions are stored in the ROM.

Hereinafter, ROMs in which the above-described data used to obtain compete necessary data are stored are respectively denoted as a Gaussian data ROM, a 0/90° sine data ROM, a 0/90° cosine data ROM, a 45/135° sine data ROM, a 45/135° cosine data ROM, a 27/63/117/153° sine data ROM, and a 27/63/117/153° cosine data ROM.

In accordance with the control signals indicating the X and Y locations of the window supplied from the Y window position counter and the X window position counter of the control signal generator, an address generator generates ROM addresses indicating storage locations from which to read a value calculated based on the Gaussian function and values calculated based on the sine and cosine functions.

More specifically, an address generator for accessing the Gaussian data ROM examines an address conversion table such as that shown in FIG. 17 to find an address corresponding to control signals of the window Y and the window X thereby acquiring the address of the Gaussian data ROM at which a necessary value is stored.

Figure 18A:
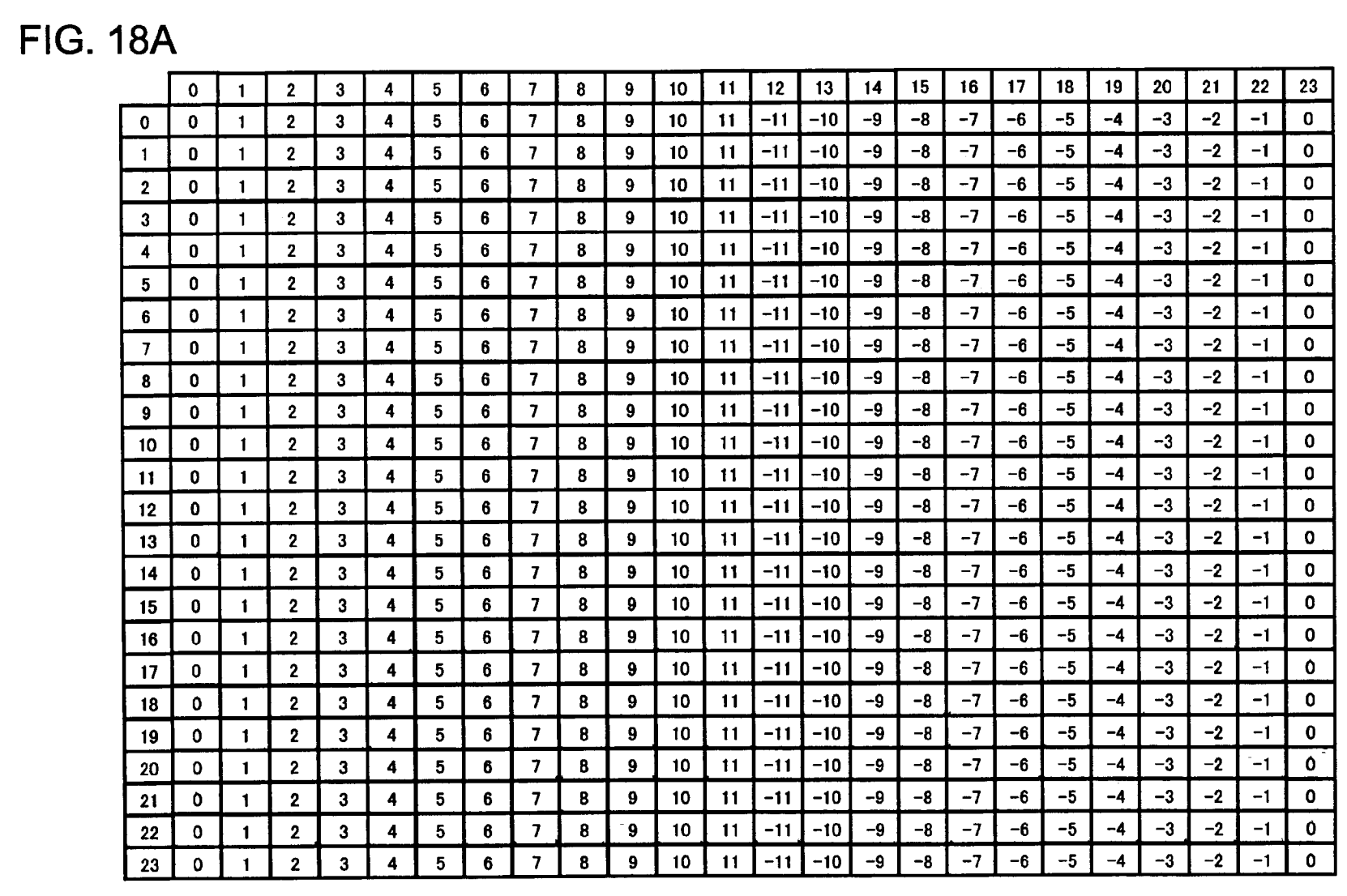

An address generator for accessing the 0/90° sine data ROM examines an address conversion table such as that shown in FIG. 18A or 18B to find an address corresponding to control signals of the window Y and the window X thereby acquiring the address of the 0/90° sine data ROM at which required values of the response function in directions of 0° and 90° determined in advance by calculation of the sine function are stored. Alternatively, the address generator for accessing the 0/90° sine data ROM may determine the address of the 0/90° sine data ROM from the control signals of the window Y and the window X in accordance with the following mathematical process.

0° sine function:

$$\text{if } (x<12) \text{ adr}=x; \text{ else } \{\text{adr}=23-x; *\text{adr}*=-1\}$$

90° sine function:

$$\text{if } (y<12) \text{ adr}=y; \text{ else } \{\text{adr}=23-y; *\text{adr}*=-1\}$$

Figure 19A:
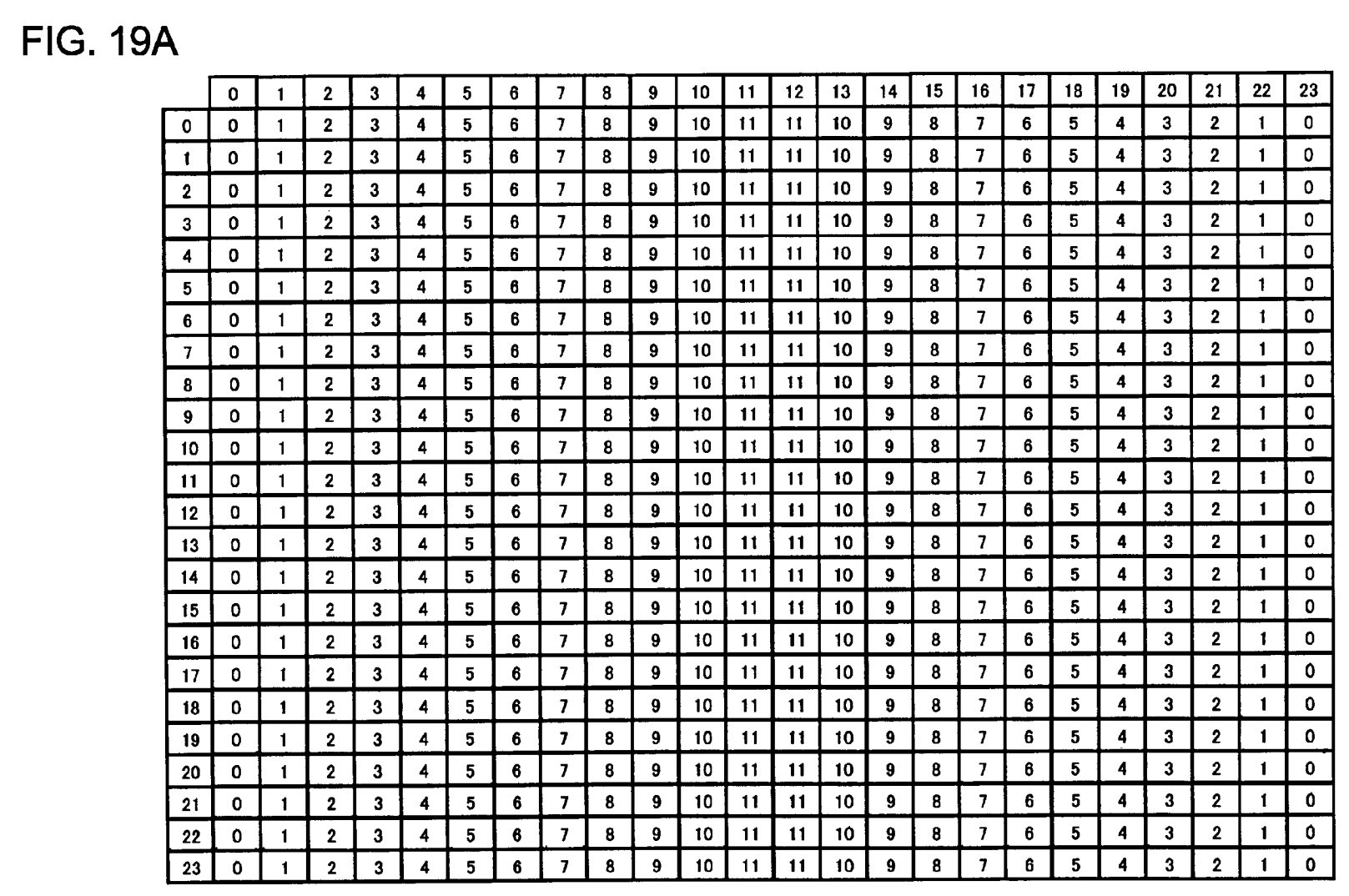
Figure 19B:
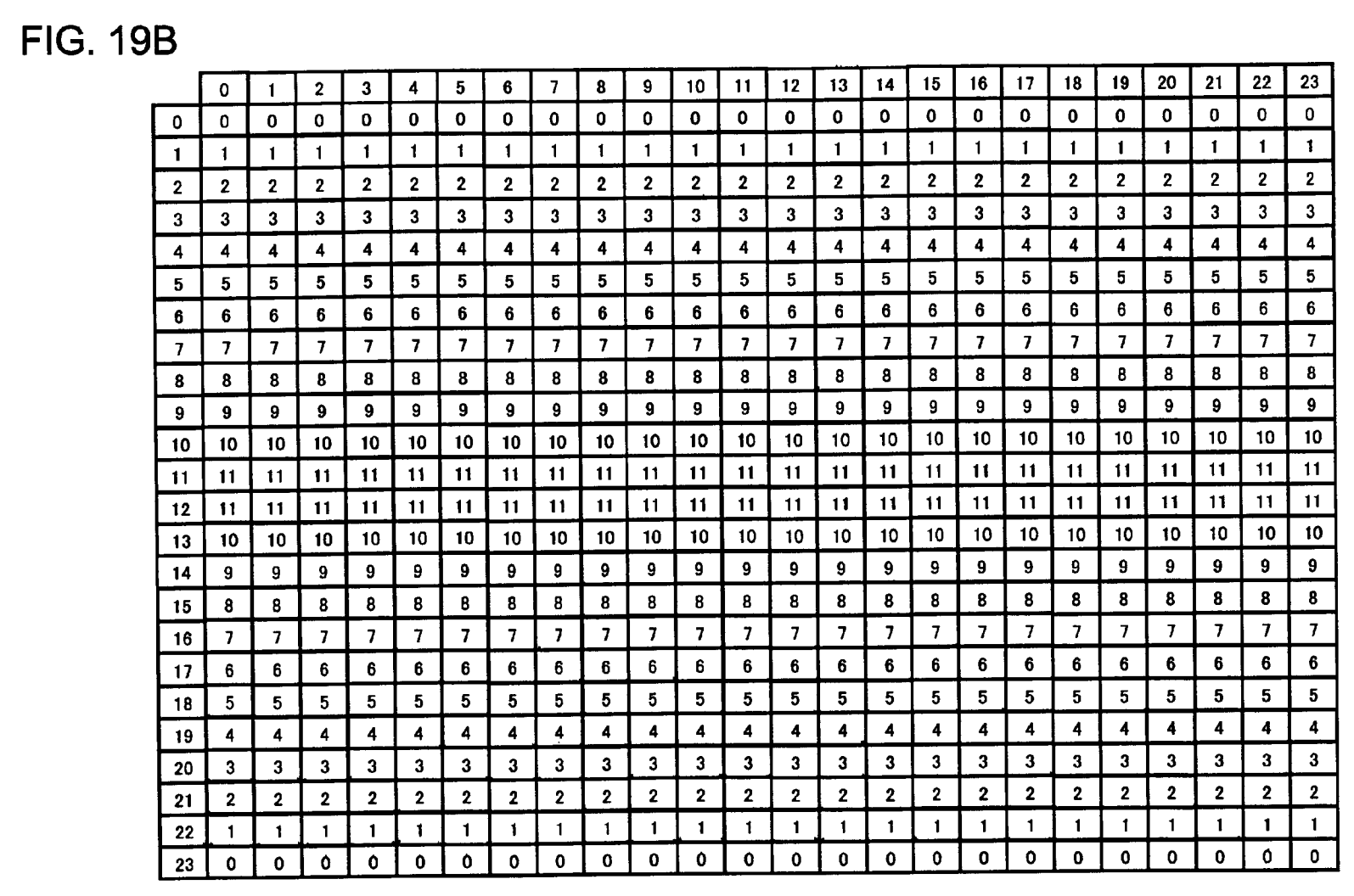

An address generator for accessing the 0/90° cosine data ROM examines an address conversion table such as that shown in FIG. 19A or 19B to find an address corresponding to control signals of the window Y and the window X thereby acquiring the address of the 0/90° cosine data ROM at which required values of the response function in directions of 0° and 90° determined in advance by calculation of the cosine function are stored. Alternatively, the address generator for accessing the 0/90° cosine data ROM may determine the address of the 0/90° cosine data ROM from the control signals of the window Y and the window X in accordance with the following mathematical process.

0° cosine function:

$$\text{if } (x<12) \text{ adr}=x; \text{ else adr}=23-x$$

00° cosine function:

$$\text{if } (y<12) \text{ adr}=y; \text{ else adr}=23-y$$

Figure 20A:
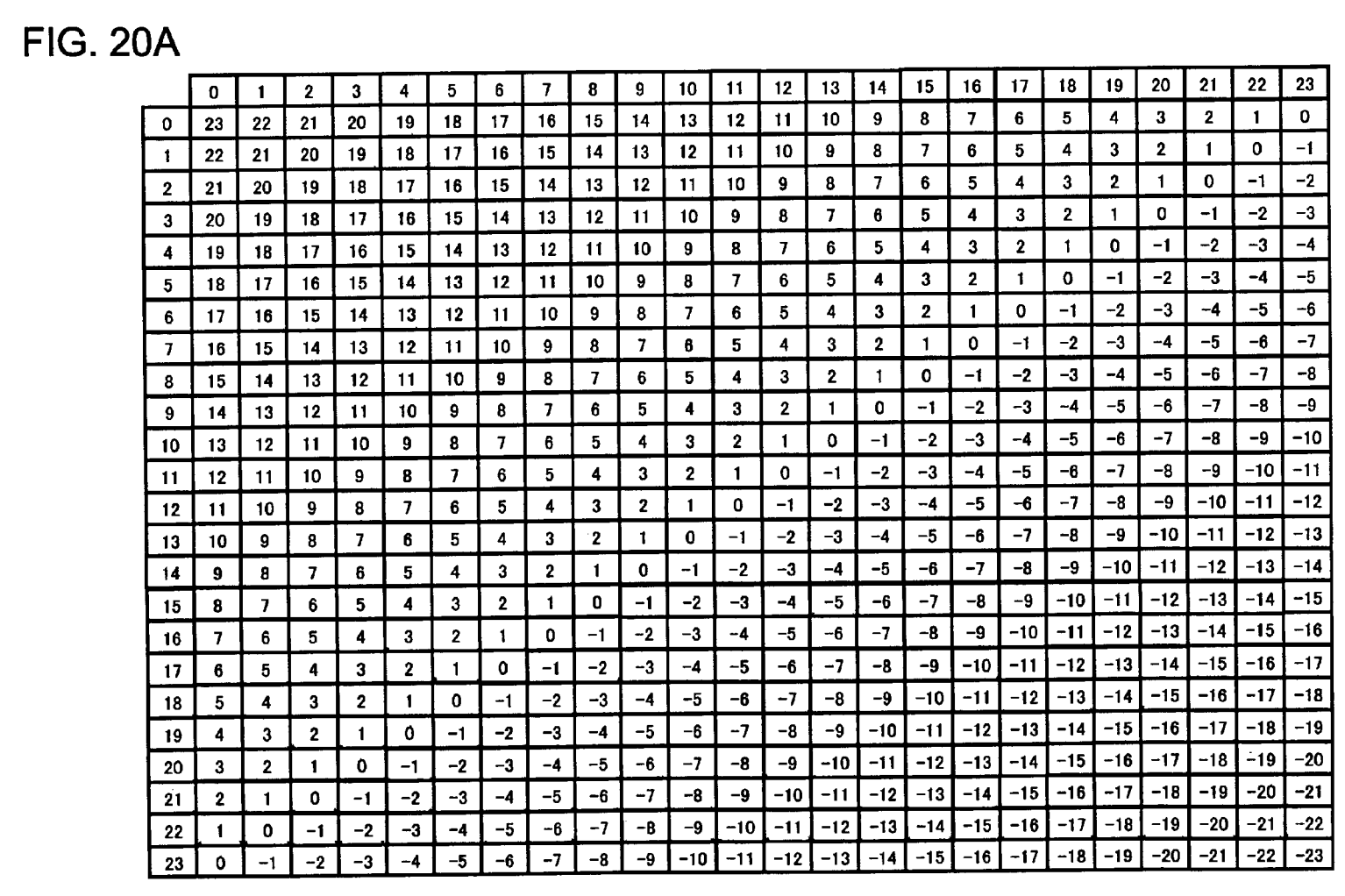

An address generator for accessing the 45/135° sine data ROM examines an address conversion table such as that shown in FIG. 20A or 20B to find an address corresponding to control signals of the window Y and the window X thereby acquiring the address of the 45/135° sine data ROM at which required values of the response function in directions of 45° and 135° determined in advance by calculation of the sine function are stored. Alternatively, the address generator for accessing the 45/135° sine data ROM may determine the address of the 45/135° sine data ROM from the control signals of the window Y and the window X in accordance with the following mathematical process.

45° sine function:

$$\text{adr}=(23-x)-y; \text{ if } (\text{adr}<0) \{\text{adr}*=-1; *\text{adr}*=-1\}$$

135° sine function:

$$\text{adr}=x-y; \text{ if } (\text{adr}<0) \{\text{adr}*=-1; *\text{adr}*=-1\}$$

Figure 21A:
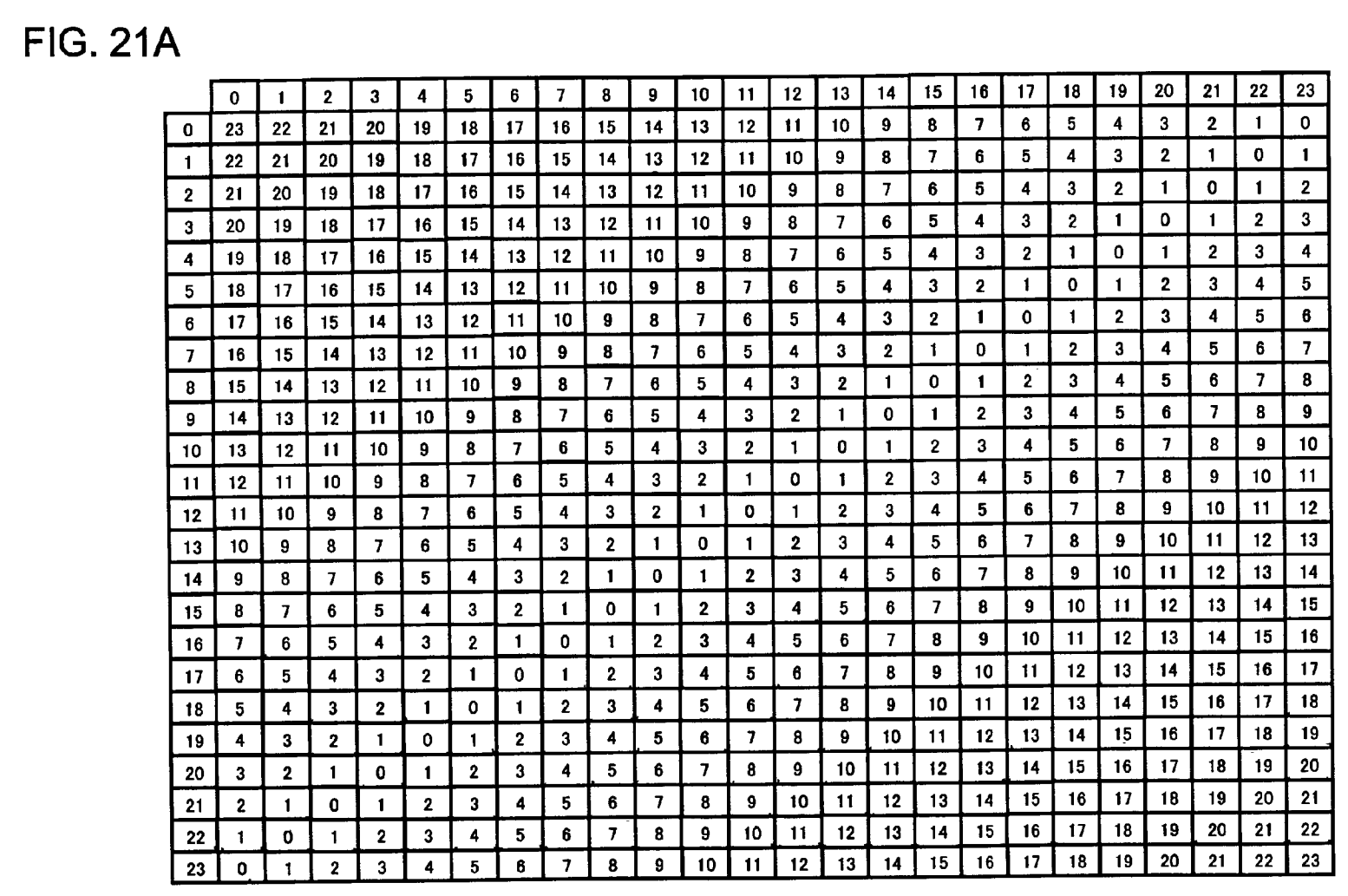
Figure 21B:
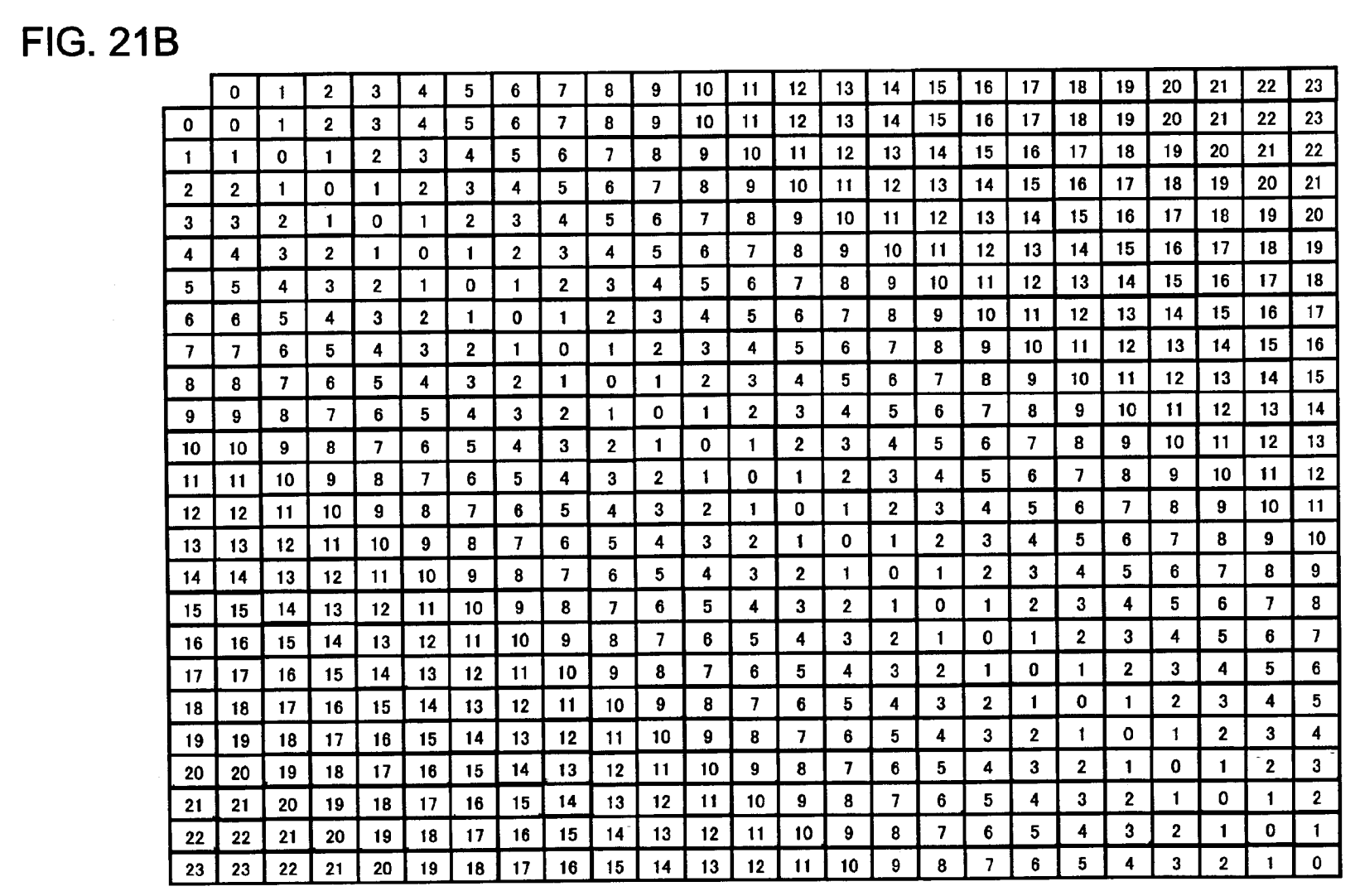

An address generator for accessing the 45/135° cosine data ROM examines an address conversion table such as that shown in FIG. 21A or 21B to find an address corresponding to control signals of the window Y and the window X thereby acquiring the address of the 45/135° cosine data ROM at which required values of the response function in directions of 45° and 135° determined in advance by calculation of the cosine function are stored. Alternatively, the address generator for accessing the 45/135° cosine data ROM may determine the address of the 45/135° cosine data ROM from the control signals of the window Y and the window X in accordance with the following mathematical process.

45° cosine function:

$$\text{adr}=(23-x)-y; \text{ if } (\text{adr}<0) \text{ adr}*=-1$$

135° cosine function:

$$\text{adr}=x-y; \text{ if } (\text{adr}<0) \text{ adr}*=-1$$

An address generator for accessing the 27/63/117/153° sine data ROM examines an address conversion table such as that shown in FIG. 22A to 22D to find an address corresponding to control signals of the window Y and the window X thereby acquiring the address of the 27/63/117/153° sine data ROM at which required values of the response function in directions of 27°, 63°, 117°, and 153° determined in advance by calculation of the sine function are stored. Alternatively, the address generator for accessing the 27/63/117/153° sine data ROM may determine the address of the 27/63/117/153° sine data ROM from the control signals of the window Y and the window X in accordance with the following mathematical process.

27° sine function:

```
if (y == odd) {adr = x − (23 − y)/2 + 1;
  if (adr ≦ 0) {adr+= 35;} else (*adr* = −1}}
else
  {adr = (23 − x) − y/2 + 1;
  if (adr ≦ 0) {adr+= 35; *adr* = −1}}
```

63° sine function:

```
if (y == odd) {adr = y − (23 − x)/2 + 1;
  if (adr ≦ 0) {adr+= 35;} else (*adr* = −1}}
else {adr = (23 − y) − x/2 + 1;
  if (adr ≦ 0) {adr+= 35; *adr* = −1}}
```

117° sine function:

```
if (x! == odd) {adr = y − x/2 + 1;
  if (adr ≦ 0) {adr+= 35;} else (*adr = −1}}
else {adr = (23 − y) − (23− x)/2 + 1;
  if (adr ≦ 0) {adr+= 35; *adr* = −1}}
```

153° sine function:

```
if (y == odd) {adr = (23 − x) − (23 − y)/2 + 1;
  if (adr ≦ 0) {adr+= 35;} else (*adr = −1}}
else {adr = x − y/2 + 1;
  if (adr ≦ 0) {adr+= 35; *adr* = −1}}
```

An address generator for accessing the 27/63/117/153° cosine data ROM examines an address conversion table such as that shown in FIG. 23A to 23D to find an address corresponding to control signals of the window Y and the window X thereby acquiring the address of the 27/63/117/153° cosine data ROM at which required values of the response function in directions of 27°, 63°, 117°, and 153° determined in advance by calculation of the cosine function are stored. Alternatively, the address generator for accessing the 27/63/117/153° cosine data ROM may determine the address of the 27/63/117/153° cosine data ROM from the control signals of the window Y and the window X in accordance with the following mathematical process.

27° cosine function:

```
if (y == odd) {adr = x − (23 − y)/2 + 1;
if (adr ≦ 0) adr+= 35}
else {adr = (23 − x) − y/2 + 1;
if (adr ≦ 0) adr+= 35}
```

63° cosine function:

```
if (y == odd) {adr = y − (23 − x)/2 + 1;
if (adr ≦ 0) adr+= 35}
else {adr = (23 − y) − x/2 + 1;
if (adr ≦ 0) adr+= 35}
```

117° cosine function:

```
if (x! == odd) {adr = y − x/2 + 1;
if (adr ≦ 0) adr+= 35}
else {adr = (23 − y) − (23− x)/2 + 1;
if (adr ≦ 0) adr+= 35}
```

153° cosine function:

```
if (y == odd) {adr = (23 − x) − (23 − y)/2 + 1;
if (adr ≦ 0) adr+= 35}
else {adr = x − y/2 + 1;
if (adr ≦ 0) {adr+= 35}
```

Note that the conversion formula for conversion to the ROM address is equal for values calculated based on the sine function and values calculated based on the cosine function.

As described above, it is not necessarily needed to use all 40 Gabor filters at all 82 feature value extraction positions. The number of Gabor filters used depends on the feature value extraction positions $\{d_0, d_1 d_2, \ldots, d_{81}\}$, and the type of the Gabor filter and the number of elements of the Gabor filter (i.e., the number of elements of the Gabor jet) vary depending on the feature value extraction positions. To properly select Gabor filters, the Gabor filter application unit 142 has a filter type SRAM and a selector. Data indicating the filter types to be used at the respective feature value extraction positions $\{d_0, d_1 d_2, \ldots, d_{81}\}$ of the input image is stored in advance in the filter type SRAM. For example, pos00, pos01, . . . , pos027 specifying Gabor filters for use at a feature value extraction position 0 (pos0), pos10, pos11, . . . , pos011 specifying Gabor filters for use at a feature value extraction position 1 (pos1), etc. are stored in the filter type SRAM.

In accordance with the address indicating a feature value extraction position generated by the control signal generator, data indicating the filter position to be used at the feature value extraction position of interest is read from the filter type SRAM, and the selector selects filter coefficients (response function calculated based on the sine and cosine functions) to be used at the feature value extraction position of interest from the respective coefficient data ROMs. The selected filter coefficients are supplied to the filtering unit.

In the example shown in FIG. 6, the Gabor filter application unit 142 is configured such that the filtering is performed in parallel for 4 filters at a time. Note that the number of filters performed in parallel is not limited to 4, but the number of filters may be determined depending on the total number of filters, the processing speed, the hardware complexity, etc.

The filtering unit applies the Gabor filters to the image (input image) supplied to the image SRAM from the SDRAM 15. More specifically, the filter coefficients are determined by multiplying values read from the Gaussian data ROM and values read from the sine data ROM and the cosine data ROM selected by the selector depending on the feature value extraction positions, and the convolutions of the filter coefficients of 24×24 filters and 24×24 pixels of the image. The results for the cosine and sine components are then combined together. In the present embodiment, the sum of absolute values is employed. When it is desirable to determine the sum more accurately, the root of the sum of squares is calculated.

In the configuration of the Gabor filter application unit 142 shown in FIG. 6, there is a restriction on the selection of filter types, because the values of the response function calculated based on the sine and cosine functions for angles 27°, 63°, 117°, and 153° (for a particular frequency) are stored in the same ROM and thus it is not allowed to perform the Gabor filtering operation in parallel for these angles. In other words, when only these four angles are used, the process is performed for only one angle at a time, and thus the hardware resource for parallel operation is not fully used.

Figure 24:
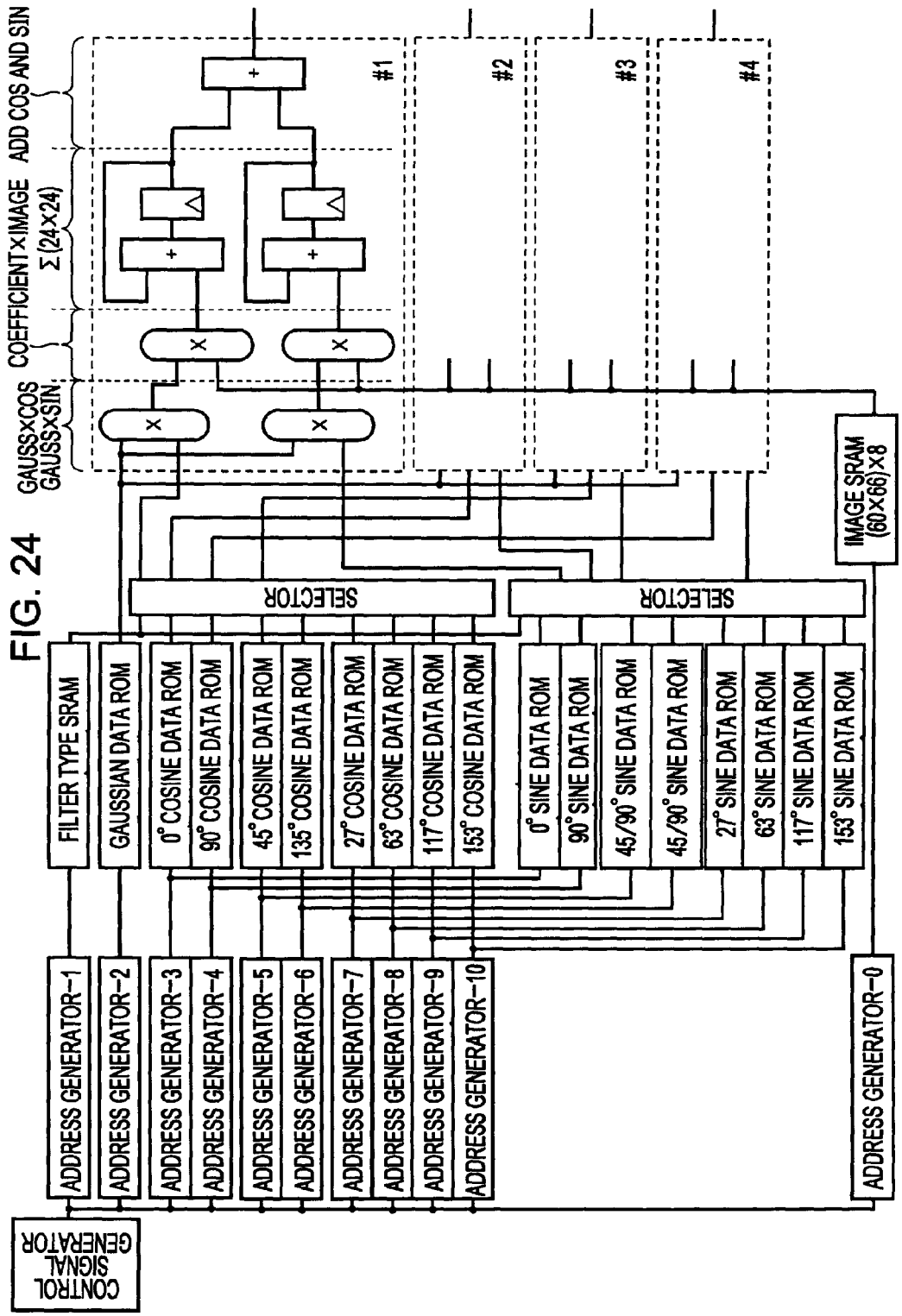
FIG. 24 illustrates another example of a configuration of a Gabor filter application unit.

When it is desirable to avoid the above problem to achieve a high processing speed for any combination of filter types, data of respective angles may be stored separately in different ROMs as shown in FIG. 24, although this results in an increase in the total data size.

It should be understood by those skilled in the art that various modifications, combinations, sub-combinations and alterations may occur depending on design requirements and other factors insofar as they are within the scope of the appended claims or the equivalents thereof.

What is claimed is:

1. A face recognition apparatus adapted for recognizing an input face image based on one or more registered face images, comprising:
   a face image inputting unit that inputs the face image to be recognized;
   a Gabor filter application unit, implemented via a processor, that calculates convolution of a pixel value at each feature value extraction position of the input image and coefficients of a Gabor filter, the coefficients of the Gabor filter being defined by a Gabor function representing a spatial characteristic using a Gaussian function representing a window and a sine function or a cosine function representing a frequency response, for each of a predetermined set of frequency values and for each of a predetermined set of angles of a response function of the Gabor filter thereby determining a Gabor jet having as many scalar values as there are Gabor filters;
   a similarity calculation unit
      that calculates a similarity between a Gabor jet at each feature value extraction position of the input face image and a Gabor jet of a registered face image, and that determines a similarity vector whose elements are given by values indicating similarity at respective feature value extraction positions; and an identification determination unit that determines when the input face image is identical to the registered face image based on the similarity vector, the Gabor filter application unit including a filter window data ROM that stores values of the filter window determined by calculating the Gaussian function, sine data ROMs that store values of the response function determined by calculating the sine function for the respective angles, cosine data ROMs that store values of the response function determined by calculating the cosine function for the respective angles, and a Gabor filter coefficient calculation unit that calculates coefficients of the Gabor filter by multiplying a value read from the filter window data ROM and the values read from the sine data ROMs and the cosine data ROMs, and a convolution of the input face image and a convolution of Gabor filter coefficients calculated by the Gabor filter coefficient calculation unit.

2. The face recognition apparatus according to claim 1, wherein the filter window data ROM, the sine data ROMs associated with respective filter angles, and the cosine data ROMs associated with the respective filter angles respectively store a minimum of ROM data with no redundancy selected according to a characteristic of the Gaussian function and periodicity of the sine and cosine functions, the face recognition apparatus further comprises:

an address conversion unit that converts a feature value extraction position to corresponding addresses of the filter window data ROM, the sine data ROMs associated with the respective filter angles, and the cosine data ROMs associated with the respective filter angles, the Gabor filter coefficient calculation unit reading a filter window value and values of the response function associated with respective filter angles from the filter window data ROM and the sine data ROMs associated with the respective filter angles, and the cosine data ROMs associated with the respective filter angles in accordance with the addresses corresponding to the feature value extraction position supplied from the address conversion unit, and determining the coefficients of the Gabor filters for the feature value extraction position by multiplying the filter window value and the values of the response function.

3. The face recognition apparatus according to claim 2, wherein the Gabor filter application unit applies Gabor filters defined in 8 directions, the Gabor filter application unit further includes, to store parameters associated with the Gabor filters, a 0/90° sine data ROM that stores values of the response function in directions of 0° and 90° calculated based on the sine function, a 0/90° cosine data ROM that stores values of the response function in directions of 0° and 90° calculated based on the cosine function, a 45/135° sine data ROM stores values of the response function in directions of 45° and 135° calculated based on the sine function, and a 45/135° cosine data ROM that stores values of the response function in directions of 45° and 135° calculated based on the cosine function, a 27/63/117/153° sine data ROM that stores values of the response function in directions of 27°, 63°, 117°, and 153° calculated based on the sine function, and a 27/63/117/153° cosine data ROM that stores values of the response function in directions of 27°, 63°, 117°, and 153° calculated based on the cosine function, thereby storing values of the response function in directions of 27°, 63°, 117°, and 153° in which the sine and cosine functions have periodicity thereby obtaining values approximating values of the response function in directions of 22.5° which is the center angle between 0° and 45°, 67.5° which is the center angle between 45° and 90°, 112.5° which is the center angle between 90° and 135°, and 157.5° which is the center angle between 135° and 180°, and each of the ROMs storing a minimum number of data with no redundancies selected from values calculated based on the sine or cosine function in directions of the respective angles.

4. The face recognition apparatus according to claim 2, further comprising:

a filter type data storage unit that stores data specifying filter types to be used at each feature value extraction position, and a selection unit that selectively reads, from respective ROMs, values of the filter window and values of the response function to determine the coefficients of the filters of types specified by data stored in the filter type data storage unit, for each feature value extraction position, and that supplies the read values to the Gabor filter coefficient calculation unit.

5. A method for a face recognition apparatus of recognizing an input face image based on one or more registered face images, comprising:

inputting the face image to be recognized;

calculating, at a processor of the face recognition apparatus by applying a Gabor filter, convolution of a pixel value at each feature value extraction position of the input image and coefficients of a Gabor filter, the coefficients of the Gabor filter being defined by a Gabor function representing a spatial characteristic using a Gaussian function representing a window and a sine function or a cosine function representing a frequency response, for each of a predetermined set of frequency values and for each of a predetermined set of angles of a response function of the Gabor filter thereby determining a Gabor jet having as many scalar values as there are Gabor filters;

calculating a similarity between a Gabor jet at each feature value extraction position of the input face image and a Gabor jet of a registered face image;

determining a similarity vector whose elements are given by values indicating similarity at respective feature value extraction positions; and determining when the input face image is identical to the registered face image, based on the similarity vector, wherein the step of applying the Gabor filter further includes reading values from a filter window data ROM that stores values of the filter window determined by calculating the Gaussian function, sine data ROMs that store values of the response function determined by calculating the sine function for the respective angles, and cosine data ROMs that store values of the response function determined by calculating the cosine function for the respective angles, and calculating coefficients of the Gabor filter by multiplying a value read from the filter window data ROM and the values read from the sine data ROMs and the cosine data ROMs, and a convolution of the input face image and a convolution of the calculated coefficients of the Gabor filter.

6. A Gabor filter application apparatus comprising:

a Gabor filter application unit, implemented via a processor, that calculates convolution of spatial data and coefficients of a Gabor filter, the coefficients of the Gabor filter being defined by a Gabor function representing a spatial characteristic using a Gaussian function representing a window and a sine function or a cosine function representing a frequency response, for each of a predetermined set of frequency values and for each of a predetermined set of angles of a response function of the Gabor filter thereby determining a Gabor jet having as many scalar values as the number of Gabor filter types, the Gabor filter application unit including a filter window data ROM that stores values of the filter window determined by calculating the Gaussian function, sine data ROMs that store values of the response function determined by calculating the sine function for the respective angles, cosine data ROMs that store values of the response function determined by calculating the cosine function for the respective angles, and a Gabor filter coefficient calculation unit that calculates coefficients of the Gabor filter by multiplying a value read from the filter window data ROM and values read from the sine data ROMs and the cosine data ROMs, and a convolution calculating unit that calculates the convolution using the Gabor filter coefficients calculated by the Gabor filter coefficient calculation unit.

7. The Gabor filter application apparatus according to claim 6, wherein the filter window data ROM, the sine data ROMs associated with respective filter angles, and the cosine data ROMs associated with the respective filter angles respectively store a minimum of ROM data with no redundancy selected according to a characteristic of the Gaussian function and periodicity of the sine and cosine functions, the Gabor filter application apparatus further comprises:

an address conversion unit that converts a feature value extraction position, at which to apply a Gabor filter, into corresponding addresses of the filter window data ROM, the sine data ROMs associated with the respective filter angles, and the cosine data ROMs associated with the respective filter angles, the Gabor filter coefficient calculation unit reading a filter window value and values of the response function associated with respective filter angles from the filter window data ROM and the sine data ROMs associated with the respective filter angles, and the cosine data ROMs associated with the respective filter angles in accordance with the addresses corresponding to the feature value extraction position supplied from the address conversion unit, and determining the coefficients of the Gabor filters for the feature value extraction position by multiplying the filter window value and the values of the response function.

8. The Gabor filter application apparatus according to claim 7, further comprising:

a 0/90° sine data ROM that stores values of the response function in directions of 0° and 90° calculated based on the sine function, a 0/90° cosine data ROM that stores values of the response function in directions of 0° and 90° calculated based on the cosine function, a 45/135° sine data ROM that stores values of the response function in directions of 45° and 135° calculated based on the sine function, a 45/135° cosine data ROM that stores values of the response function in directions of 45° and 135° calculated based on the cosine function, a 27/63/117/153° sine data ROM that stores values of the response function in directions of 27°, 63°, 117°, and 153° calculated based on the sine function, and a 27/63/117/153° cosine data ROM that stores values of the response function in directions of 27°, 63°, 117°, and 153° calculated based on the cosine function, thereby storing values of the response function in directions of 27°, 63°, 117°, and 153° in which the sine and cosine functions have periodicity thereby obtaining values approximating values of the response function in directions of 22.5° which is the center angle between 0° and 45°, 67.5° which is the center angle between 45° and 90°, 112.5° which is the center angle between 90° and 135°, and 157.5° which is the center angle between 135° and 180°, wherein each of the ROMs stores a minimum number of data with no redundancies selected from values calculated based on the sine or cosine function in directions of the respective angles.

9. The Gabor filter application apparatus according to claim 7, further comprising:

a filter type data storage unit that stores data specifying filter types to be used at each feature value extraction position, and a selection unit that selectively reads, from respective ROMs, values of the filter window and values of the response function to determine the coefficients of the filters of types specified by data stored in the filter type data storage unit, for each feature value extraction position, and supplies the read values to the Gabor filter coefficient calculation unit.

10. A non-transitory computer-readable medium storing computer readable instructions thereon for recognizing an input face image based on one or more registered face images, the computer readable instructions which when executed by a face recognition apparatus cause the face recognition apparatus to perform a method comprising:

inputting the face image to be recognized;

calculating, by applying a Gabor filter, convolution of a pixel value at each feature value extraction position of the input image and coefficients of a Gabor filter, the coefficients of the Gabor filter being defined by a Gabor function representing a spatial characteristic using a Gaussian function representing a window and a sine function or a cosine function representing a frequency response, for each of a predetermined set of frequency values and for each of a predetermined set of angles of a response function of the Gabor filter thereby determining a Gabor jet having as many scalar values as there are Gabor filters;

calculating a similarity between a Gabor jet at each feature value extraction position of the input face image and a Gabor jet of a registered face image;

determining a similarity vector whose elements are given by values indicating similarity at respective feature value extraction positions;

determining when the input face image is identical to the registered face image, based on the similarity vector, wherein the step of applying Gabor filter further includes
reading values from a
filter window data ROM that stores values of the filter window determined by calculating the Gaussian function,
sine data ROMs that stores values of the response function determined by calculating the sine function for the respective angles, and
cosine data ROMs that stores values of the response function determined by calculating the cosine function for the respective angles, and
calculating
coefficients of the Gabor filter by multiplying a value read from the filter window data ROM and the values read from the sine data ROMs and the cosine data ROMs, and
a the convolution of the input face image and a convolution of the calculated coefficients of the Gabor filter.

11. A face recognition apparatus for recognizing an input face image based on one or more registered face images, comprising:

face image input means for inputting the face image to be recognized;

Gabor filter application means for calculating convolution of a pixel value at each feature value extraction position of the input image and coefficients of a Gabor filter, the coefficients of the Gabor filter being defined by a Gabor function representing a spatial characteristic using a Gaussian function representing a window and a sine function or a cosine function representing a frequency response, for each of a predetermined set of frequency values and for each of a predetermined set of angles of a response function of the Gabor filter thereby determining a Gabor jet having as many scalar values as there are Gabor filters;

similarity calculation means
for calculating the similarity between a Gabor jet at each feature value extraction position of the input face image and a Gabor jet of a registered face image, and
for determining a similarity vector whose elements are given by values indicating similarity at respective feature value extraction positions; and identification determination means for determining when the input face image is identical to the registered face image, on the basis of the similarity vector, the Gabor filter application means including filter storing means for storing values of the filter window determined by calculating the Gaussian function, sine value storing means for storing values of the response function determined by calculating the sine function for the respective angles, cosine value storing means for storing values of the response function determined by calculating the cosine function for the respective angles, and Gabor filter coefficient calculation means for calculating
coefficients of the Gabor filter by multiplying a value read from the filter storing means and the values read from the sine value storing means and the cosine value storing means, and
a convolution of the input face image and a convolution of the Gabor filter coefficients calculated by the Gabor filter coefficient calculation unit.

\* \* \* \* \*